United States Patent
De Wind et al.

(10) Patent No.: US 9,827,913 B2
(45) Date of Patent: Nov. 28, 2017

(54) EXTERIOR REARVIEW MIRROR ASSEMBLY

(71) Applicant: MAGNA MIRRORS OF AMERICA, INC., Holland, MI (US)

(72) Inventors: Darryl P. De Wind, West Olive, MI (US); Eric S. Deuel, Allendale, MI (US); Justin E. Sobecki, Rockford, MI (US); Joseph R. Mambourg, Muskegon, MI (US); Keith D. Foote, Grand Rapids, MI (US); Niall R. Lynam, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 385 days.

(21) Appl. No.: 14/380,464

(22) PCT Filed: Feb. 22, 2013

(86) PCT No.: PCT/US2013/027346
§ 371 (c)(1),
(2) Date: Aug. 22, 2014

(87) PCT Pub. No.: WO2013/126719
PCT Pub. Date: Aug. 29, 2013

(65) Prior Publication Data
US 2015/0097955 A1    Apr. 9, 2015

Related U.S. Application Data

(63) Continuation-in-part of application No. 14/357,025, filed as application No. PCT/US2012/064398 on
(Continued)

(51) Int. Cl.
*B60R 1/06* (2006.01)
*B60R 1/12* (2006.01)
(Continued)

(52) U.S. Cl.
CPC ............... *B60R 1/12* (2013.01); *B60R 1/062* (2013.01); *B60R 1/07* (2013.01); *B60R 2001/1253* (2013.01)

(58) Field of Classification Search
CPC ... B60R 1/062; B60R 2001/1253; B60R 1/12; B60R 1/07
See application file for complete search history.

(56) References Cited

U.S. PATENT DOCUMENTS 2,962,933 A   12/1960  Hezler, Jr.
3,119,591 A    1/1964  Malecki
(Continued)

FOREIGN PATENT DOCUMENTS

DE   1530861   6/1969
DE   2254511   5/1971
(Continued)

OTHER PUBLICATIONS

International Search Report and Written Opinion dated May 13, 2013 for corresponding PCT application No. PCT/US2013/027346.

*Primary Examiner* — Zhihan Zhou
(74) *Attorney, Agent, or Firm* — Gardner, Linn, Burkhart & Flory, LLP

(57) ABSTRACT

An exterior rearview mirror assembly includes a non-movable portion, a movable portion and a mirror head. The non-movable portion is configured for attachment at an exterior portion of a vehicle and the movable portion is movable relative to the non-movable portion. The mirror head is movable relative to the movable portion, and a mirror reflective element is fixedly attached at the mirror head. A first actuator is operable to move the movable portion relative to the non-movable portion about a first axis and a second actuator is operable to move the mirror head relative to the movable portion about a second axis. The first and second actuators are cooperatively operable to move the
(Continued)

movable portion about the first axis and to move the mirror head about the second axis, and the mirror reflective element moves in tandem with movement of the mirror head.

13 Claims, 44 Drawing Sheets

Related U.S. Application Data

Nov. 9, 2012, now Pat. No. 9,346,403, and a continuation-in-part of application No. 13/023,747, filed on Feb. 9, 2011, now Pat. No. 8,915,601.

(60) Provisional application No. 61/758,536, filed on Jan. 30, 2013, provisional application No. 61/739,986, filed on Dec. 20, 2012, provisional application No. 61/705,876, filed on Sep. 26, 2012, provisional application No. 61/697,554, filed on Sep. 6, 2012, provisional application No. 61/665,509, filed on Jun. 28, 2012, provisional application No. 61/664,438, filed on Jun. 26, 2012, provisional application No. 61/647,179, filed on May 15, 2012, provisional application No. 61/614,877, filed on Mar. 23, 2012, provisional application No. 61/601,756, filed on Feb. 22, 2012, provisional application No. 61/590,578, filed on Jan. 25, 2012, provisional application No. 61/565,541, filed on Dec. 1, 2011, provisional application No. 61/558,623, filed on Nov. 11, 2011, provisional application No. 61/303,042, filed on Feb. 10, 2010.

(51) Int. Cl.
*B60R 1/062* (2006.01)
*B60R 1/07* (2006.01)

(56) References Cited

U.S. PATENT DOCUMENTS

| | | |
|---|---|---|
| 4,477,149 A | 10/1984 | Crespy |
| 4,530,571 A | 7/1985 | Connor |
| 4,826,289 A | 5/1989 | Vandenbrink et al. |
| 4,832,477 A | 5/1989 | Torii et al. |
| 5,151,824 A | 9/1992 | O'Farrell |
| 5,190,499 A | 3/1993 | Mori et al. |
| 5,210,651 A | 5/1993 | Shibuya et al. |
| 5,327,288 A | 7/1994 | Wellington et al. |
| 5,371,659 A | 12/1994 | Pastrick et al. |
| 5,421,940 A | 6/1995 | Cornils et al. |
| 5,424,898 A | 6/1995 | Larson et al. |
| 5,448,397 A | 9/1995 | Tonar |
| 5,489,080 A | 2/1996 | Allen |
| 5,497,306 A | 3/1996 | Pastrick |
| 5,513,048 A | 4/1996 | Chen |
| 5,525,264 A | 6/1996 | Cronin et al. |
| 5,530,240 A | 6/1996 | Larson et al. |
| 5,546,239 A | 8/1996 | Lewis |
| 5,552,094 A | 9/1996 | Kubota |
| 5,555,136 A | 9/1996 | Waldmann et al. |
| 5,572,376 A | 11/1996 | Pace |
| 5,575,552 A | 11/1996 | Faloon et al. |
| 5,579,178 A | 11/1996 | Mochizuki |
| 5,582,383 A | 12/1996 | Mertens et al. |
| 5,624,176 A | 4/1997 | O'Farrell et al. |
| 5,649,756 A | 7/1997 | Adams et al. |
| 5,659,423 A | 8/1997 | Schierbeek et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,671,996 A | 9/1997 | Bos et al. |
| 5,680,263 A | 10/1997 | Zimmermann et al. |
| 5,703,731 A | 12/1997 | Boddy et al. |
| 5,724,187 A | 3/1998 | Varaprasad et al. |
| 5,786,772 A | 7/1998 | Schofield et al. |
| 5,790,298 A | 8/1998 | Tonar |
| 5,796,094 A | 8/1998 | Schofield et al. |
| 5,796,176 A | 8/1998 | Kramer et al. |
| 5,808,778 A | 9/1998 | Bauer et al. |
| 5,818,625 A | 10/1998 | Forgette et al. |
| 5,823,054 A | 10/1998 | Brouwer |
| 5,823,654 A | 10/1998 | Pastrick et al. |
| 5,900,999 A | 5/1999 | Huizenga et al. |
| 5,903,402 A | 5/1999 | Hoek |
| 5,910,854 A | 6/1999 | Varaprasad et al. |
| 5,923,457 A | 7/1999 | Byker et al. |
| 5,929,786 A | 7/1999 | Schofield et al. |
| 5,949,591 A | 9/1999 | Whitehead |
| 5,969,890 A | 10/1999 | Whitehead |
| 5,984,482 A | 11/1999 | Rumsey et al. |
| 5,986,364 A | 11/1999 | Bingle et al. |
| 6,002,511 A | 12/1999 | Varaprasad et al. |
| 6,064,508 A | 5/2000 | Forgette et al. |
| 6,068,380 A | 5/2000 | Lynn et al. |
| 6,102,546 A | 8/2000 | Carter |
| 6,111,683 A | 8/2000 | Cammenga et al. |
| 6,146,003 A | 11/2000 | Thau |
| 6,154,306 A | 11/2000 | Varaprasad et al. |
| 6,170,956 B1 | 1/2001 | Rumsey et al. |
| 6,176,602 B1 | 1/2001 | Pastrick et al. |
| 6,178,034 B1 | 1/2001 | Allemand et al. |
| 6,193,379 B1 | 2/2001 | Tonar et al. |
| 6,195,194 B1 | 2/2001 | Roberts et al. |
| 6,213,612 B1 | 4/2001 | Schnell et al. |
| 6,227,675 B1 | 5/2001 | Mertens et al. |
| 6,227,689 B1 | 5/2001 | Miller |
| 6,229,226 B1 | 5/2001 | Kramer et al. |
| 6,239,899 B1 | 5/2001 | DeVries et al. |
| 6,239,928 B1 | 5/2001 | Whitehead et al. |
| 6,243,218 B1 | 6/2001 | Whitehead |
| 6,249,369 B1 | 6/2001 | Theiste et al. |
| 6,276,821 B1 | 8/2001 | Pastrick et al. |
| 6,312,135 B1 | 11/2001 | Polzer |
| 6,315,421 B1 | 11/2001 | Apfelbeck et al. |
| 6,317,248 B1 | 11/2001 | Agrawal et al. |
| 6,318,870 B1 | 11/2001 | Spooner et al. |
| 6,325,518 B1 | 12/2001 | Whitehead et al. |
| 6,329,925 B1 | 12/2001 | Skiver et al. |
| 6,331,066 B1 | 12/2001 | Desmond et al. |
| 6,362,548 B1 | 3/2002 | Bingle et al. |
| 6,369,804 B1 | 4/2002 | Sandbach |
| 6,407,468 B1 | 6/2002 | LeVesque et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,467,920 B2 | 10/2002 | Schnell et al. |
| 6,499,850 B2 | 12/2002 | Waldmann |
| 6,501,387 B2 | 12/2002 | Skiver et al. |
| 6,502,970 B1 | 1/2003 | Anderson et al. |
| 6,535,126 B2 | 3/2003 | Lin et al. |
| 6,565,221 B2 | 5/2003 | Guttenberger et al. |
| 6,582,109 B2 | 6/2003 | Miller |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,685,864 B2 | 2/2004 | Bingle et al. |
| 6,690,268 B2 | 2/2004 | Schofield et al. |
| 6,698,905 B1 | 3/2004 | Whitehead |
| 6,755,544 B2 | 6/2004 | Schnell et al. |
| 6,781,738 B2 | 8/2004 | Kikuchi et al. |
| 6,870,656 B2 | 3/2005 | Tonar et al. |
| 6,916,100 B2 | 7/2005 | Pavao |
| 6,981,774 B2 | 1/2006 | Dumont et al. |
| 7,012,729 B2 | 3/2006 | Tonazzi et al. |
| 7,042,616 B2 | 5/2006 | Tonar et al. |
| 7,064,882 B2 | 6/2006 | Tonar et al. |
| 7,073,914 B2 | 7/2006 | Pavao |
| 7,080,914 B1 | 7/2006 | Boddy |
| 7,093,946 B2 | 8/2006 | Barve et al. |
| 7,093,965 B2 | 8/2006 | Veldman |

(56) References Cited

U.S. PATENT DOCUMENTS

| | | |
|---|---|---|
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,267,449 B1 | 9/2007 | Boddy et al. |
| 7,274,501 B2 | 9/2007 | McCabe et al. |
| 7,287,868 B2 | 10/2007 | Carter et al. |
| 7,289,037 B2 | 10/2007 | Uken et al. |
| 7,314,285 B2 | 1/2008 | Ruse et al. |
| 7,322,710 B2 | 1/2008 | Foote et al. |
| 7,324,261 B2 | 1/2008 | Tonar et al. |
| 7,360,932 B2 | 4/2008 | Uken et al. |
| 7,370,983 B2 | 5/2008 | De Wind et al. |
| 7,372,611 B2 | 5/2008 | Tonar et al. |
| 7,492,281 B2 | 2/2009 | Lynam et al. |
| 7,510,311 B2 | 3/2009 | Romas et al. |
| 7,532,149 B2 | 5/2009 | Banko et al. |
| 7,626,749 B2 | 12/2009 | Baur et al. |
| 7,690,800 B2 | 4/2010 | Fukai et al. |
| 7,706,046 B2 | 4/2010 | Bauer et al. |
| 7,719,750 B2 | 5/2010 | Tonar et al. |
| 7,722,199 B2 | 5/2010 | DeWard et al. |
| 7,777,611 B2 | 8/2010 | Desai |
| 7,817,020 B2 | 10/2010 | Turnbull et al. |
| 7,821,697 B2 | 10/2010 | Varaprasad et al. |
| 7,926,960 B2 | 4/2011 | Skiver et al. |
| 7,944,371 B2 | 5/2011 | Foote et al. |
| 7,978,094 B2 | 7/2011 | Uken et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| 8,048,085 B2 | 11/2011 | Peterson et al. |
| 8,049,640 B2 | 11/2011 | Uken et al. |
| 8,154,418 B2 | 4/2012 | Peterson et al. |
| 8,169,684 B2 | 5/2012 | Bugno et al. |
| 8,194,133 B2 | 6/2012 | DeWind et al. |
| 8,339,526 B2 | 12/2012 | Minikey, Jr. et al. |
| 8,366,285 B2 | 2/2013 | Reedman et al. |
| 8,465,161 B2 | 6/2013 | De Wind et al. |
| 8,508,831 B2 | 8/2013 | De Wind et al. |
| 8,730,553 B2 | 5/2014 | De Wind et al. |
| 8,764,256 B2 | 7/2014 | Foote et al. |
| 8,915,601 B2 | 12/2014 | Foote et al. |
| 9,067,541 B2 | 6/2015 | Sobecki et al. |
| 2002/0057494 A1 | 5/2002 | Lang |
| 2002/0063978 A1 | 5/2002 | Guttenberger et al. |
| 2003/0007261 A1 | 1/2003 | Hutzel et al. |
| 2004/0196578 A1* | 10/2004 | Dumont .............. B60R 1/072 359/877 |
| 2005/0111121 A1* | 5/2005 | Barve ................. G02B 7/182 359/872 |
| 2005/0281043 A1 | 12/2005 | Eisenbraun |
| 2006/0050018 A1 | 3/2006 | Hutzel et al. |
| 2006/0061008 A1 | 3/2006 | Karner et al. |
| 2007/0002477 A1 | 1/2007 | Whitehead |
| 2007/0081350 A1 | 4/2007 | Huang |
| 2007/0139751 A1 | 6/2007 | Kuiper et al. |
| 2007/0285812 A1 | 12/2007 | Foote et al. |
| 2008/0042938 A1 | 2/2008 | Cok |
| 2008/0304170 A1* | 12/2008 | Zhao .................. B60R 1/082 359/864 |
| 2009/0040306 A1 | 2/2009 | Foote et al. |
| 2009/0213480 A1 | 8/2009 | Li |
| 2009/0237821 A1 | 9/2009 | Li |
| 2009/0243824 A1 | 10/2009 | Peterson et al. |
| 2010/0182143 A1 | 7/2010 | Lynam |
| 2010/0238570 A1* | 9/2010 | Reedman ............ B60R 1/076 359/841 |
| 2010/0290141 A1 | 11/2010 | Huang |
| 2010/0321758 A1* | 12/2010 | Bugno ................ B60R 1/088 359/267 |
| 2011/0176323 A1 | 7/2011 | Skiver et al. |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2014/0022390 A1 | 1/2014 | Blank et al. |
| 2014/0285666 A1 | 9/2014 | O'Connell et al. |
| 2014/0376119 A1 | 12/2014 | Sobecki et al. |
| 2015/0224930 A1 | 8/2015 | Foote et al. |

FOREIGN PATENT DOCUMENTS

| | | |
|---|---|---|
| DE | 3049169 | 7/1982 |
| EP | 0780266 | 6/1997 |
| EP | 2106970 | 10/2009 |
| FR | 1525709 | 5/1968 |
| WO | WO2010124064 | 10/2010 |
| WO | WO2011044312 | 4/2011 |
| WO | WO2012051500 | 4/2012 |
| WO | WO2013/071070 | 5/2013 |
| WO | WO2013/126719 | 8/2013 |

* cited by examiner

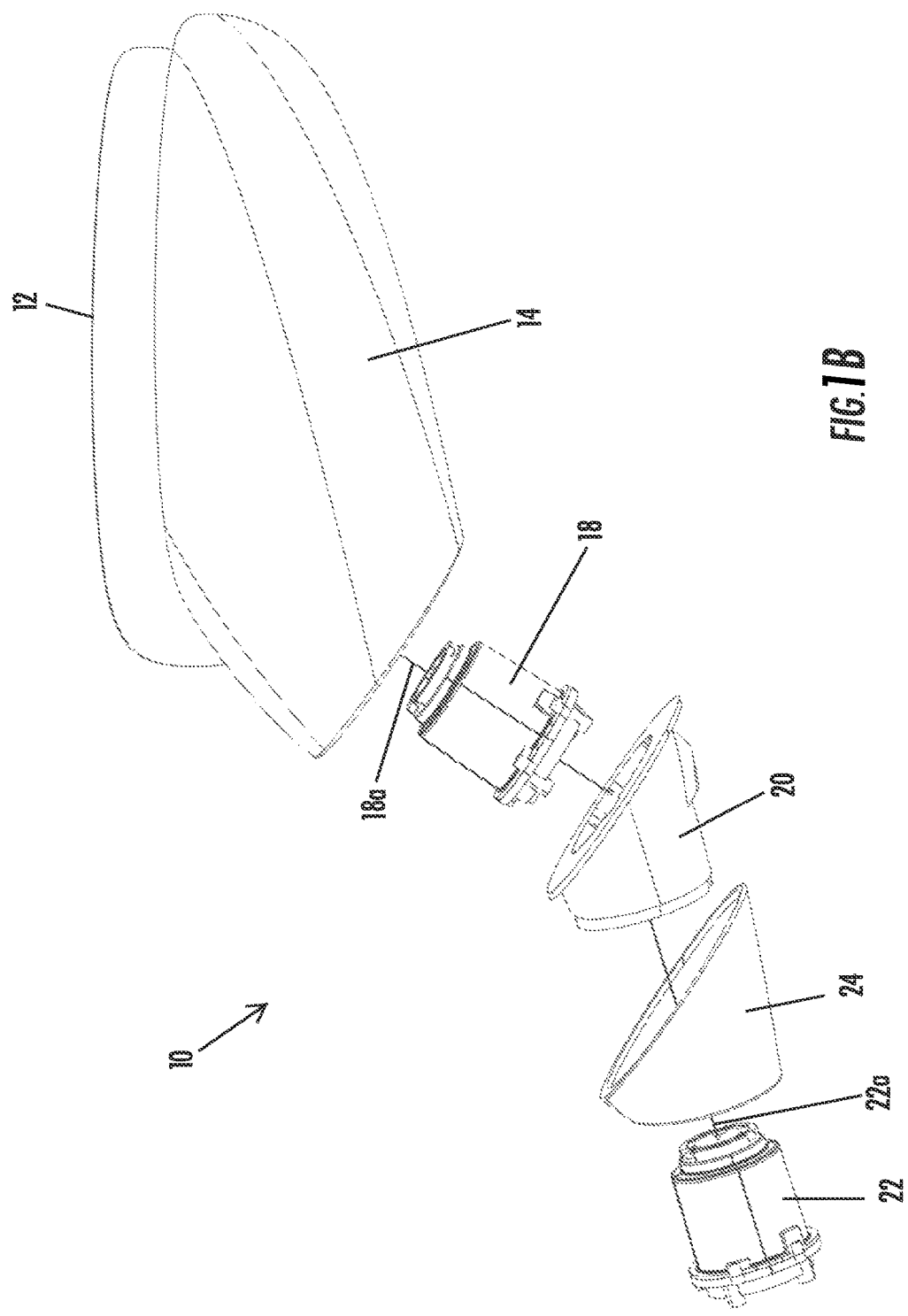

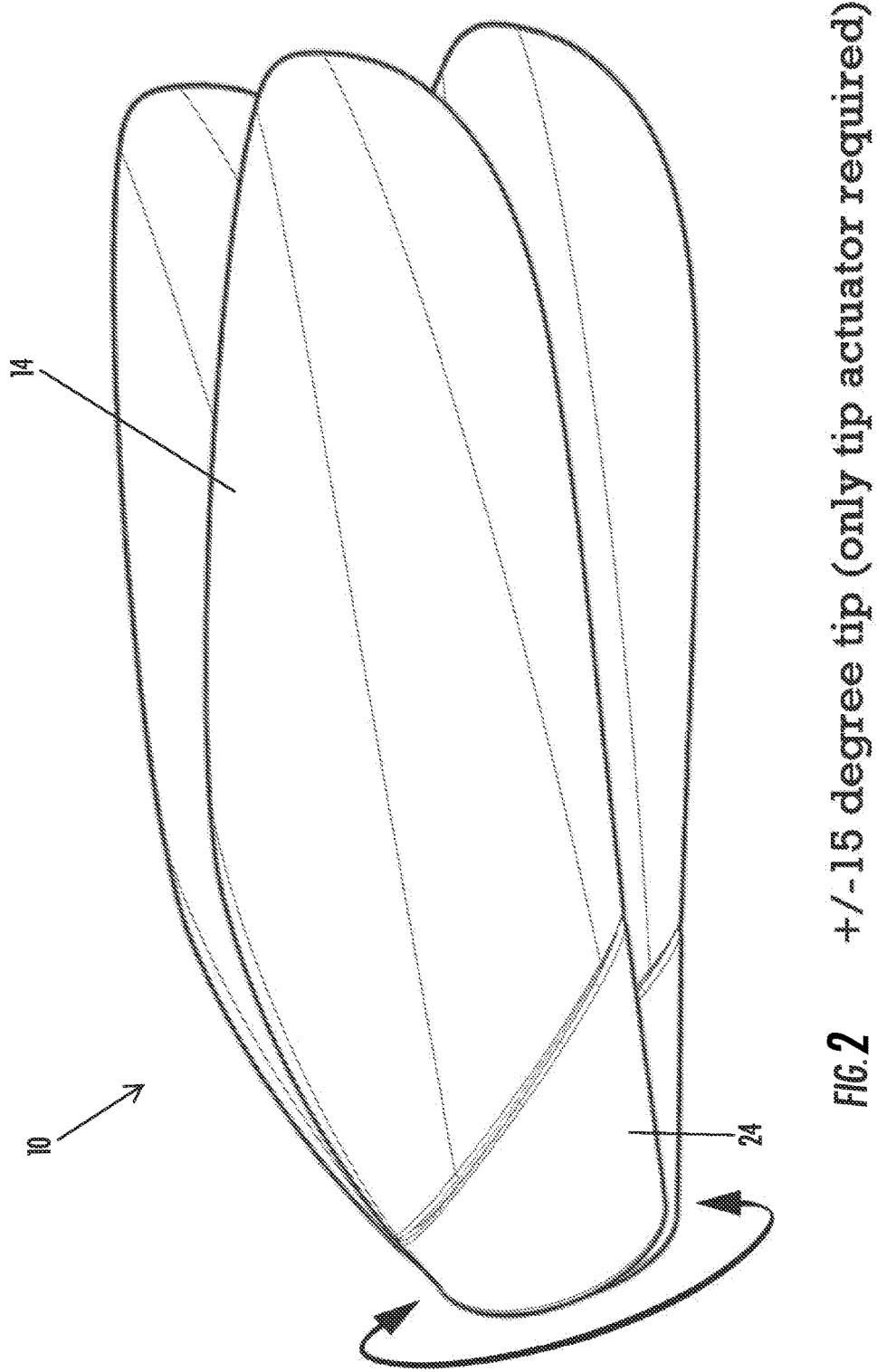
FIG. 2 +/-15 degree tip (only tip actuator required)

Horizontal Adjustment - both actuators function together at different speeds to maintain constant tip angle.

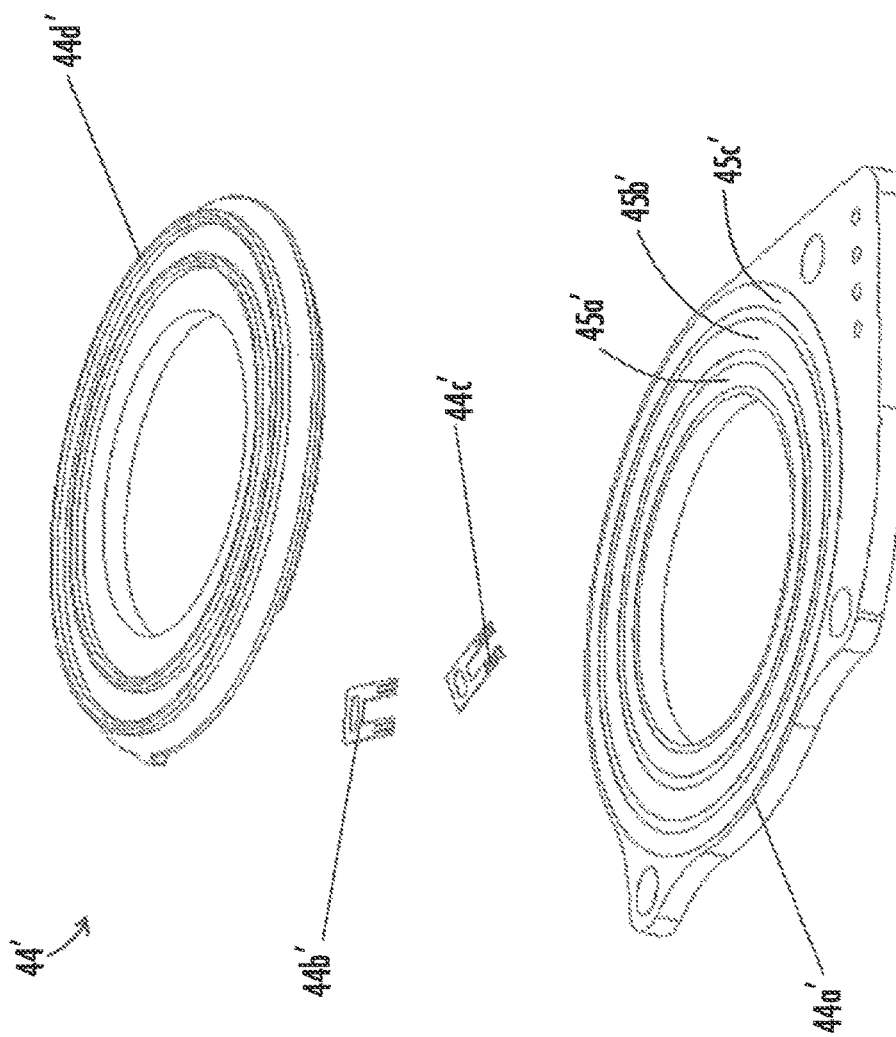

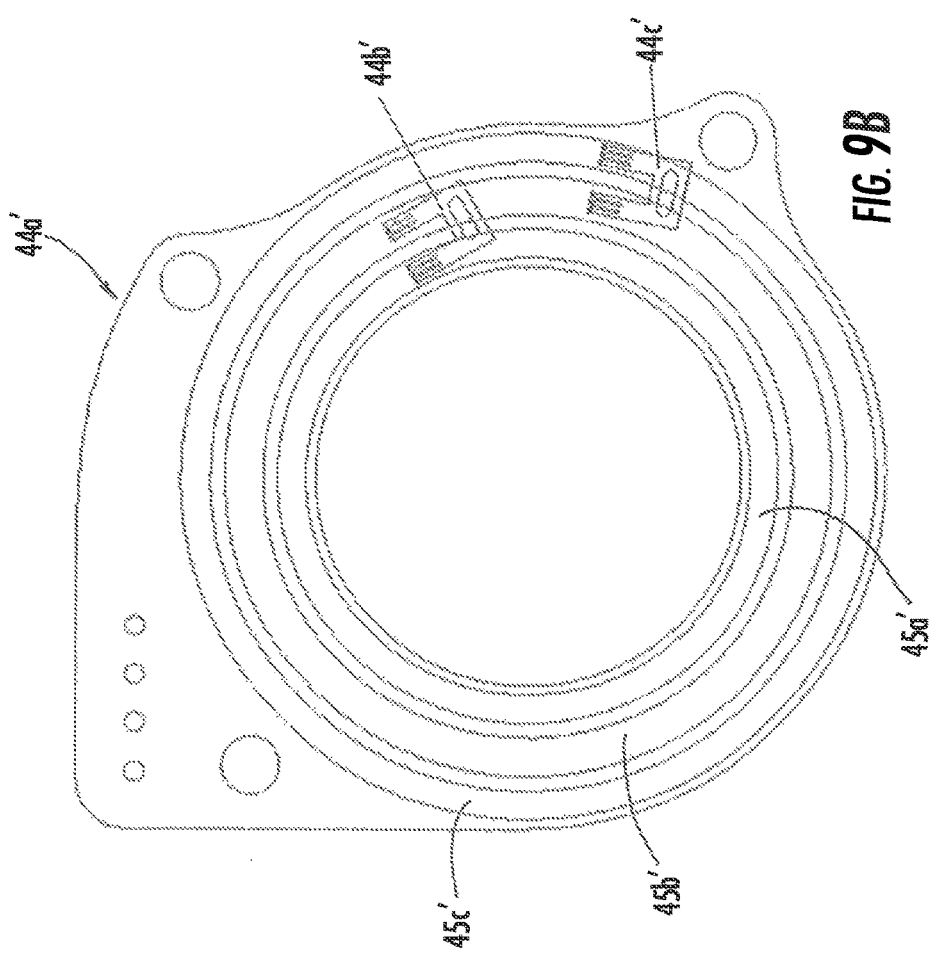

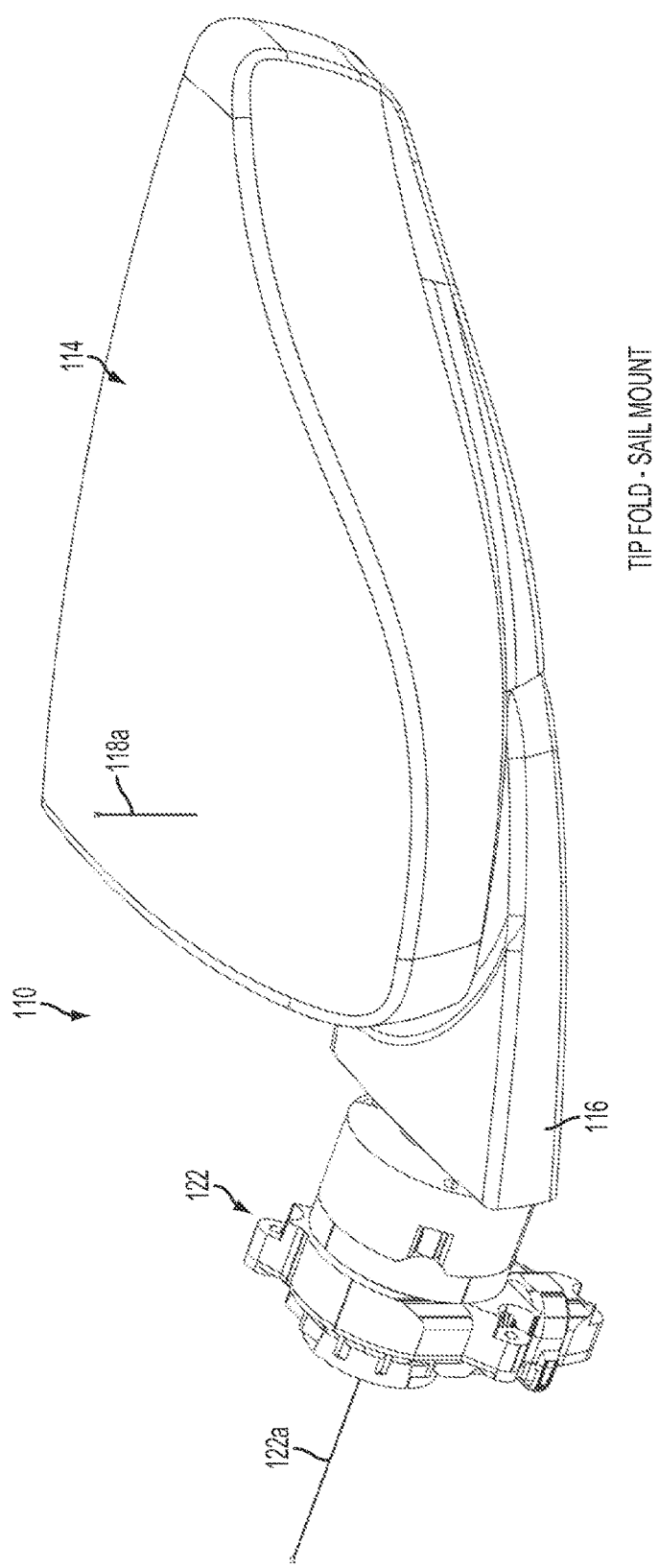

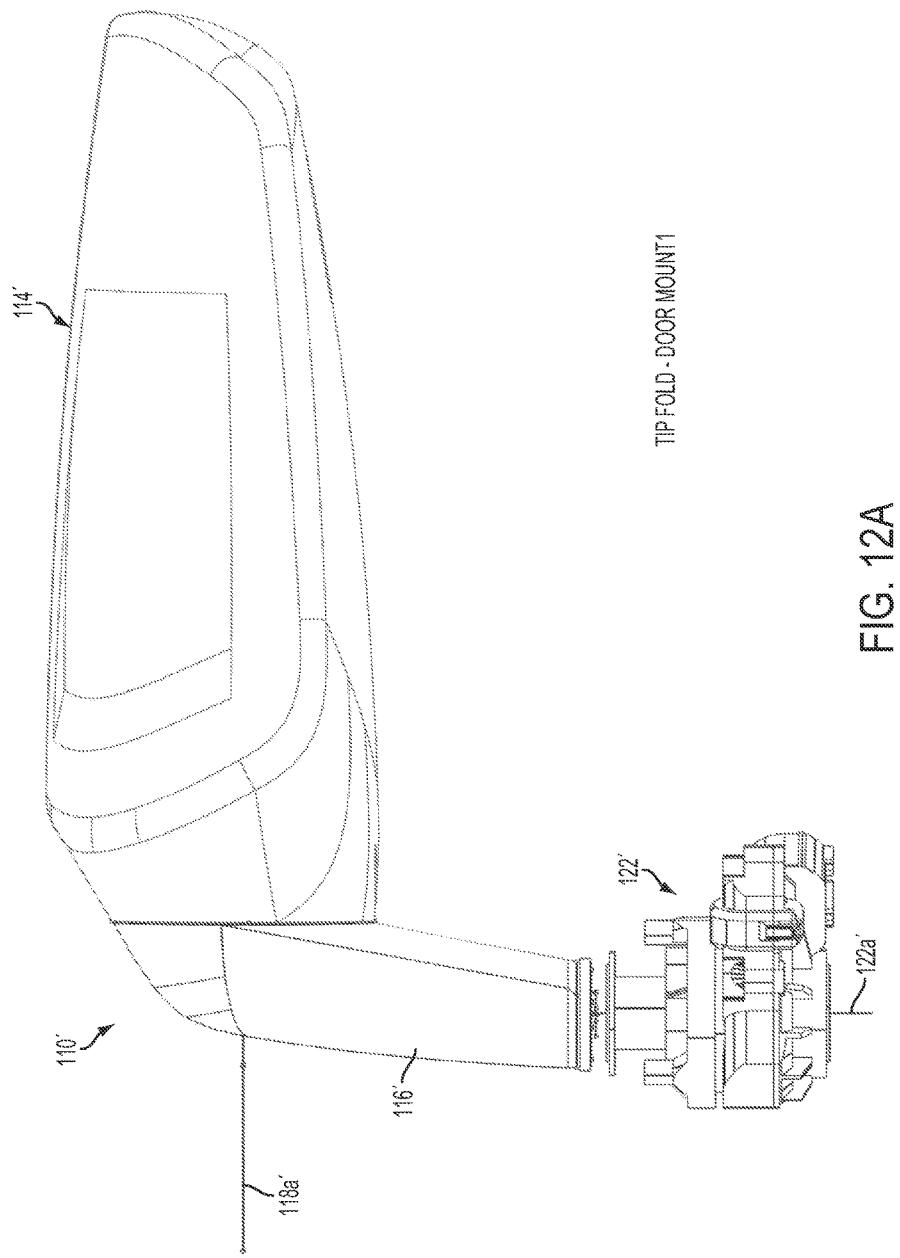

TIP FOLD - DOOR MOUNT

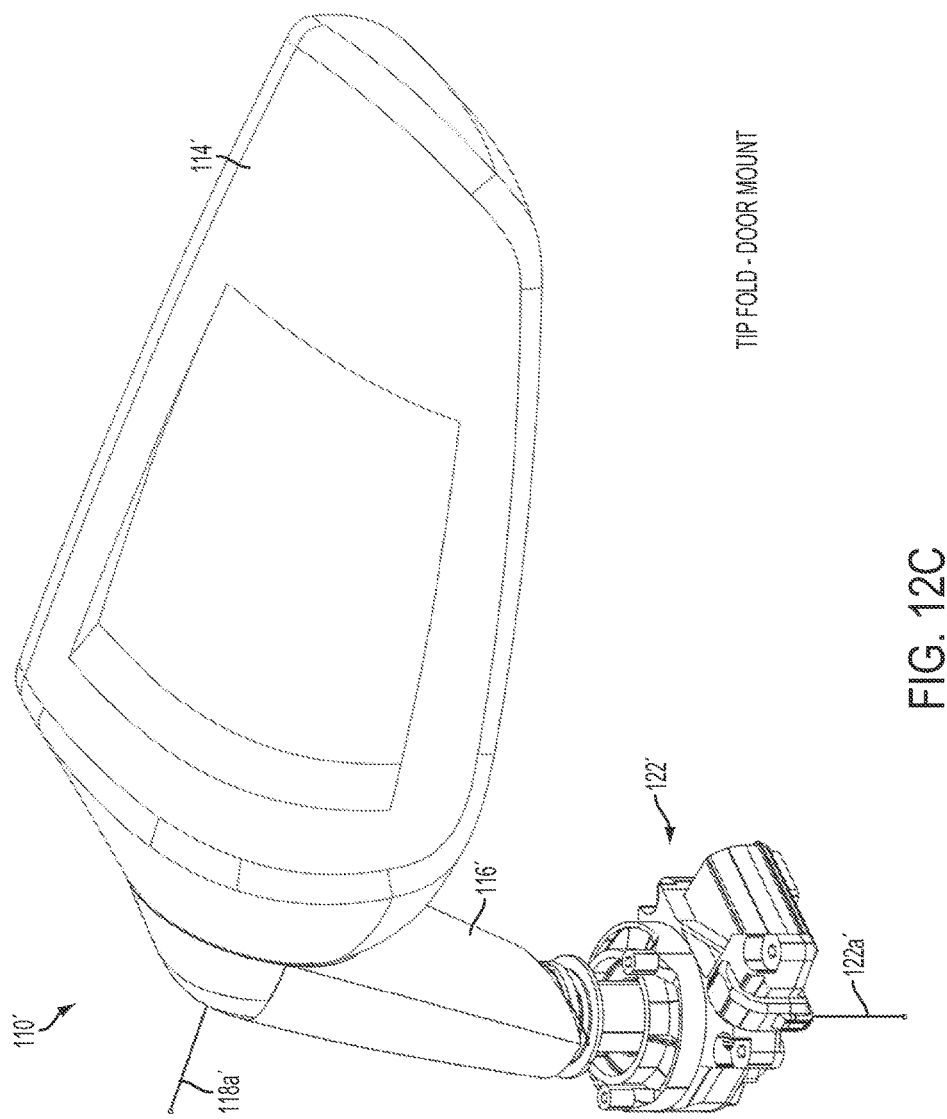

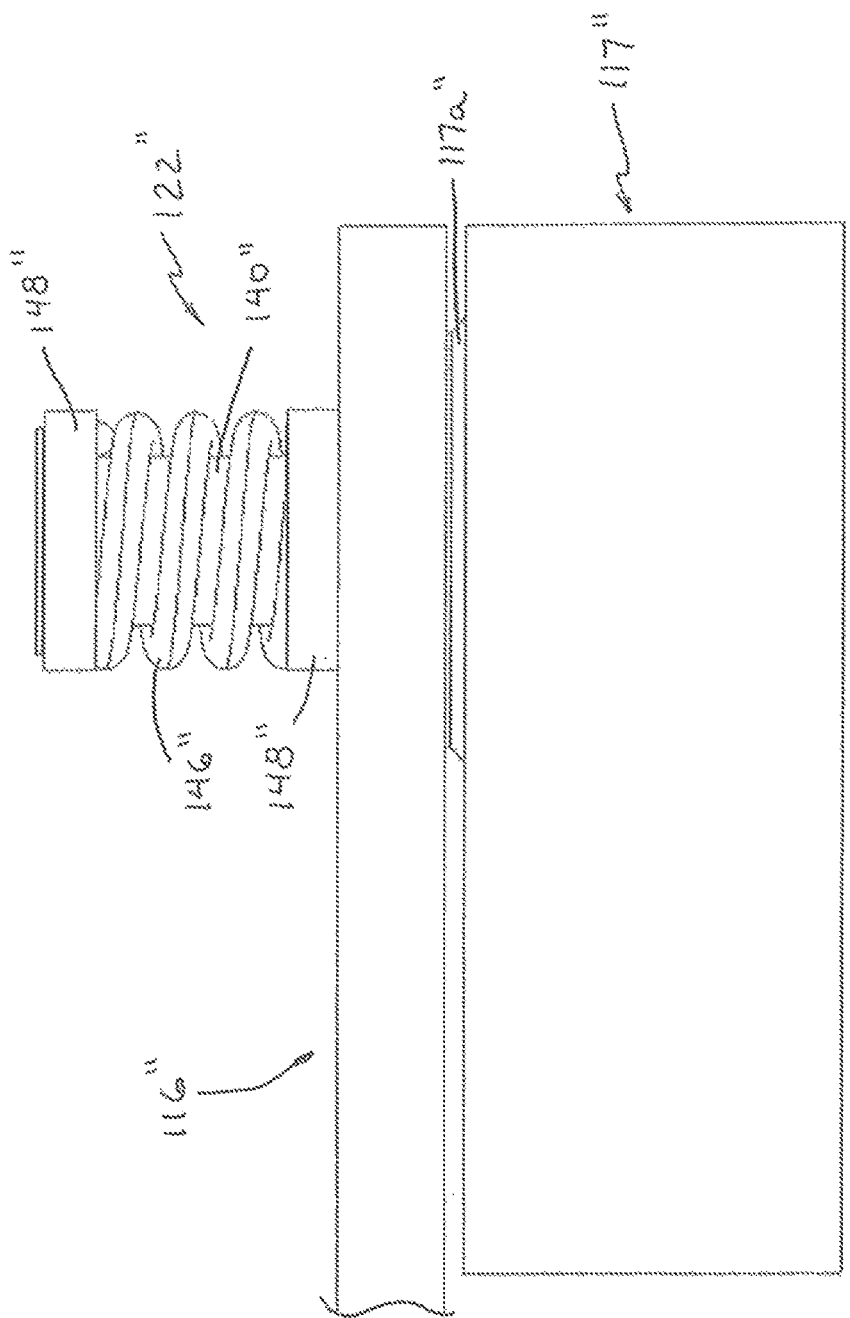

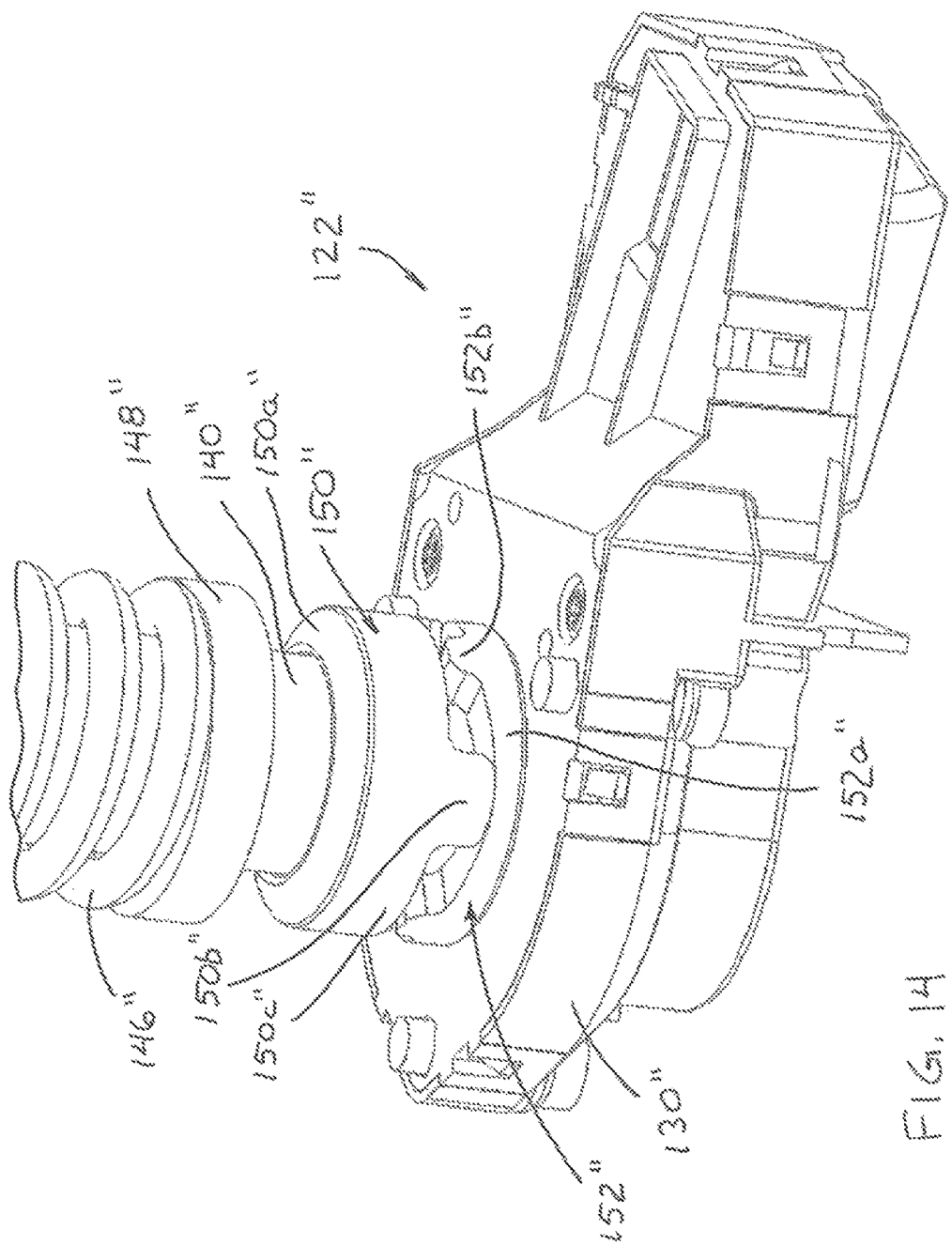

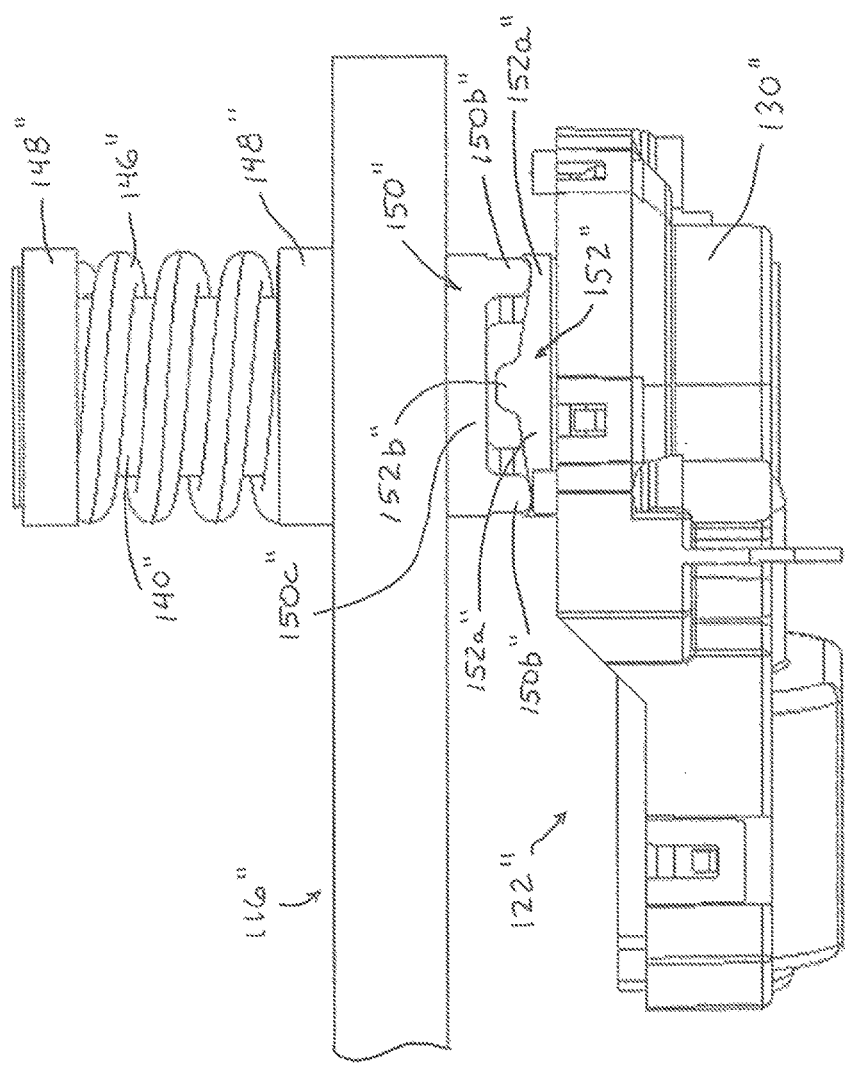

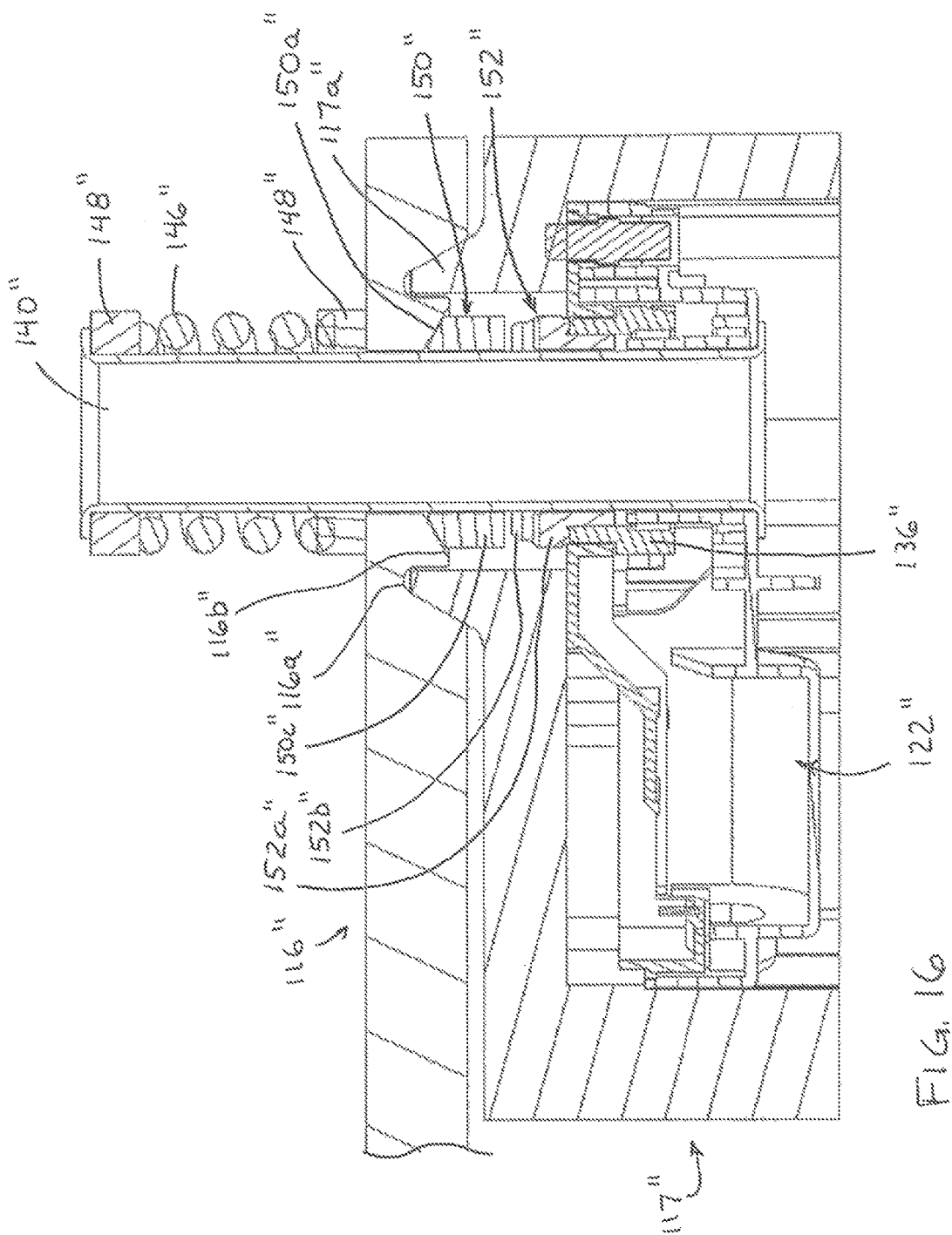

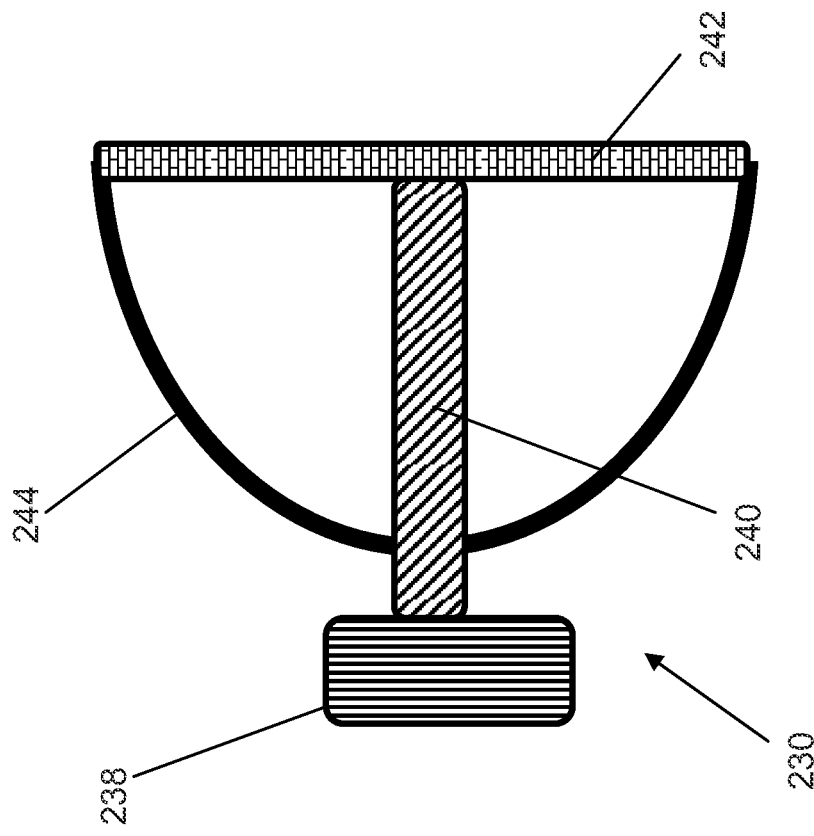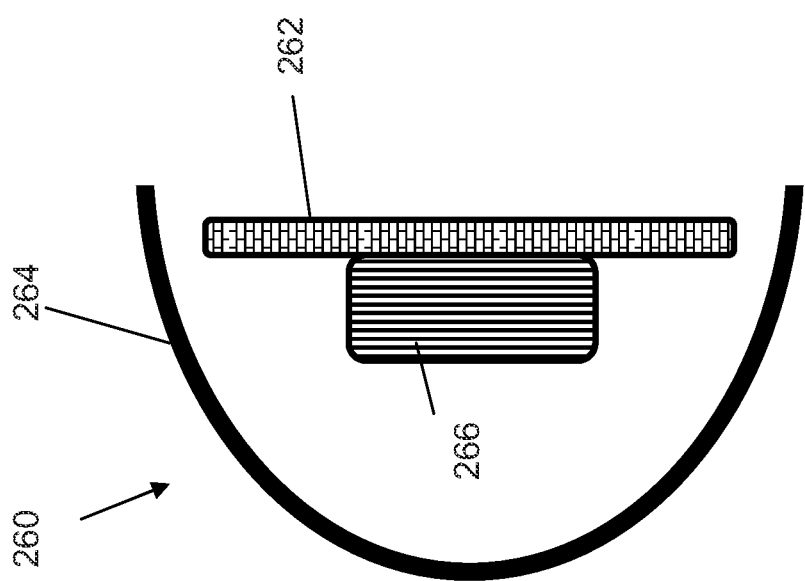

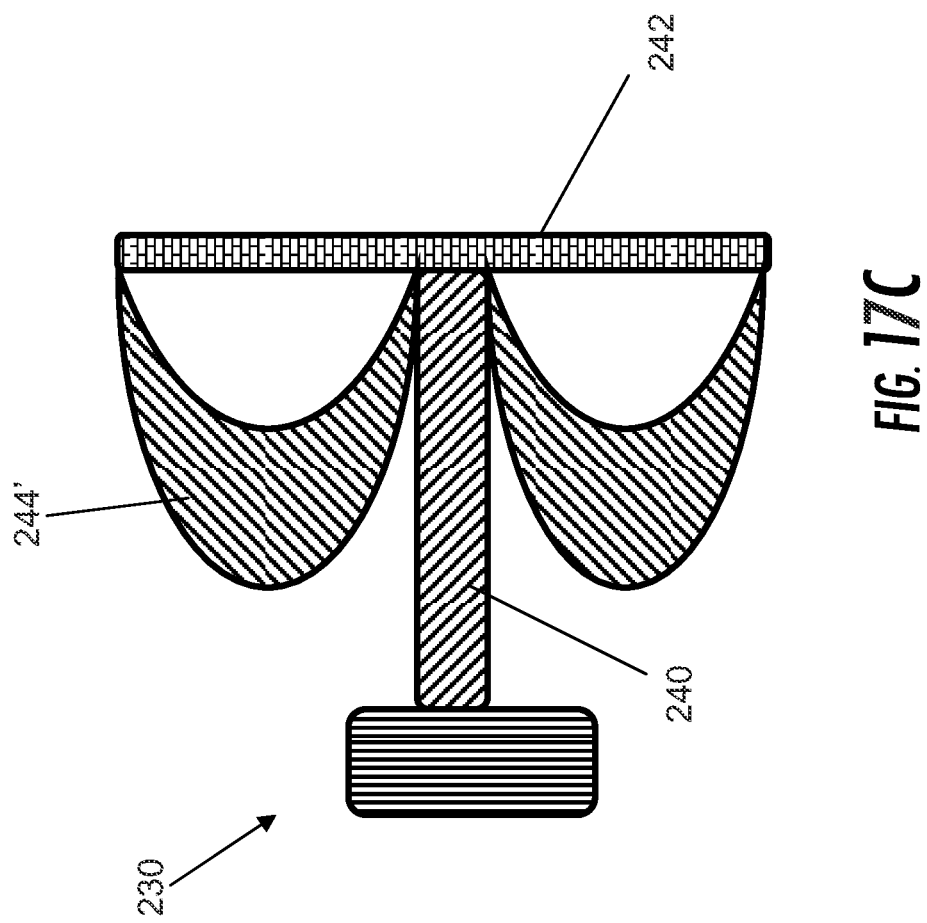

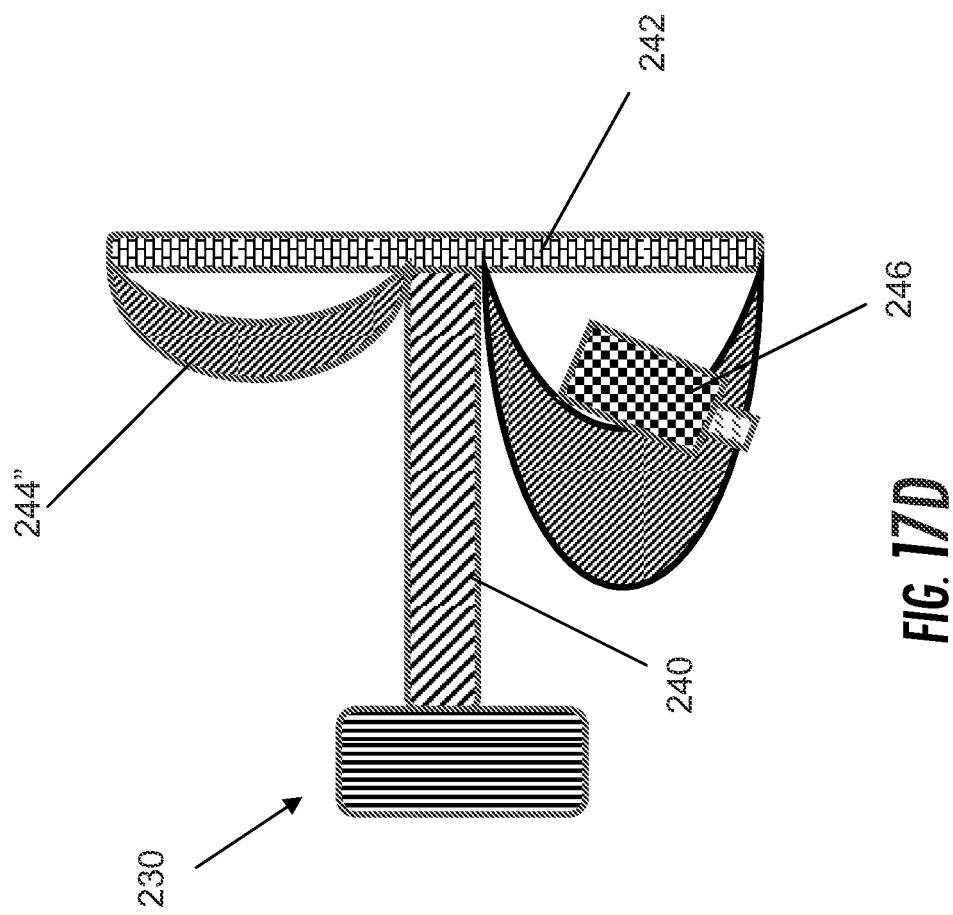

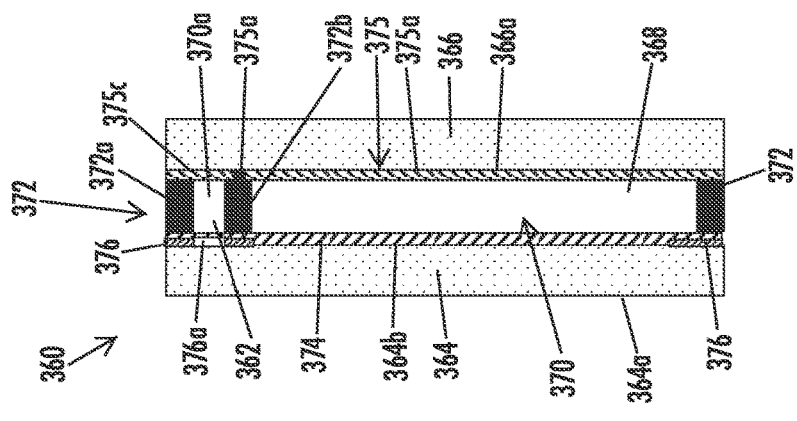
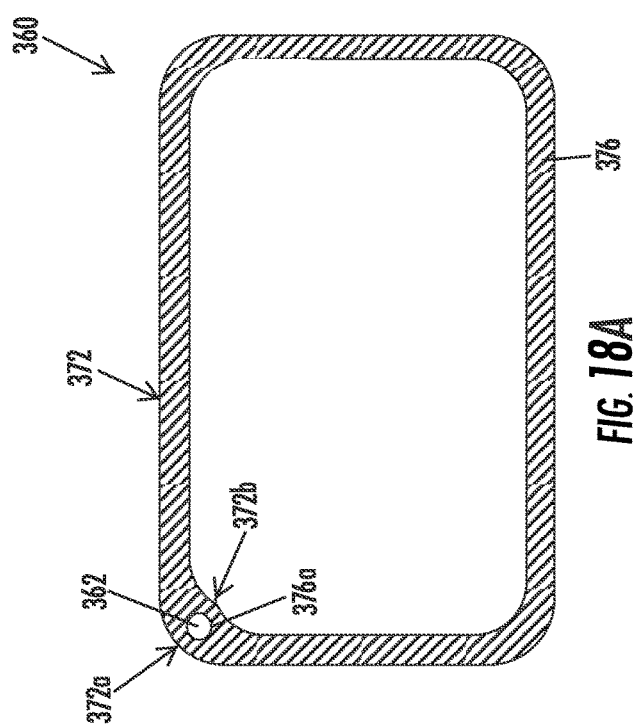
FIG. 18A
FIG. 18B

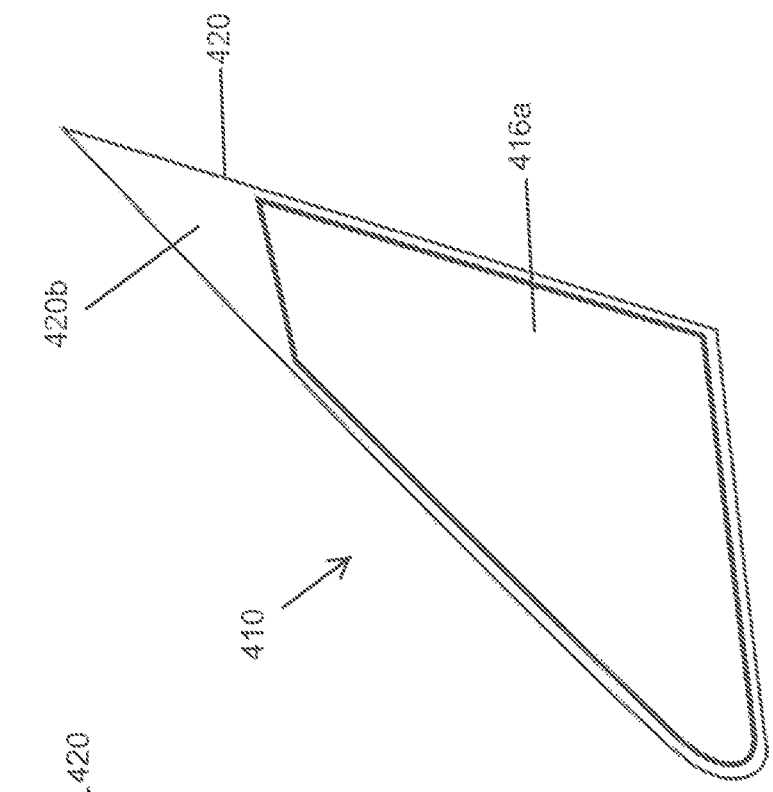
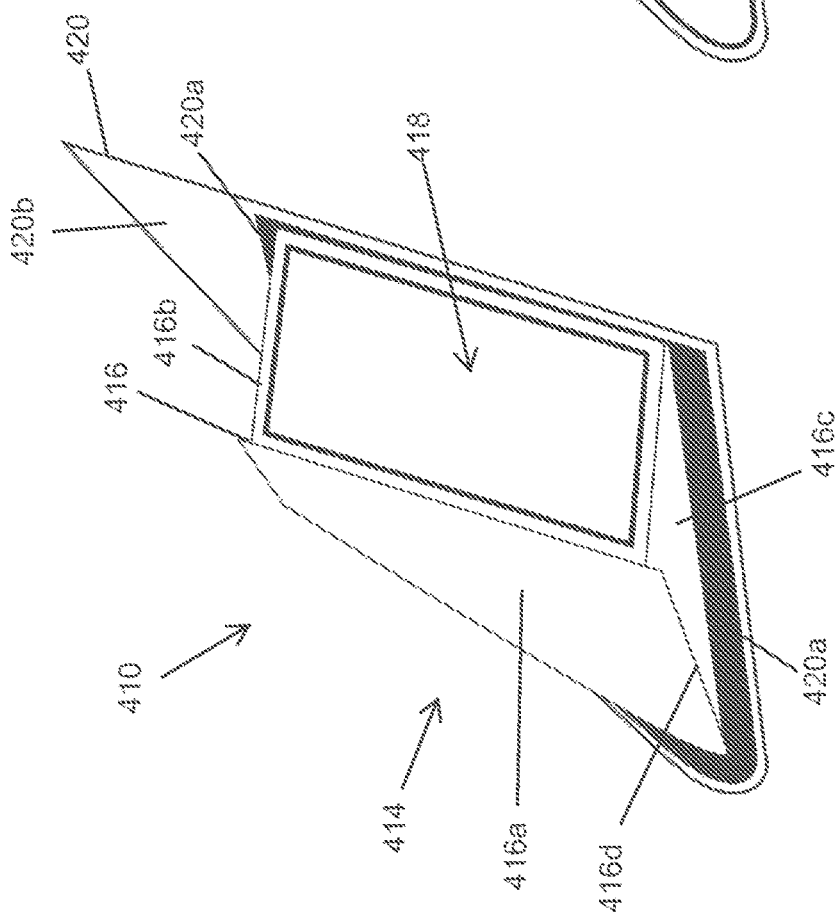

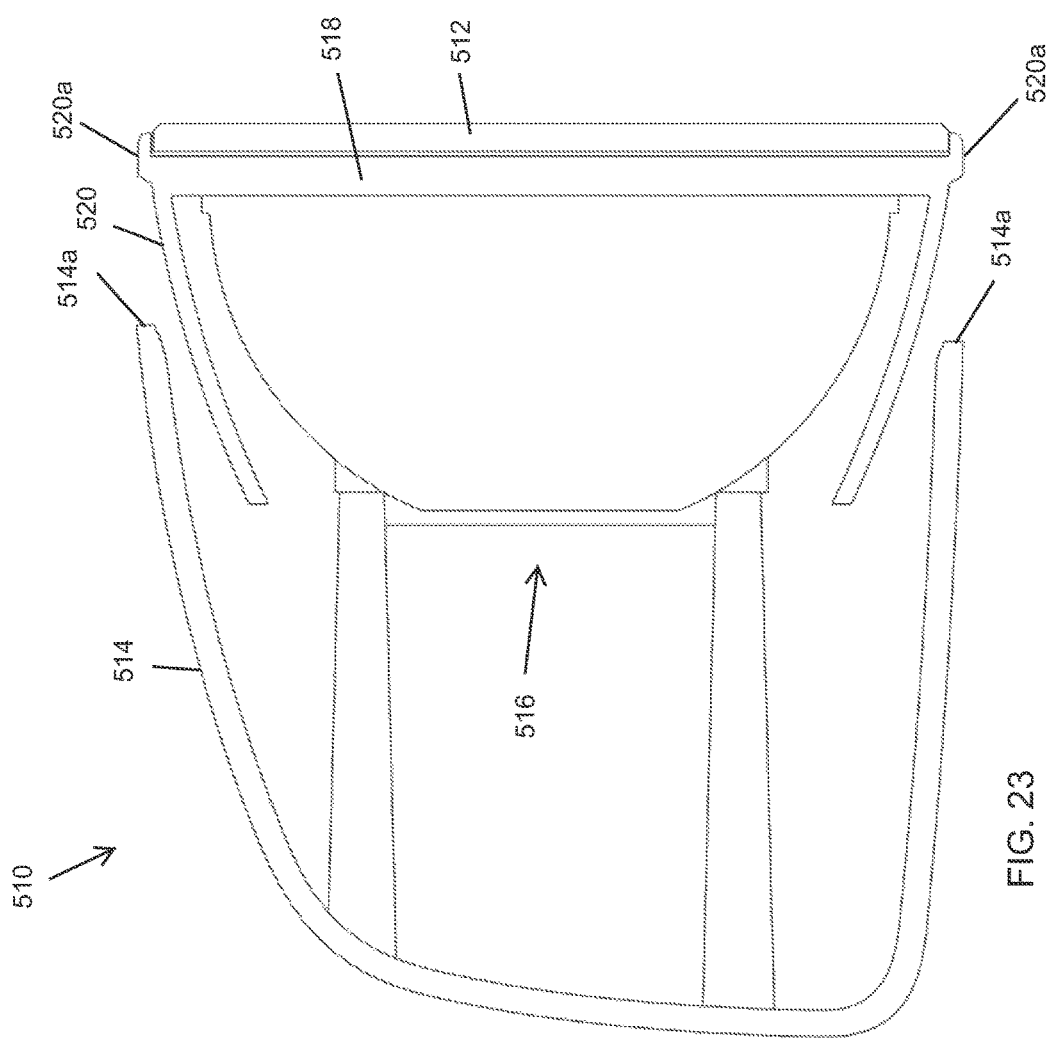

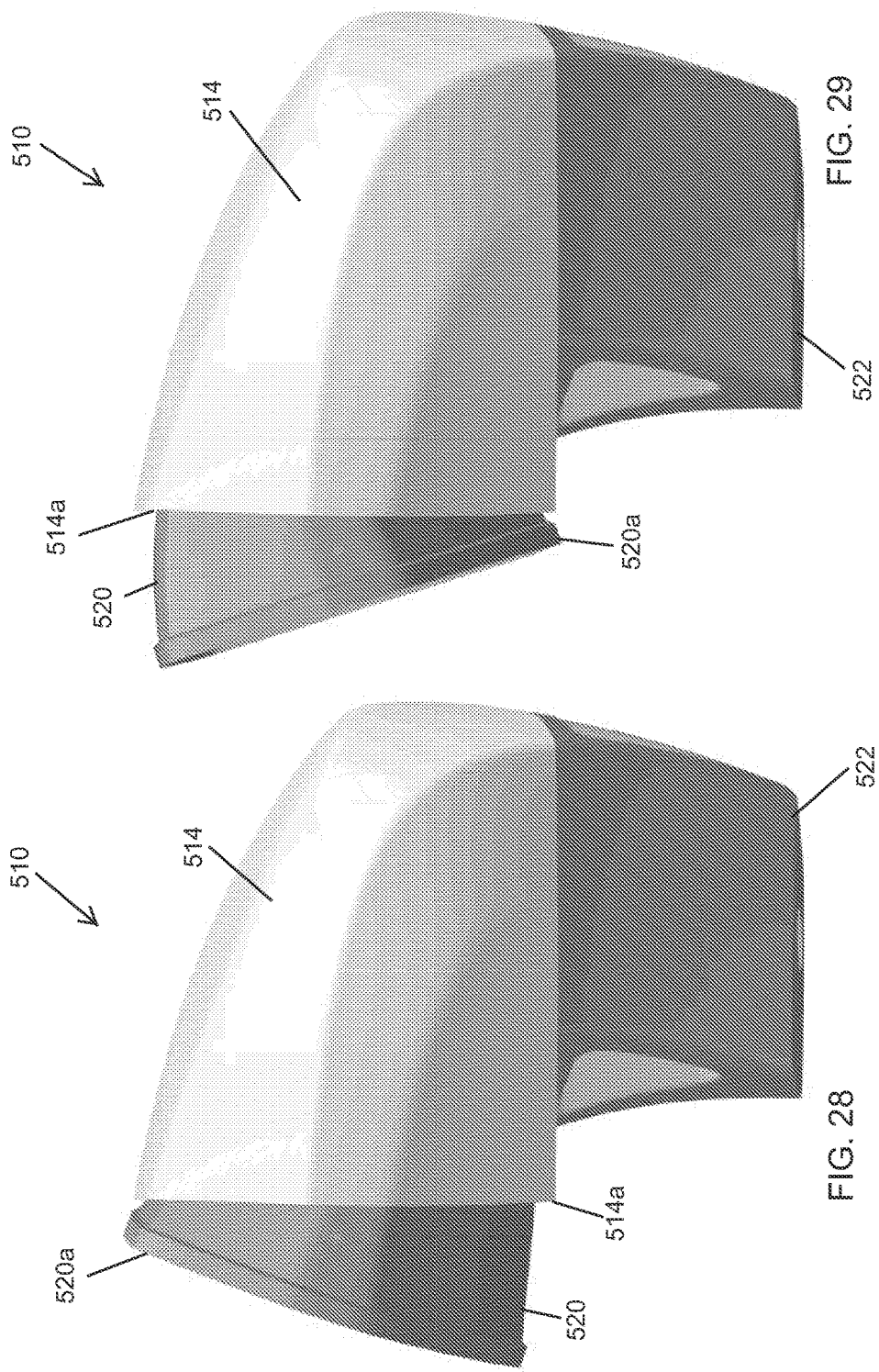

EXTERIOR REARVIEW MIRROR ASSEMBLY

CROSS REFERENCE TO RELATED APPLICATIONS

The present application is a 371 national phase filing of PCT Application No. PCT/US2013/027346, filed Feb. 22, 2013, which claims the filing benefits of U.S. provisional applications, Ser. No. 61/758,536, filed Jan. 30, 2013; Ser. No. 61/739,986, filed Dec. 20, 2012; Ser. No. 61/705,876, filed Sep. 26, 2012; Ser. No. 61/697,554, filed Sep. 6, 2012; Ser. No. 61/665,509, filed Jun. 28, 2012; Ser. No. 61/664,438, filed Jun. 26, 2012; Ser. No. 61/647,179, filed May 15, 2012; Ser. No. 61/614,877, filed Mar. 23, 2012; and Ser. No. 61/601,756, filed Feb. 22, 2012, which are hereby incorporated herein by reference in their entireties. The present application is a continuation-in-part of U.S. patent application Ser. No. 14/357,025, filed May 8, 2014, which is a 371 national stage filing of PCT Application No. PCT/US2012/064398, filed Nov. 9, 2012, which is hereby incorporated herein by reference in its entirety, and which claims priority of U.S. provisional applications, Ser. No. 61/705,876, filed Sep. 26, 2012; Ser. No. 61/697,554, filed Sep. 6, 2012; Ser. No. 61/665,509, filed Jun. 28, 2012; Ser. No. 61/664,438, filed Jun. 26, 2012; Ser. No. 61/647,179, filed May 15, 2012; Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011. The present application is a continuation-in-part of Ser. No. 13/023,747, filed Feb. 9, 2011, which claims priority of U.S. provisional application Ser. No. 61/303,042, filed Feb. 10, 2010.

FIELD OF THE INVENTION

The present invention relates generally to the field of rearview mirror assemblies for vehicles and, more particularly, to an exterior rearview mirror assembly that is operable to adjust a rearward field of view of the driver of the vehicle.

BACKGROUND OF THE INVENTION

Typically, an exterior rearview mirror assembly includes a mirror actuator that is operable to adjust a mirror reflective element relative to the mirror casing so as to adjust a rearward field of view of the driver of the vehicle. Powerfold exterior mirror assemblies include an actuator that pivots or folds the mirror casing relative to the side of the vehicle.

SUMMARY OF THE INVENTION

The present invention provides an exterior rearview mirror assembly configured for mounting at an exterior portion of a vehicle. The exterior rearview mirror assembly includes two actuators that are operable to pivot and adjust the mirror head relative to the side of the vehicle so as to provide a mirror reflective element adjustment to adjust the rearward field of view of the driver of the vehicle and to provide a powerfold adjustment to move the mirror head relative to the side of the vehicle.

According to an aspect of the present invention, an exterior rearview mirror assembly includes a base configured for attachment at an exterior portion of a vehicle and a mirror head attached at the base and pivotable relative to the base. The mirror head includes a mirror reflective element. A first actuator is operable to pivot or move the base relative to the exterior portion of the vehicle about a first axis, and a second actuator operable to pivot or move the mirror head relative to the base about a second axis. The first and second actuators are cooperatively operable to pivot or move the base about the first axis and to pivot or move the mirror head about the second axis to adjust the mirror reflective element relative to the exterior portion of the vehicle to adjust the rearward field of view of a driver of the vehicle. The first and second actuators may be operable at different rotational speeds to adjust the rearward field of view of the driver of the vehicle. The first and second pivot axes may be angled relative to one another at an angle of between about 15 degrees and about 90 degrees.

These and other objects, advantages, purposes and features of the present invention will become apparent upon review of the following specification in conjunction with the drawings.

BRIEF DESCRIPTION OF THE DRAWINGS

FIGS. 1A and 1B are exploded perspective views of the exterior rearview mirror assembly of FIG. 1;

FIG. 2 is a rear perspective view of the exterior rearview mirror assembly of FIG. 1, showing the tip/tilt of the mirror head via pivotal movement about a second pivot axis of the mirror assembly;

FIG. 9A is an exploded perspective view of a memory device of the mirror assembly of the present invention;

FIG. 9B is a plan view of the contact rings of the memory device of FIG. 9A established at the circuit element of the mirror assembly, shown with the contacts disposed thereat;

FIGS. 11A-D are views of another exterior rearview mirror assembly in accordance with the present invention;

FIGS. 12A-D are views of another exterior rearview mirror assembly in accordance with the present invention;

FIG. 13 is a side elevation of an actuator having a friction coupler in accordance with the present invention;

FIG. 14 is a perspective view of the actuator of FIG. 13;

FIG. 15 is another side elevation of the actuator of FIG. 13, with the base portion removed to show additional details;

FIG. 16 is a sectional view of the actuator of FIG. 13, shown attached at the mirror base and mirror mounting arm or bracket;

FIG. 17A is a side view schematic of the exterior rearview mirror system of FIG. 17;

FIG. 17B is a side view schematic of a known construction of an exterior rearview mirror assembly;

FIG. 17C is a side view schematic of another exterior rearview mirror system of the present invention;

FIG. 17D is a side view schematic of another exterior rearview mirror system of the present invention;

FIG. 18A is a plan view of an exterior rearview mirror assembly with an indicator established thereat in accordance with the present invention;

FIG. 18B is a sectional view of the exterior rearview mirror assembly of FIG. 18A;

FIGS. 19 and 20 are perspective views of another exterior rearview mirror assembly of the present invention, shown in its extended or non-flush or use state;

FIGS. 21 and 22 are perspective view of the exterior rearview mirror assembly of FIGS. 19 and 20, shown in its retracted or flush or non-use state;

FIG. 23 is a sectional view of another exterior rearview mirror assembly of the present invention;

FIGS. 28 and 29 are side elevations of the exterior rearview mirror assembly of FIGS. 26 and 27, shown with the reflective element angled upwardly and downwardly, respectively;

DESCRIPTION OF THE PREFERRED EMBODIMENTS

Figure 1:
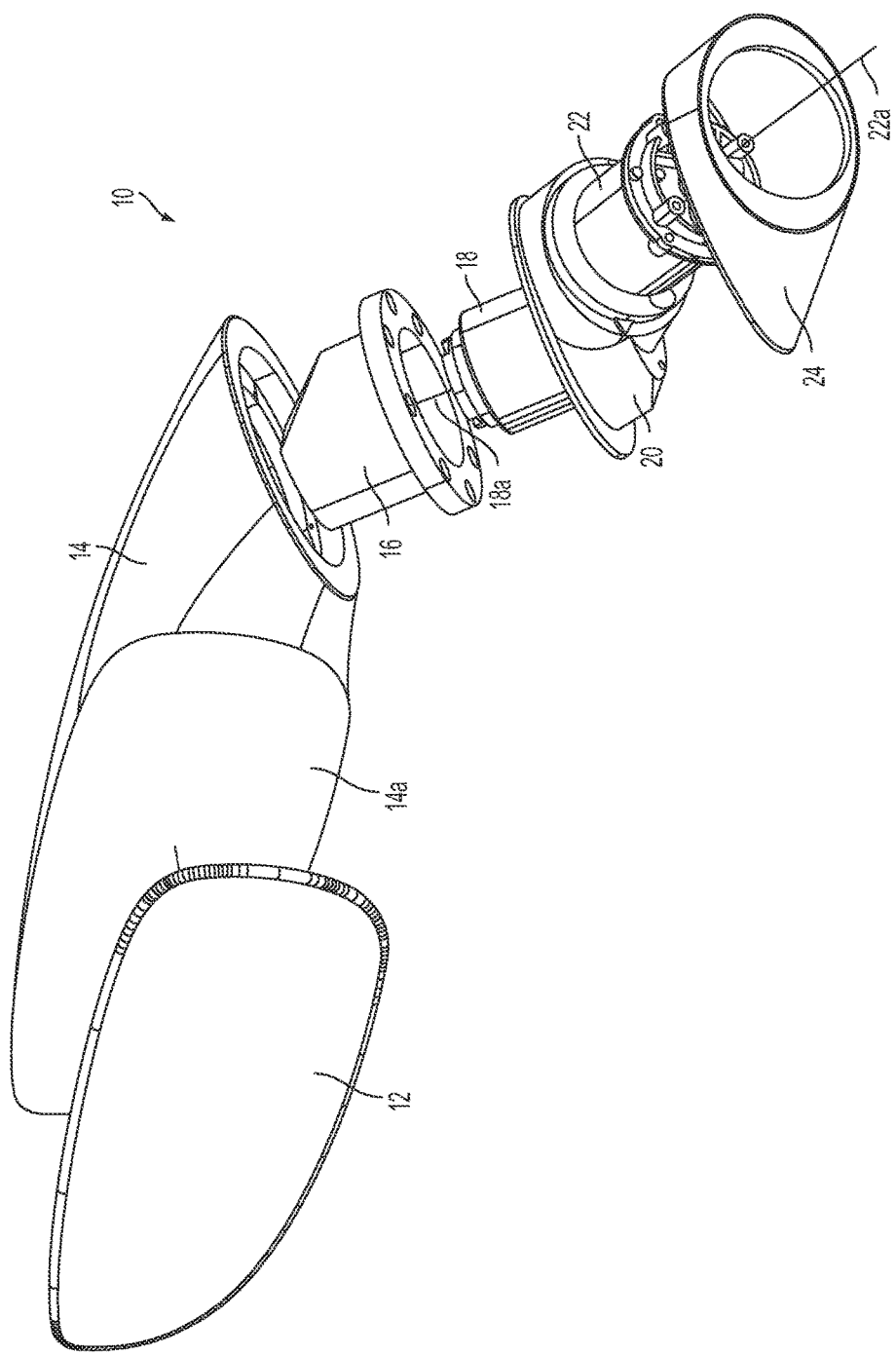
FIG. 1 is an exploded perspective view of an exterior rearview mirror assembly in accordance with the present invention.

Referring now to the drawings and the illustrative embodiments depicted therein, an exterior rearview mirror assembly of the present invention may comprise dual actuators and dual pivot axes for adjusting a mirror head and reflective element relative to a side of a vehicle at which the mirror assembly is mounted. For example, and with reference to FIGS. 1-3B, an exterior rearview mirror assembly 10 comprises a reflective element 12 (such as a generally planar or bent reflective element and such as an electrochromic reflective element or a flat glass or curved glass reflective element, such as a flat or curved reflective element having a single flat or planar or curved or convex curved glass substrate or having two flat or curved substrates or the like) that is attached at a rear attaching portion 14a of a mirror head housing 14. In the illustrated embodiment, the reflective element is adhered at a rear attaching portion or surface 14a (which may comprise a generally planar attaching surface or a slightly curved attaching surface or the like) of the mirror head housing, with the front perimeter edge regions of the glass substrate of the reflective element being curved or rounded or ground or polished (such as a polished perimeter that is polished to a water-clear finish and having a radius of curvature of at least about 2.5 mm) to provide a convex curved smooth or continuous transition between the generally planar front surface of the reflective element and the side walls or surfaces of the mirror housing, such as in a similar manner as discussed below.

Figure 1A:
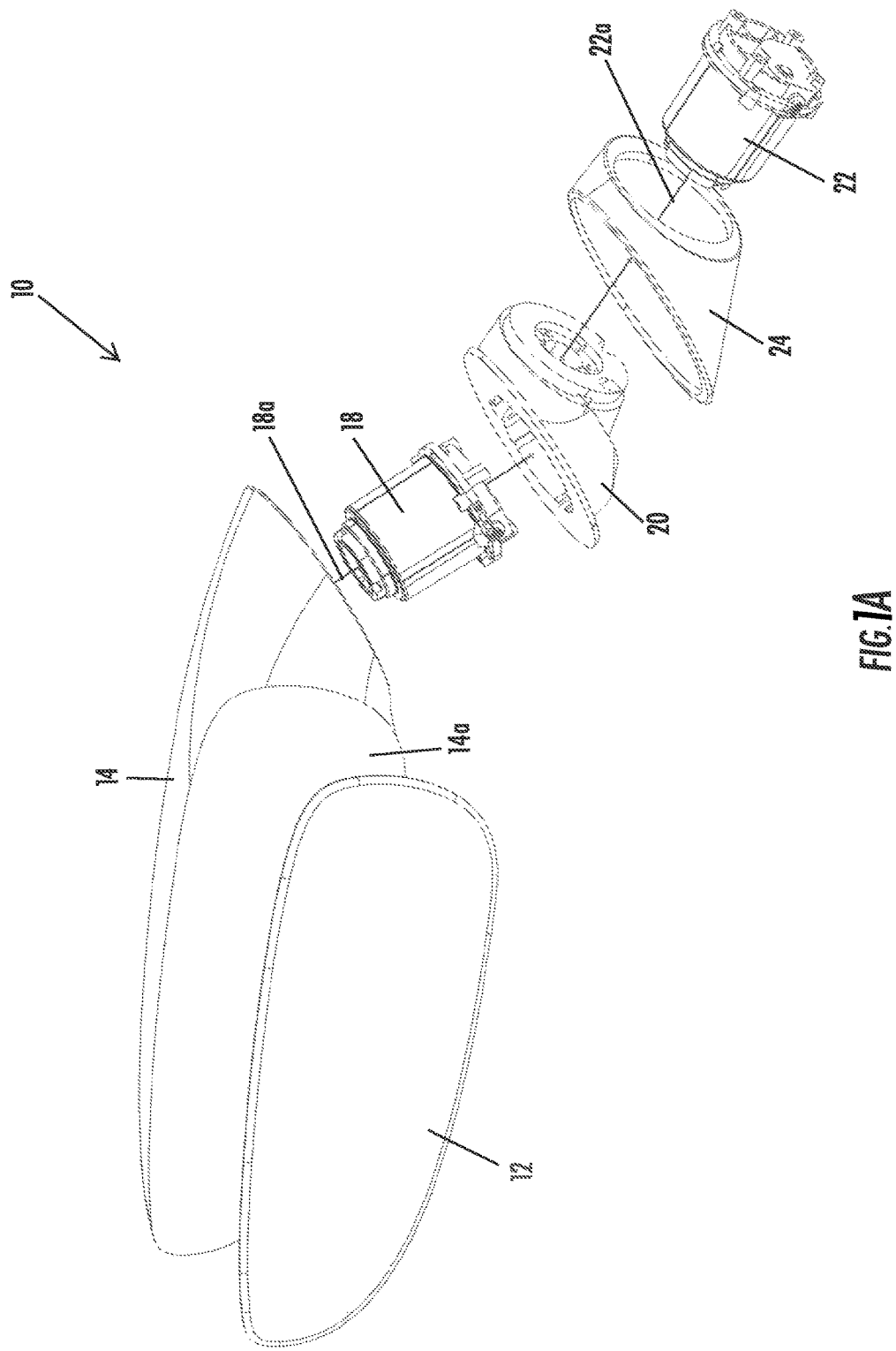

As shown in FIGS. 1, 1A and 1B, mirror head housing 14 is attached at an inner bracket or mounting element 16 that is attached at a first actuator 18, whereby rotational driving of the first actuator 18 imparts a rotation of bracket 16 and mirror head housing 14 about a first pivot axis 18a relative to an outer bracket or connector or mounting arm or intermediate arm 20. First actuator 18 is attached to or mounted at the outer bracket 20, which is mounted to or attached to a second actuator 22, which is attached at or disposed at or in an outer cover 24. Thus, rotational driving of second actuator 22 imparts a rotation of bracket 20 and first actuator 18 and bracket 16 and mirror head housing 14 about a second pivot axis 22a relative to the base of the mirror assembly and/or the side of the vehicle at which the mirror assembly is mounted. The outer cover 24 is disposed at or attached to or mounted at the side portion of the vehicle (and pivotally or rotatably mounted thereat, such as via the actuator 22, which has its inner end attached at a structure that is fixed relative to the vehicle) when the exterior mirror assembly is normally mounted at the side of the vehicle.

When so mounted, the mirror head is adjustable about the first and second axes (via selective actuation of one or both actuators) to adjust the rearward field of view for the driver of the vehicle. For example, and with reference to FIG. 2, when the second actuator 22 is selectively operated to rotate or pivot outer bracket 20 relative to the side of the vehicle, the mirror head housing 14 is pivoted about the second pivot axis 22a to vertically adjust the rearward field of view for the driver of the vehicle (such as, for example, within about a +/−15 degree range of pivotal adjustment). Also, and with reference to FIGS. 3A and 3B, when the first actuator 18 is selectively operated to rotate or pivot inner bracket 16 relative to outer bracket 20, the mirror head housing 14 is pivoted about the first pivot axis 18a to laterally adjust the rearward field of view (such as, for example, within about a +/−60 degree range of pivotal adjustment). The pivot axes may be angled relative to one another to provide the desired cooperative pivoting of the mirror head and reflective element relative to the side of the vehicle at which the mirror assembly is mounted. For example, the pivot axes may be angled relative to one another at an angle of at least about 15 degrees or at least about 30 degrees or more, such as an angle of up to about 90 degrees, depending on the particular application of the mirror assembly. The operation of the actuators and the operational speed of the actuators may be selected to provide the desired adjustment of the mirror head and reflective element depending on the particular relative angle of the pivot axes and/or the angle of the second pivot axis 22a relative to the side of the vehicle and/or the angle of the first pivot axis 18*a* relative to the second pivot axis and/or relative to the side of the vehicle.

Because of the angled relationship of the axes of rotation of the actuators and the angled interface or mounting interface of the mirror head housing 14 and outer cover 24, the first and second actuators may be operated together or cooperatively operated to laterally adjust the rearward field of view while maintaining a generally constant tip angle (and without also vertically adjusting the rearward field of view of the reflective element). Thus, when the mirror has been adjusted so that the reflective element has the desired vertical adjustment (via operation of the second actuator 22), a user may laterally adjust the mirror to laterally adjust the rearward field of view of the reflective element, whereby both actuators 18 and 22 may operate to pivot the mirror head about both pivot axes 18*a*, 22*a* so that the mirror head is pivoted toward or away from the side of the vehicle while limiting vertical adjustment of the rearward field of view of the reflective element. For example, and as can be seen with reference to FIG. 3B, if the mirror head 14 is pivoted about pivot axis 22*a* in the direction A, then the outer cover 24 may concurrently be pivoted about pivot axis 18*a* in the direction B, such that the mirror head may have limited or reduced vertical adjustment as it is laterally adjusted relative to the side of the vehicle (so that the mirror head is moved generally in the direction C in FIG. 3B).

Optionally, and desirably, the actuators 18, 22 may operate at different speeds to provide the desired or selected lateral adjustment with limited vertical adjustment (and/or to provide a desired or selected vertical adjustment with limited lateral adjustment and/or to provide a desired or selected vertical and lateral adjustment). The actuators may be controlled by a control or control system that receives an input from a user actuatable device (such as a directional keypad or joystick control common for controlling known exterior mirror actuators) and that may automatically control one or both of the actuators at the desired directions and/or speeds to provide the desired or selected adjustment of the mirror head and reflective element. The control may be operable to determine the appropriate adjustment speeds and degree of adjustment for the actuators to provide the desired adjustment in a manner that appears (to a person viewing the mirror assembly during a lateral adjustment of the mirror head) to be a smooth lateral adjustment of the mirror reflective element. The selected or appropriate speeds and adjustment ranges or angles may vary depending on the particular application of the mirror assembly, such as the particular angle of the side of the vehicle at which the mirror assembly is mounted, and/or the interface angle of the mirror head and outer cover (relative to the angle of the side of the vehicle) and/or the relative angle between the pivot axes of the two actuators (it is envisioned that, at least for some embodiments, the tip or vertical adjustment actuator may run at a slower speed than the lateral adjustment actuator to provide a smooth adjustment of the mirror reflective element and rearward field of view).

Figure 3A:
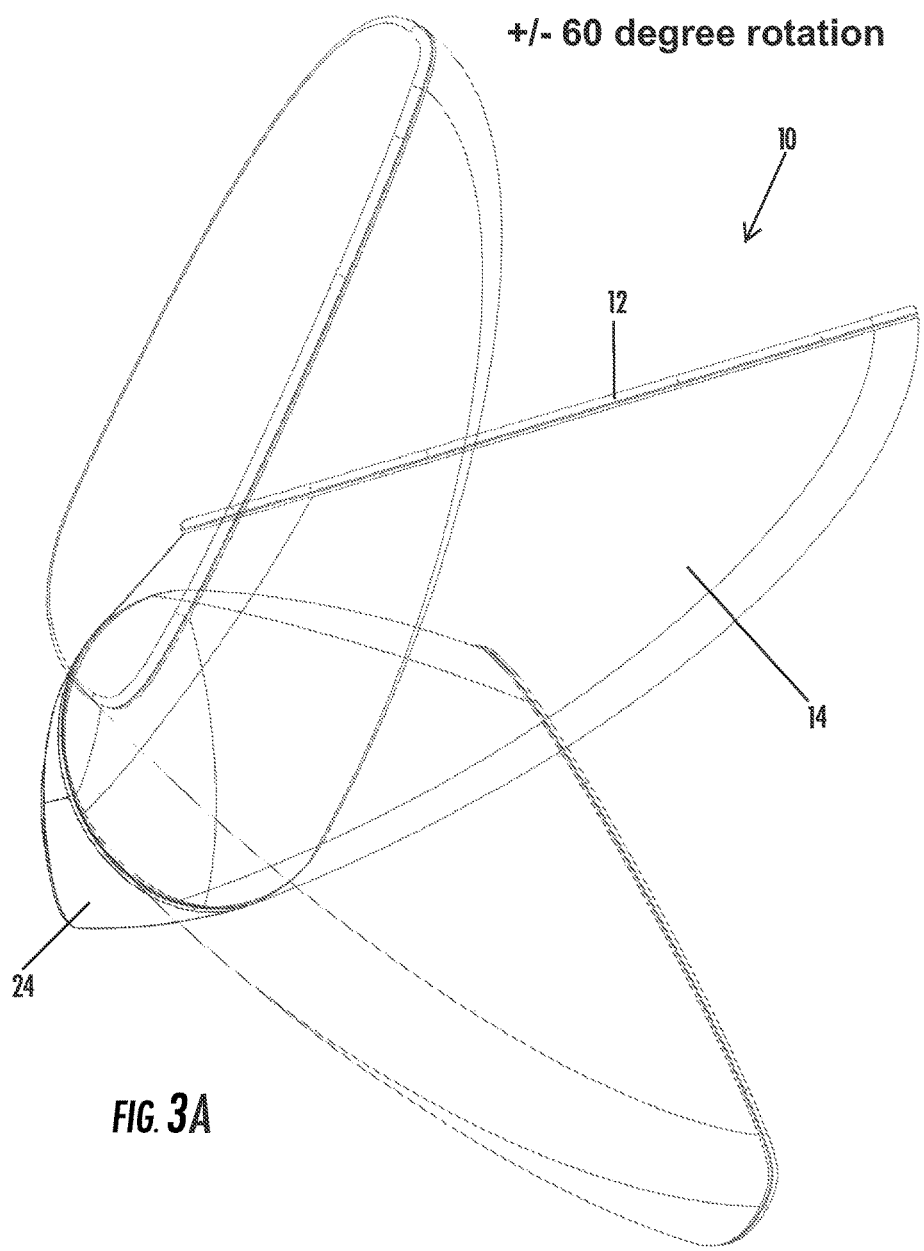
FIG. 3A is a top perspective view of the exterior rearview mirror assembly of FIG. 1, showing the rotation of the mirror head via pivotal movement about a first pivot axis of the mirror assembly.
Figure 3B:
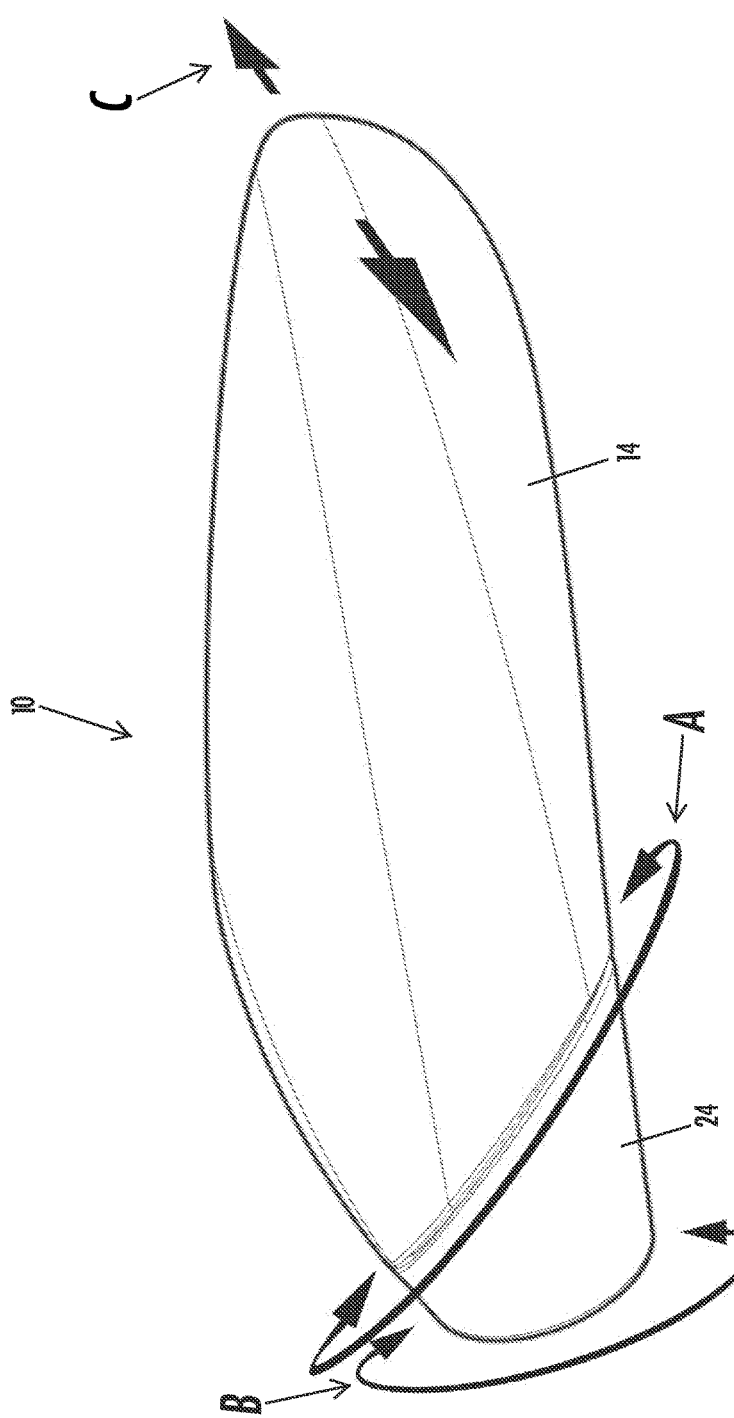
FIG. 3B is a rear perspective view of the exterior rearview mirror assembly of FIG. 1, showing the rotation of the mirror head via pivotal movement about the first and second pivot axes of the mirror assembly, in order to laterally adjust the rearward field of view of the mirror reflective element while limiting vertical adjustment of the rearward field of view of the mirror reflective element.
Figure 3C:
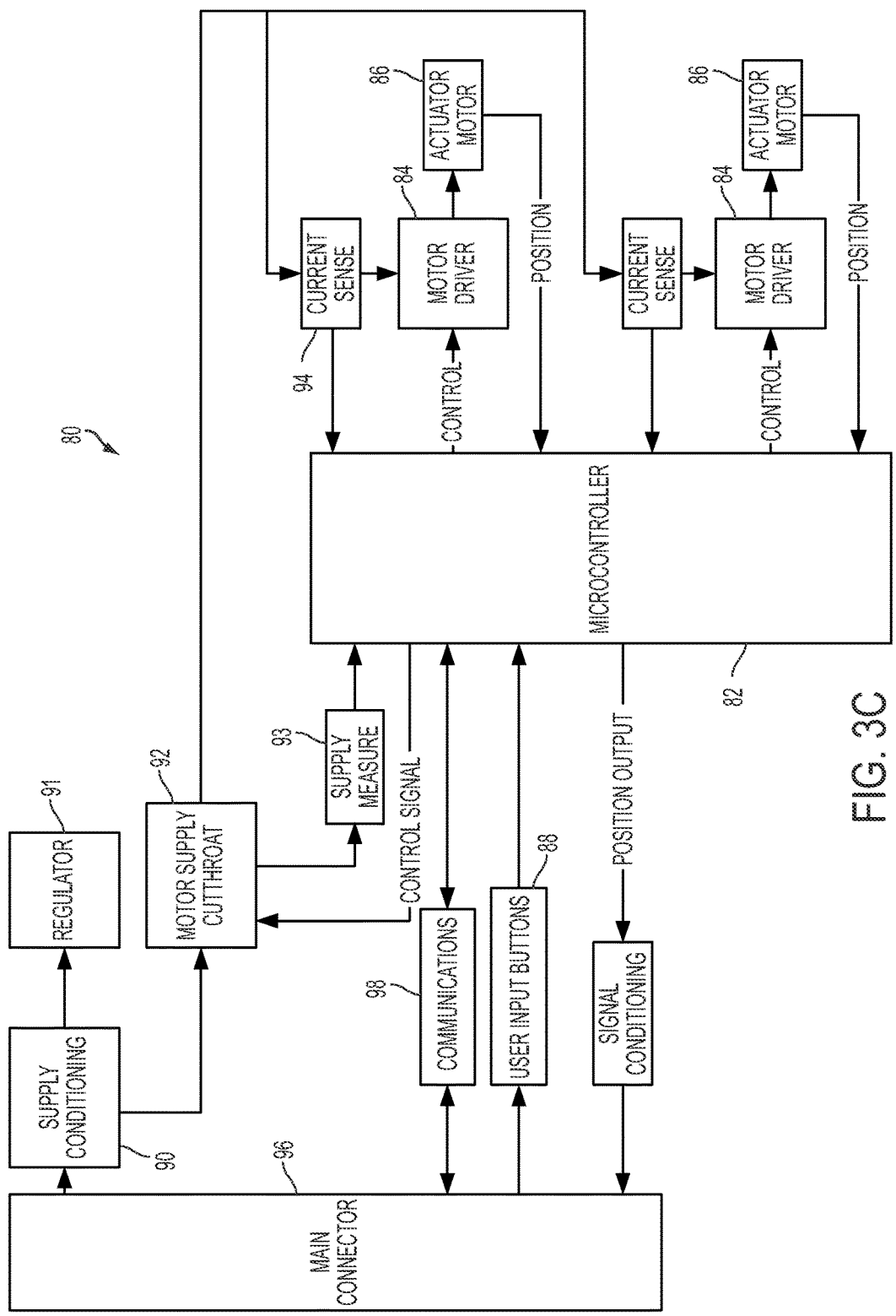
FIG. 3C is a schematic of a control system for controlling operation of the actuators of the exterior rearview mirror assembly of the present invention.

The control of the mirror assembly may be provided via any suitable control system. For example, and with reference to FIG. 3C, a control system 80 is operable to control the actuator motors to adjust the mirror head housing and the reflective element, such as in response to one or more user inputs. Control system 80 includes a controller 82 (such as a microcontroller or microprocessor or the like), which is operable to control the motor drivers 84 and actuator motors 86 responsive to one or more user inputs or buttons or switches 88. Controller 82 receives a position signal from each of the actuator motors so that the controller knows the position or angle or degree of rotation of each motor of the mirror assembly. As shown in FIG. 3C, the control system 80 includes a supply conditioning element or device 90, a regulator 91, a motor supply cutthroat 92, a supply measure 93 in communication with the controller 82 and a current sensor 94 in communication with the controller, the motor supply cutthroat and each of the motor drivers.

The configuration or architecture of the control system for the exterior rearview mirror assembly is such that the specific mechanical implementation (i.e. the relative planes of motion of each actuator) is separated from the vehicle control systems (and thus the control system of the exterior mirror assembly may plug into an electrical connector or main connector 96 of the vehicle (such as via a multi-pin connector or plug-and-socket type connector or the like), such as when the exterior rearview mirror assembly is mounted at an exterior portion of a vehicle during assembly of the vehicle. The necessary knowledge of the mechanical implementation is fully contained within the control system of the mirror assembly itself. This ensures that the vehicle control systems need not change for every application. This allows a greater degree of design and styling flexibility without affecting the vehicle control systems.

The controller board incorporates a controller or microcontroller that is responsible for overall mirror system control and status monitoring. The motion command input is received by the microcontroller either via the user input buttons or toggle or switch 88 (such as for controlling up, down, left, right, fold and deploy motions and/or the like) or from another vehicle module via the communications block 98, typically either a LIN or CAN bus or the like. The controller interprets the input or command and activates each motor driver accordingly. The control signal to each motor driver is pulse width modulated (PWM) to regulate the speed of each motor and thereby each axis of motion in the mirror assembly.

The speed of each motor is determined algorithmically based on the mechanical configuration of the mirror assembly. In this manner, the mirror assembly can move in a typical fashion regardless of the axis orientation. As the actual speed of each motor is dependent on the supplied driving voltage as well as the ambient temperature of the system, the controller measures those parameters and further algorithmically adjusts the pulse width of the control signal. As an additional input, position feedback can be utilized to directly measure the position and speed of each actuator and relative to each axis of rotation. These attributes can be used by the controller to further adjust the pulse width supplied to each motor driver. Optionally, the mirror assembly and/or control circuitry may operate the actuator or actuators at 12 volts or the like during normal operation, and may include a booster circuit that is operable to operate the actuator at a higher power or voltage (such as at 24 Volts or the like) for increased speed during a powerfold operation (where the mirror head is pivoted about both axes to fold or move so as to be generally along the side of the vehicle).

This feedback enables real-time adjustment of the motion of the mirror head about each axis of rotation to provide highly accurate and repeatable motion over time and wear during the life cycle of the rearview mirror assembly. The control system is configured to also provide a memory system for the mirror assembly, such as for vehicle applications that include such memory systems. The vehicle module responsible for the memory system typically provides a reference voltage and ground and reads back a scaled version of the reference voltage. The controller in the exterior rearview mirror assembly provides these scaled voltages via the position output signals. These signals are algorithmically calculated from the position feedback read from each actuator and are scaled to the provided reference voltage.

Figure 4:
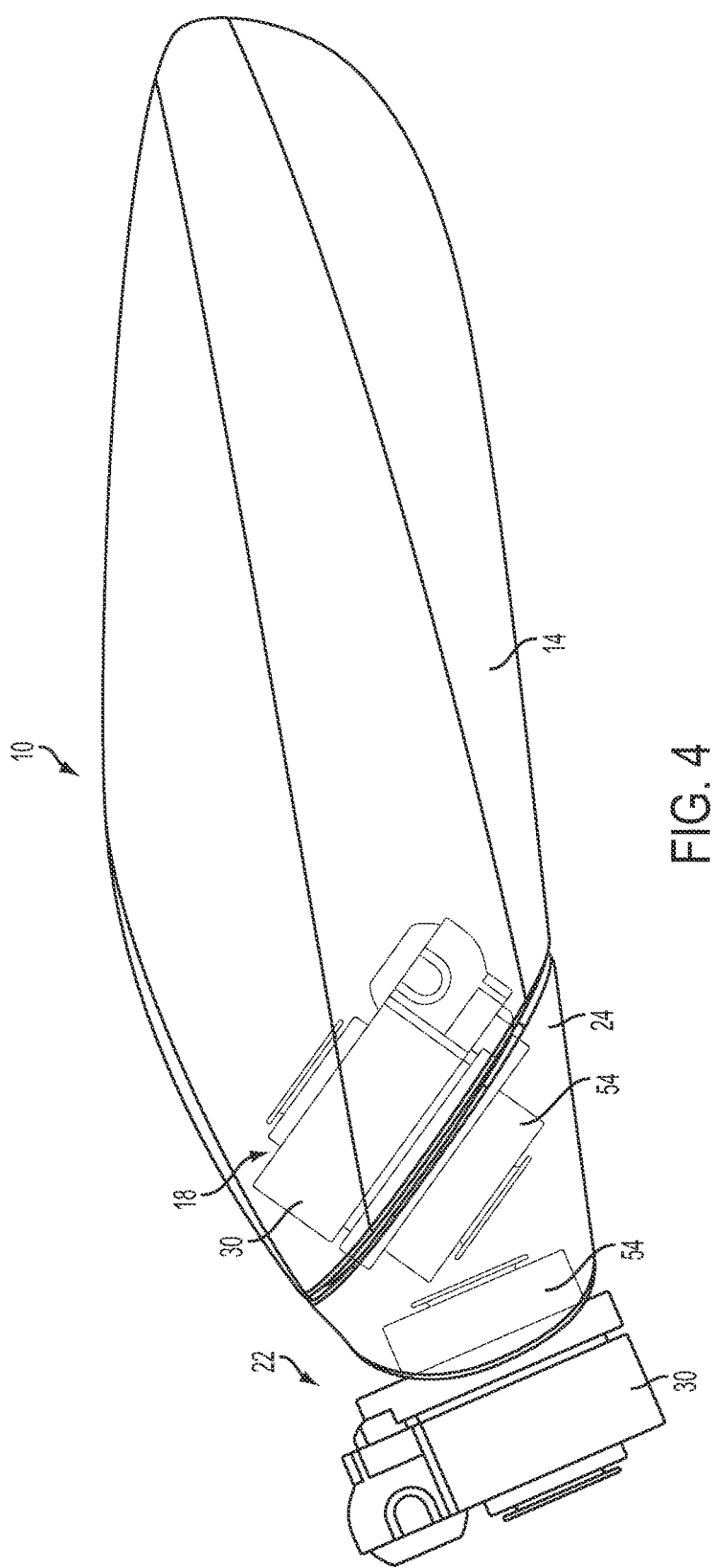
FIG. 4 is a plan view of an exterior rearview mirror assembly that incorporates two actuators in accordance with the present invention.
Figure 5:
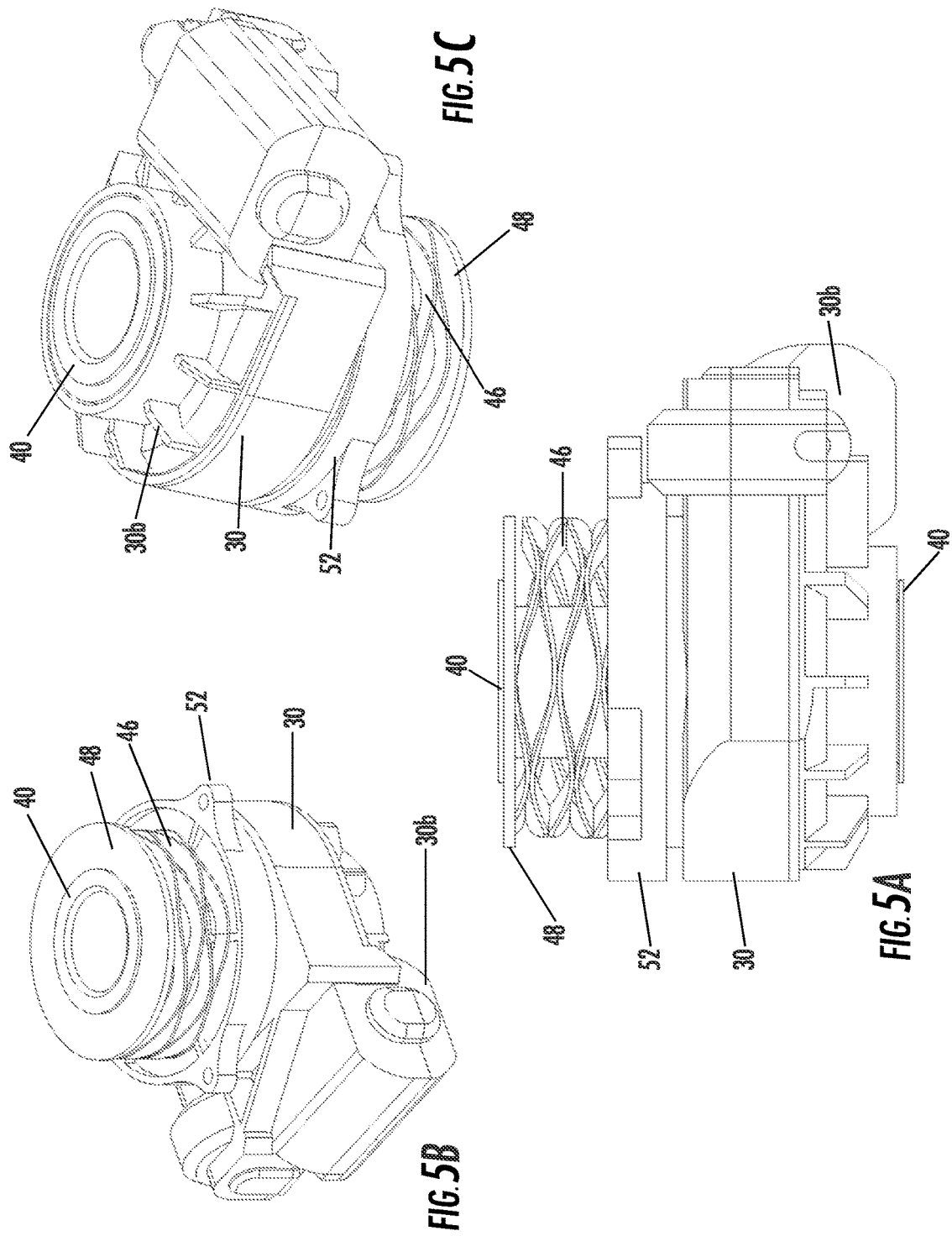
FIGS. 5A-C are perspective views of an actuator for the exterior rearview mirror assembly of FIG. 4.
Figure 6:
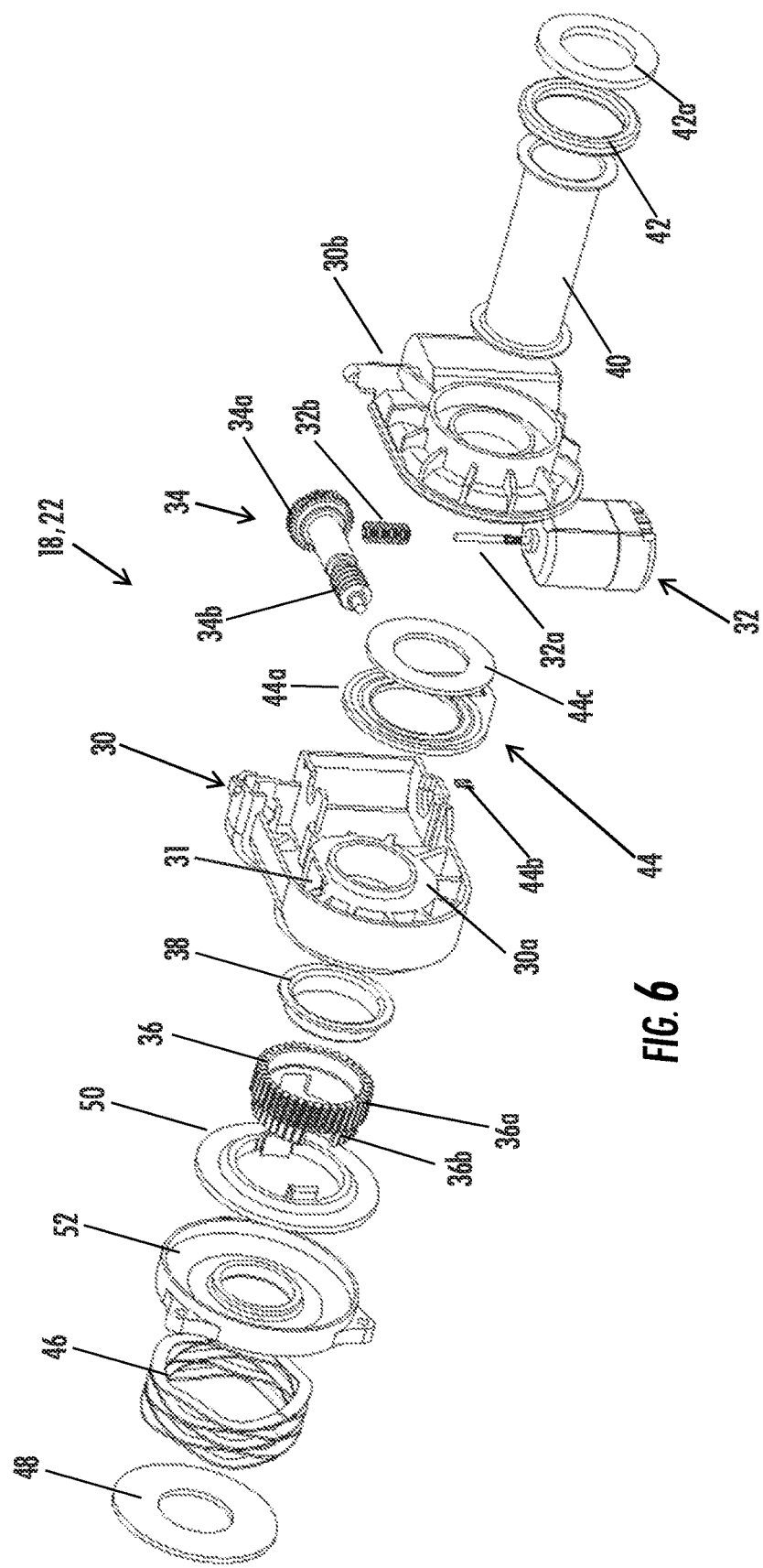
FIG. 6 is an exploded perspective view of the actuator of FIGS. 5A-C.

The exterior rearview mirror assembly of the present invention thus provides for adjustment of the rearward field of view at the rearview mirror via adjustment or operation of two actuators having different or non-co-axial axes of rotation. For example, and as shown in FIG. 4, the exterior mirror assembly 10 has the mirror head housing 14 pivotally attached at the outer cover 24 via the first actuator 18, whereby rotational driving of the first actuator 18 imparts a rotation of mirror head housing 14 about the first pivot axis 18a relative to the outer cover 24. The outer cover 24 is pivotally attached at the side of the vehicle via the second actuator, whereby rotational driving of second actuator 22 imparts of rotation of outer cover 24 and mirror head housing 14 the a second pivot axis 22a. The outer cover 24 is disposed at or attached to or mounted at the side portion of the vehicle (and pivotally or rotatably mounted thereat, such as via the actuator 22) when the exterior mirror assembly is normally mounted at the side of the vehicle.

As shown in FIGS. 5A-7, actuator 18, 22 (the first actuator 18 is preferably similar in construction and components as the second actuator 22, so they are described as a common actuator below) comprises a housing or bracket 30 that houses or receives the drive motor 32 therein. In the illustrated embodiment, an output shaft 32a (with a worm gear 32b attached thereat) of the drive motor 32 is rotatably drivable (via actuation of the drive motor 32 in the selected or appropriate direction) to rotatably drive a combination gear element 34, which, in turn, rotatably drives an output gear 36 at the housing 30 and at a gear bushing 38. In the illustrated embodiment, the gear element 34 has a gear element 34a that engages worm gear 32b and a worm gear element 34b that engages a first gear element 36a of output gear 36 (such as through an opening or aperture 31 at a center housing portion 30a of housing 30, with the gear bushing 38 and first gear element 36a of output gear 36 received in or nested in the center housing portion 30a and the worm gear 34b disposed outboard of the center housing portion 30a and at the aperture 31). A rivet tube 40 extends through housing 30 and receives or extends through a bearing washer 42a and a bearing 42 at one end (where a housing cover 30b is attached to contain or house the motor and other components with the housing 30). A memory system 44 is disposed between the bearing washer 42a and the gear bushing 38. Rivet tube 40 extends through or receives a spring 46 and spring washer 48 at the other end of the tube 40, with a clutch plate 50 and an adapter plate 52 disposed between the spring 46 and the housing 30.

When the exterior rearview mirror assembly 10 is assembled and mounted at a vehicle, the housing 30 of second actuator 22 may be attached or affixed at the side portion of the vehicle. The outer cover 24 has an attachment plate or receiver 54 (FIG. 4) that receives the spring 46 and spring washer 48 therein and that interfaces with and attaches to the adapter plate 52 (such as via a snap together connection or via one or more fasteners or the like, or the adaptor plate and the mirror bracket or attachment plate may be combined and the rivet tube may hold the parts together instead of fasteners or the like). When assembled and mounted in this manner, rotational driving of drive motor 32 of second actuator 22 imparts rotation of the output gear 36, which, in turn, rotatably drives the clutch plate 50, which rotatably drives the adapter plate 52 and thus the receiver 54 and outer cover 24 relative to the actuator housing 30 and the side of the vehicle. Likewise, when the exterior rearview mirror assembly 10 is assembled, the housing 30 of the first actuator 18 may be attached or affixed at the mirror housing 14 and the attachment plate or receiver 54 may be attached or affixed at the outer cover 24, such that rotational driving of drive motor 32 of first actuator 18 imparts rotation of the output gear 36, which, in turn, rotatably drives the clutch plate 50, which rotatably drives the adapter plate 52 and thus the receiver 54 and outer cover 24 relative to the actuator housing 30 and the mirror housing 14. The adapter plate 52 is press fit at the rivet tube 40 such that rotation of the adapter plate imparts a corresponding rotation of the rivet tube, which rotates via bearing 42 relative to the housing cover portion 30b and housing 30.

Figure 7:
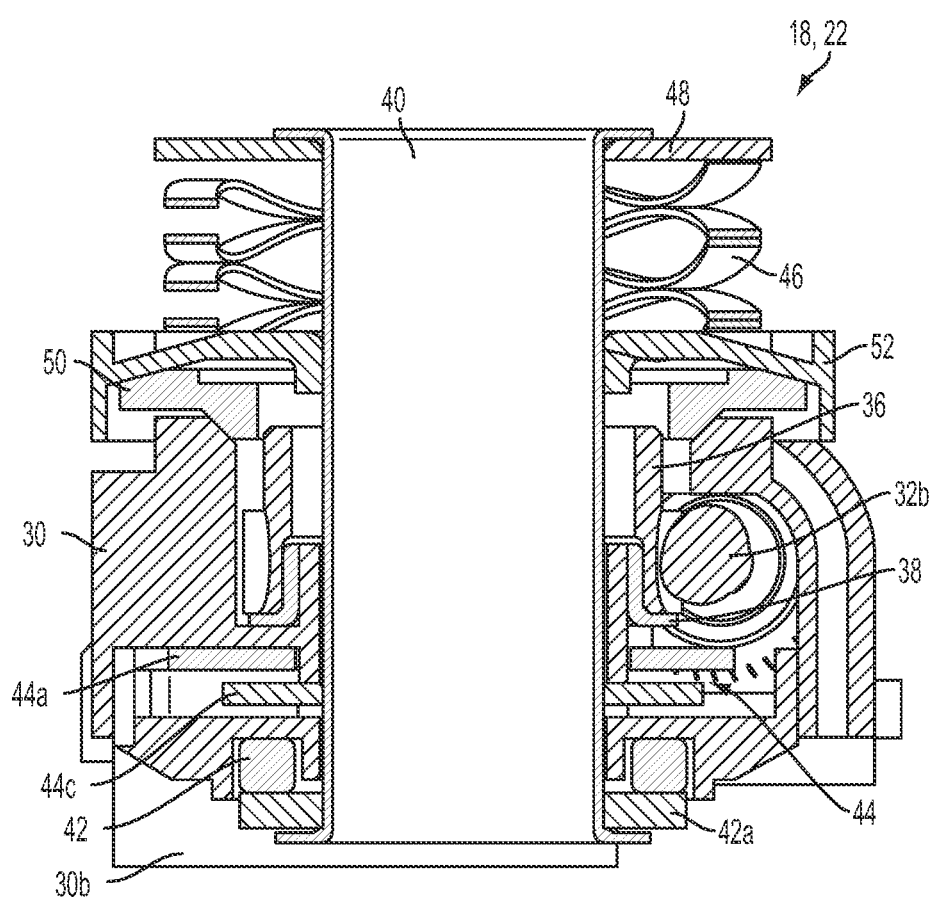
FIG. 7 is a sectional view of the actuator of FIGS. 5A-C.
Figure 8:
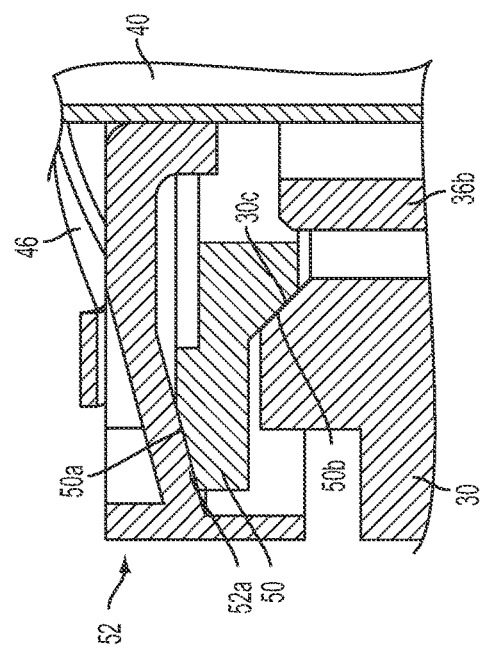
FIG. 8 is an enlarged sectional view of a clutch element of the actuator of FIG. 7.

As best shown in FIGS. 7 and 8, the actuator comprises a clutch system at the adapter plate 52, the clutch plate 50 and the housing 30. As shown in FIG. 8, the adapter plate 52 has a manual clutch surface 52a that engages a corresponding clutch surface 50a of the clutch plate, and the clutch plate 50 includes another clutch surface 50b that engages a stabilization clutch surface 30a of the housing 30. Thus, during electrical operation of the motor 32, the output gear 36 drives the clutch plate 52, which slides against the clutch surface 30c of the actuator housing 30.

Such a clutch assembly or system provides a reduced or zero-backlash output that has enhanced vibrational stability. During manual operation of the mirror assembly (such as if a user manually grasps and rotates the mirror), the manual clutch surface 52a of the adapter plate 52 slides against the clutch surface 50a of the clutch plate 50, while the clutch plate 50 is held steady by the gear train when the motor is not actuated. The mirror assembly can thus be manually adjusted about either axis, whereby the clutch slips to allow for such manual adjustment and for a breakaway function or feature. Optionally, the mirror assembly may be manually controlled and operated by providing manual controls for the pivoting about the pivot axes of the mirror assembly to adjust the rearward field of view of the mirror reflective element.

In the illustrated embodiment, the exterior rearview mirror assembly uses two angled clutch surfaces to improve the lateral and rotational stability of each of the first and second actuators. As can be seen in FIG. 8, the stabilization clutch surfaces 30c, 50b are disposed or established radially inward from the manual clutch surfaces 50a, 52a, and are configured at a sharper or steeper or increased angle relative to the manual clutch surfaces. The increased angle and reduced diameter of the stabilization clutch surfaces reduces the minimum output torque required by the drive mechanism to electrically adjust the mirror while still allowing for a heavy manual adjustment effort and spring load (to reduce the possibility of unintentional manual adjustments of the mirror assembly, such as via mild bumping of the mirror head or the like).

Figure 8A:
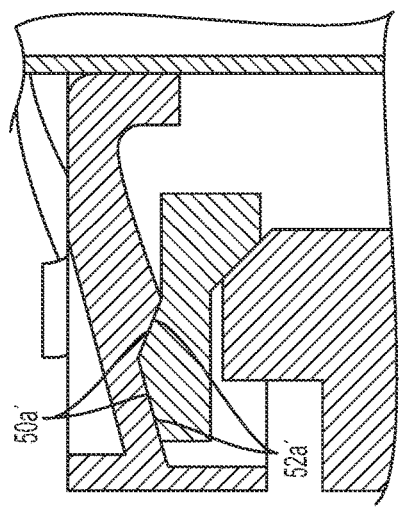
FIG. 8A is another enlarged sectional view of a clutch element of the actuator, showing optional clutch engaging surfaces for the actuator.

Although shown and described as having the angled clutch surfaces 50a, 52a shown in FIG. 8, other shaped or contoured clutch surfaces may be implemented while remaining within the spirit and scope of the present invention. For example, the clutch surfaces may have dual surfaces or non-planar engaging surfaces or the like. For example, and with reference to FIG. 8A, the clutch surface 50a' may comprise a dual angled surface that engages a correspondingly formed clutch surface 52a'. Other shapes and configurations of the clutch surfaces may be implemented while remaining within the spirit and scope of the present invention.

The actuator may include a memory system, such as a contact memory system or a non-contact memory system or the like. In the illustrated embodiment, the actuator includes memory system 44, which comprises a memory circuit element or circuit board 44a, a memory wiper or element 44b and a memory wiper holder 44c, which are disposed at the housing 30 and between the housing 30 and the and an end cover element 30b of the housing 30 (such as best seen in FIG. 7). The memory wiper holder 44c, memory wiper 44b and adapter plate 52 are press fit or secured to the rivet tube 40, so they all rotate together as a single construction, while the memory circuit board 44a is fixed at the housing 30 and thus does not rotate with the memory wiper holder and wiper when the actuator is actuated. As the adapter plate 52 is rotated relative to the housing 30 (via rotational driving of the drive motor 32), the rivet tube 40 rotates and the memory wiper 44b attached at the memory wiper holder 44c is thus swept along circuitry traces or carbon ink traces 44d on the memory circuit board 44a (such as two concentric traces disposed around the memory circuit board). Responsive to such sweeping of the memory wiper 44b, circuitry determines the degree of rotation of the adapter plate or element relative to the housing based on the location of the memory wiper (which may contact both traces and thus may close a circuit or provide a jumper between the traces so that circuitry that is electrically connected to the traces can determine the location of the memory wiper along the traces) along the circuit traces (which have terminals at each end thereof for connection to circuitry that is operable to determine where along the traces the wiper is located at any given time).

Thus, the memory system 44 is operable to determine the degree of rotation of the mirror head relative to the outer housing and the degree of rotation of the outer housing relative to the side of the vehicle, and the system may provide a memory selection function so a driver of the vehicle may save a particular mirror setting, such as in a similar manner with conventional memory mirror systems. Thus, when a driver of the vehicle later selects the saved setting, one or both actuators 18, 22 operate to set the mirror head at the appropriate position or orientation relative to the outer housing and to set the outer housing at the appropriate position or orientation relative to the side of the vehicle, in order to provide the desired or selected rearward field of view to the driver of the vehicle.

Figure 9:
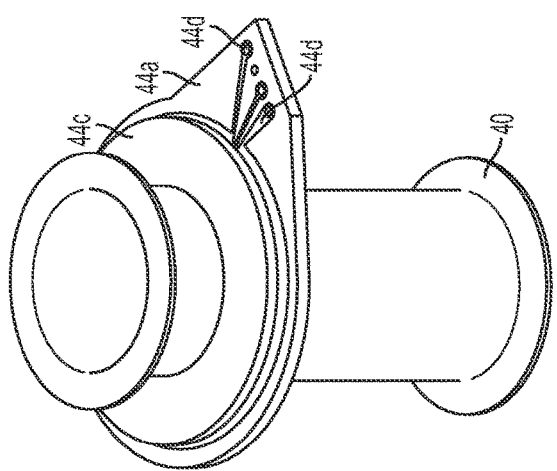
FIG. 9 is an enlarged perspective view of a memory element of the actuator of FIGS. 5A-C.

Optionally, and with reference to FIGS. 9A and 9B, a memory system 44' comprises a memory circuit element or circuit board 44a', a pair of memory wipers or contacts or elements 44b', 44c' and a memory contact holder 44d', which are disposed at the housing and between the housing and the and the end cover element of the housing (not shown in FIGS. 9A and 9B, but similar to the components shown in FIG. 7). The memory contact holder 44d', memory contacts 44b', 44c' and the adapter plate are press fit or secured to the rivet tube, so they all rotate together as a single construction, while the memory circuit board 44a' is fixed at the housing and thus does not rotate with the memory wiper holder and wiper when the actuator is actuated, such as in a similar manner as discussed above.

Memory system 44' comprises an absolute position feedback system that provides an unrestricted 360 degree planar movement of an element or actuator (such as either or both actuators 18, 22). The rotational position of the actuator is provided via three concentric rings 45a', 45b', 45c' fabricated on the printed circuit board 44a' and optionally constructed using a resistive ink. The innermost ring 45a' and outermost ring 45c' are constructed by printing the resistive ink over a copper trace. The copper trace provides a low impedance path in parallel with the resistive element, electrically shorting the resistance of the ink. The center ring 45b' is constructed by printing the resistive ink directly on the PCB substrate and on two small copper pads located about 180 degrees relative to each other. The length of the pads (along the arc of the circumference) is very narrow. The width of the pads is approximately equal to the width of the ring. These pads provide an electrical connection to center ring 45b'. One of these pads is connected to ground while the other is connected to a positive reference voltage. This construction creates two resistors in parallel, each occupying about half of the circumference of center ring 45b'. As shown in FIG. 9B, bridging the gap between inner ring 45a' and center ring 45b' is a contact 44b' and bridging the gap between center ring 45b' and outer ring 45c' is a contact 44c'. The contacts 44b', 44c' comprise metallic elements that are each constructed to create a highly conductive and flexible contact surface that rides on the resistive ink surface of the rings. Each metal contact on center ring 45b' applies the voltage sensed at the contact point on center ring 45b' onto the opposing ring (such as inner ring 45a' for contact 44b' and outer ring 45c' for contact 44c').

The metal elements are placed at an angle relative to each other that is significantly less than 180 degrees and significantly more than zero degrees, such as at an angle of around 45 degrees or more or less. The arrangement of contact 44b' and contact 44c' ensures that there is a unique voltage pair at every position in the 360 degrees of rotation of the actuator. In this manner, the absolute position of the actuator can be determined algorithmically by reading the sensed voltages at each of the inner ring 45a' and the outer ring 45c'. Motion direction can be determined algorithmically by repeatedly reading the sensed voltages over time and determining which voltage leads the other as movement occurs. Motion velocity can be determined algorithmically by repeatedly reading the sensed voltages over time and determining the rate of change of the voltage amplitude.

Thus, the memory system is operable to determine the position of the actuator at all times during operation of the mirror assembly. Each of the actuators includes a respective memory system so that the control of the mirror assembly can determine the degree of rotation of each of the actuators at any time, and can thus determine the position or orientation or plane of the mirror reflective element at any time. If 360 degree motion is not needed, a single memory wiper and simpler carbon trace may be utilized to provide the appropriate memory function. Optionally, to limit rotation of the mirror head and/or the outer cover, one or more mechanical stops or elements may be provided (such as via molding a stop feature onto the mirror head and mirror base or cover, so that the molded features collide or engage to limit rotation of the mirror head within a desired or appropriate range of motion.

Figure 10A:
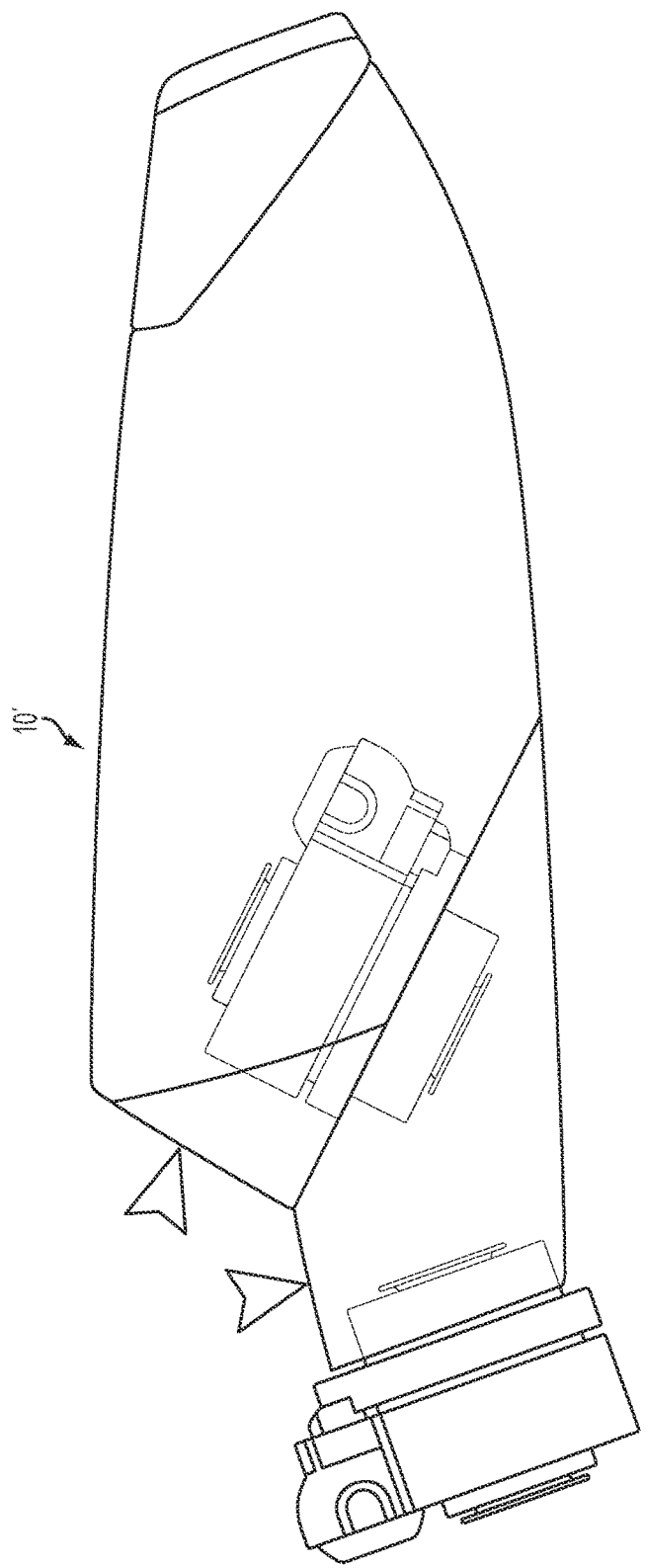
FIG. 10A is a plan view of another exterior rearview mirror assembly in accordance with the present invention.
Figure 10B:
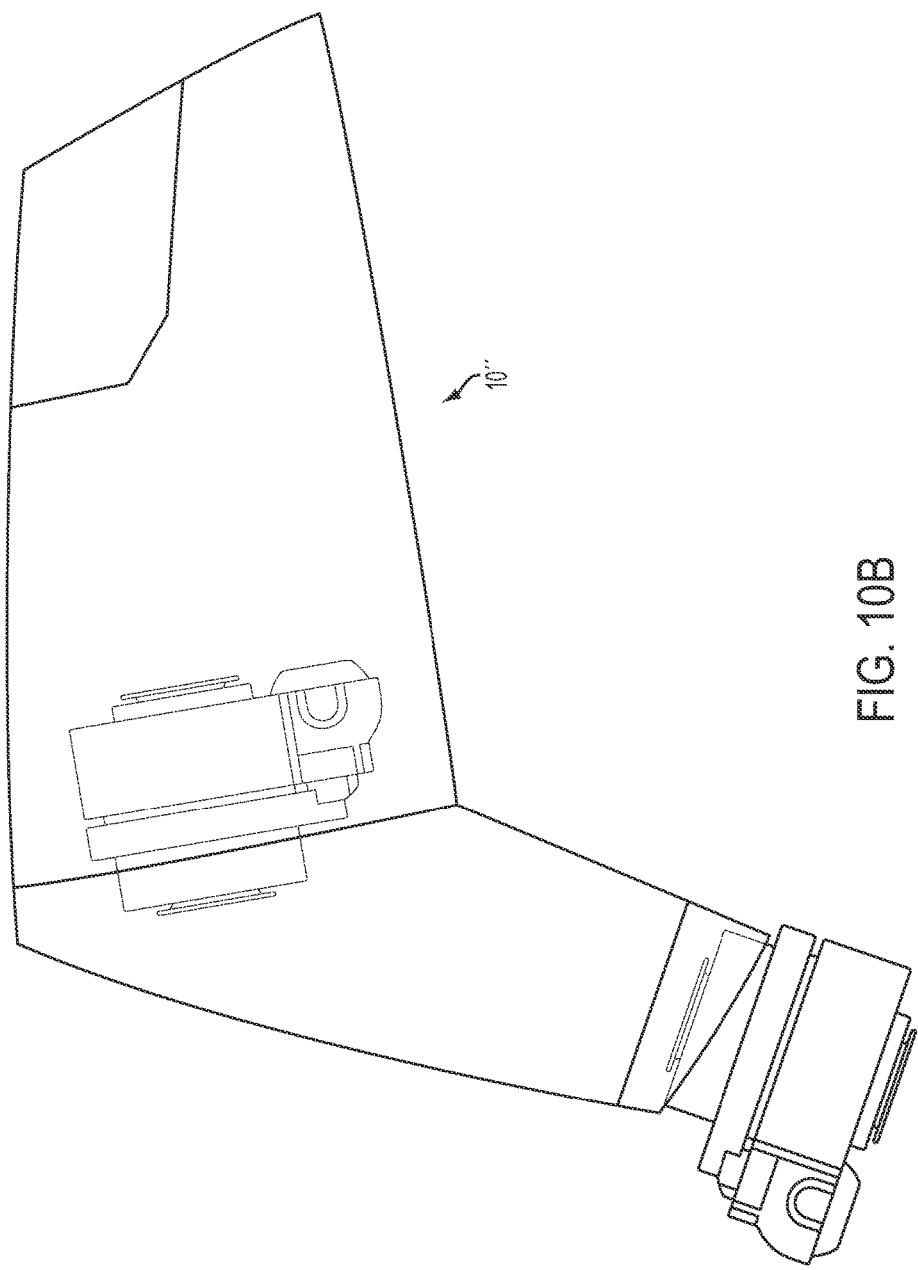
FIG. 10B is a plan view of another exterior rearview mirror assembly in accordance with the present invention.

Optionally, other mirror constructions are envisioned within the scope of the present invention. For example, the angle of misalignment of the pivot axes of the first and second actuators may vary or may be selected depending on the particular application of the mirror assembly. Such different pivot axes may be varied to accommodate different interface angles between the outer cover and the side of the vehicle and/or different interface angles between the mirror housing and the outer cover, depending on the particular application of the mirror assembly. For example, and with reference to FIG. 10A, an exterior rearview mirror assembly 10' may have a greater angle between the axes of rotation of the actuators, while, and such as shown in FIG. 10B, an exterior rearview mirror assembly 10″ may have an angle between the axes of rotation of the actuator that approaches 90 degrees or thereabouts. Clearly, other constructions and configurations are contemplated for mirror assemblies within the scope of the present invention.

Optionally, although the exterior mirror assemblies described above are shown with the axes of rotation of the actuators at a non-orthogonal angle (such as an obtuse angle) relative to one another, it is envisioned that an exterior mirror assembly may have two or more actuators providing different axes of rotation. For example, a third actuator and pivot axis may be added to achieve a more complex motion of the mirror head relative to the side of the vehicle (such as by utilizing a modular actuator or the like), and with the three (or more) actuators cooperatively operating at the same or different speeds to provide the desired movement or adjustment of the mirror head.

Figure 11A:
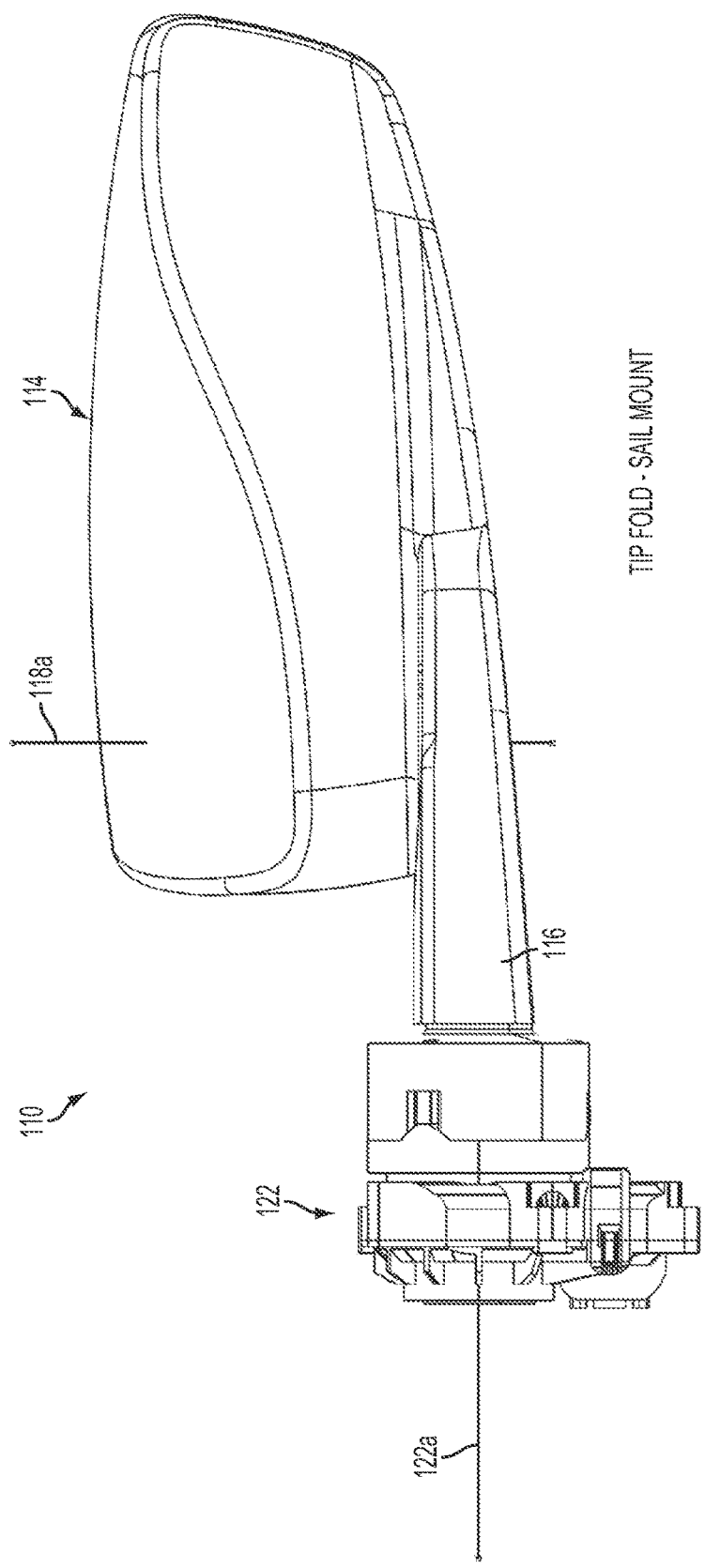
Figure 11B:
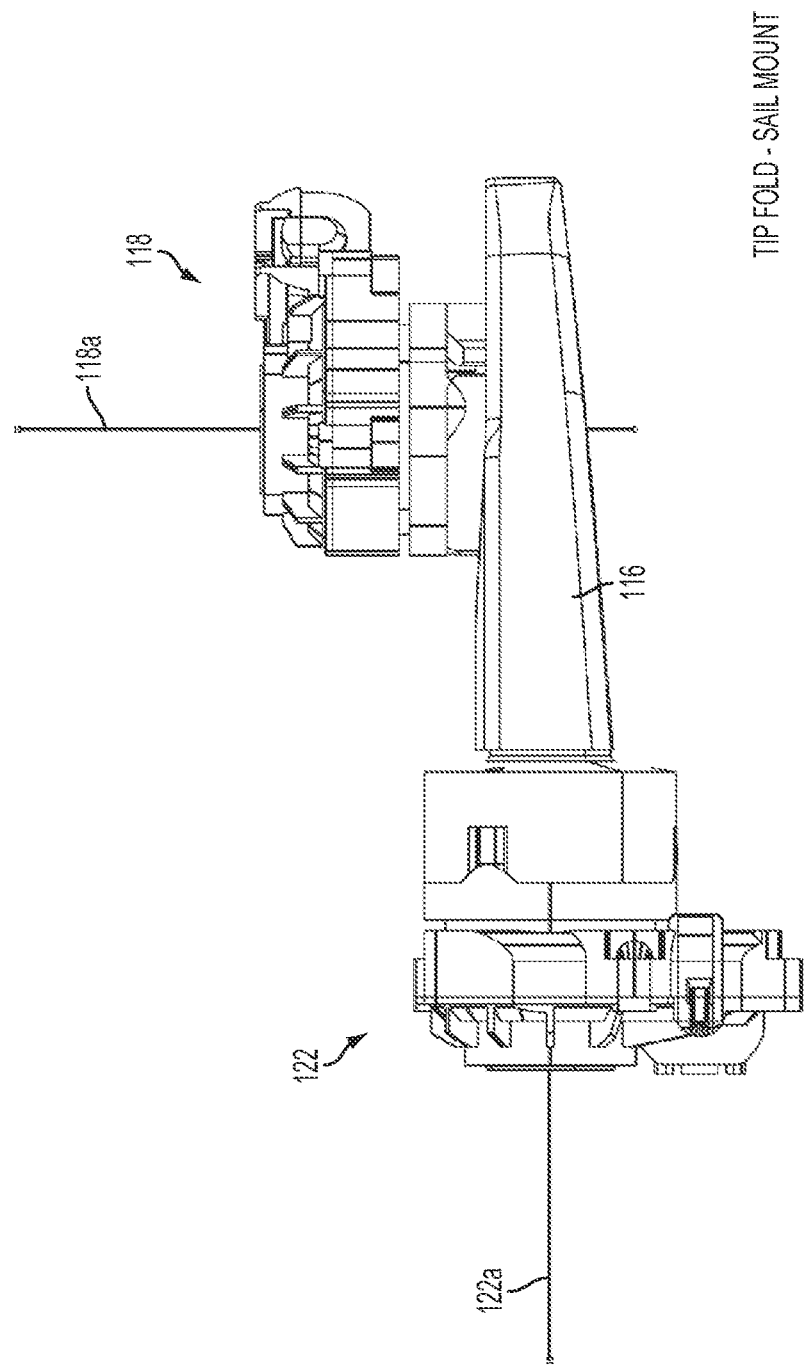
Figure 11D:
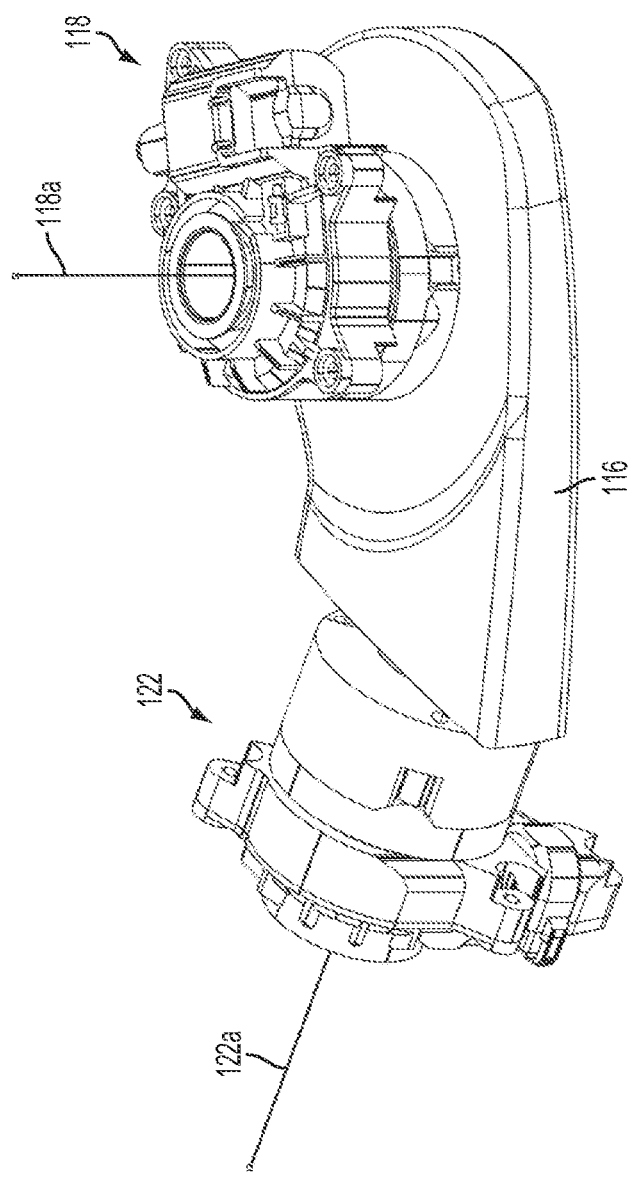

Optionally, it is further envisioned that an exterior mirror assembly may have two actuators with generally orthogonal axes of rotation while remaining within the spirit and scope of the present invention. For example, and with reference to FIGS. 11A-D, an exterior mirror assembly 110 comprises a reflective element (such as a generally planar or bent reflective element and such as an electrochromic reflective element or a flat glass or curved glass reflective element, such as a flat or curved reflective element having a single flat or planar or curved or convex curved glass substrate or having two flat or curved substrates or the like) that is attached at a rear attaching portion of a mirror head housing 114. Mirror head housing 114 is pivotally attached at a mounting arm or element 116 via a first or outer actuator 118 (FIGS. 11B and 11D), whereby rotational driving of the first actuator 118 imparts a rotation of mirror head housing 116 about a first pivot axis 118*a* relative to mounting arm 116. First actuator 118 is attached to or mounted at an outer end of mounting arm or element 116, which in turn is pivotally mounted at a sail mount of a vehicle via a second or inner actuator 122, which is configured to be attached at or disposed at or in the sail mount at a side of a vehicle, whereby, when so attached at the vehicle, rotational driving of second actuator 122 imparts a rotation of mounting arm 116 and first actuator 118 and mirror head housing 114 about a second pivot axis 122*a*. The second actuator 122 is disposed at or attached to or mounted at the side portion or sail mount of the vehicle when the exterior mirror assembly is normally mounted at the side of the vehicle.

In the illustrated embodiment, the pivot axis 122*a* is generally horizontal and extends laterally at the side of the vehicle and the pivot axis 118*a* is generally vertical when the exterior mirror assembly is normally mounted at the side of the vehicle. Thus, rotation of mounting arm 116 about pivot axis 122*a* imparts a rotation of mirror head housing 114 and the reflective element in an upward and downward direction to provide vertical tilting of the mirror reflective element, and rotation of mirror head housing 114 about pivot axis 118*a* imparts a rotation of the reflective element about the vertical axis to provide lateral adjustment of the field of view and to provide folding in and out of the mirror head.

Thus, when the mirror assembly 110 is mounted at the sail mount or side of the vehicle, the mirror head is adjustable about the first and second axes (via selective actuation of one or both actuators) to adjust the rearward field of view for the driver of the vehicle. For example, when the second actuator 122 is selectively operated to rotate or pivot mounting arm 116 relative to the side of the vehicle, the mirror head housing 114 is pivoted about the second pivot axis 122*a* to vertically adjust the rearward field of view for the driver of the vehicle. Also, when the first actuator 118 is selectively operated to rotate or pivot mirror head housing 114 relative to mounting arm 116, the mirror head housing 114 is pivoted about the first pivot axis 118*a* to laterally adjust the rearward field of view (such as, for example, within about a +/−60 degree or more range of pivotal adjustment).

Because of the generally orthogonal angled relationship of the axes of rotation of the actuators, the first and second actuators may be operated separately or together or cooperatively operated to vertically and/or laterally adjust the rearward field of view. Thus, when the mirror has been adjusted so that the reflective element has the desired vertical adjustment (via only operation of the second actuator 122), a user may laterally adjust the mirror to laterally adjust the rearward field of view of the reflective element (via only operation of the first actuator 118). In such an embodiment, the actuators 118, 122 may be independently operated to adjust the mirror field of view vertically and/or laterally, whereby the mirror assembly need not include a controller that coordinates the speed and/or actuation of the actuators to provide the desired or selected field of view. For example, the user input or toggle at the interior of the vehicle may control or adjust the first or outer actuator when moved or adjusted laterally or side-to-side (such as by the driver of the vehicle) and may control or adjust the second or inner actuator when moved up/down or fore/aft, and may control both actuators together (and at the same speed or optionally at different speeds if desired) when moved diagonally.

Figure 12B:
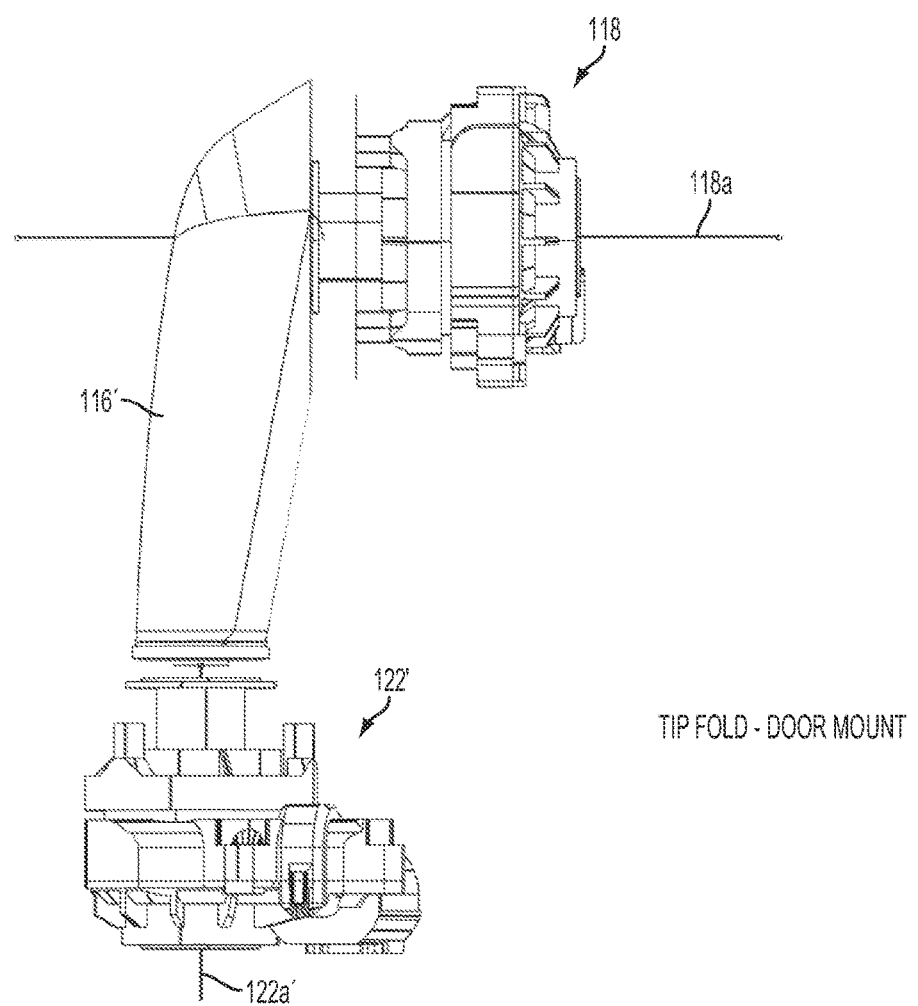
Figure 12D:
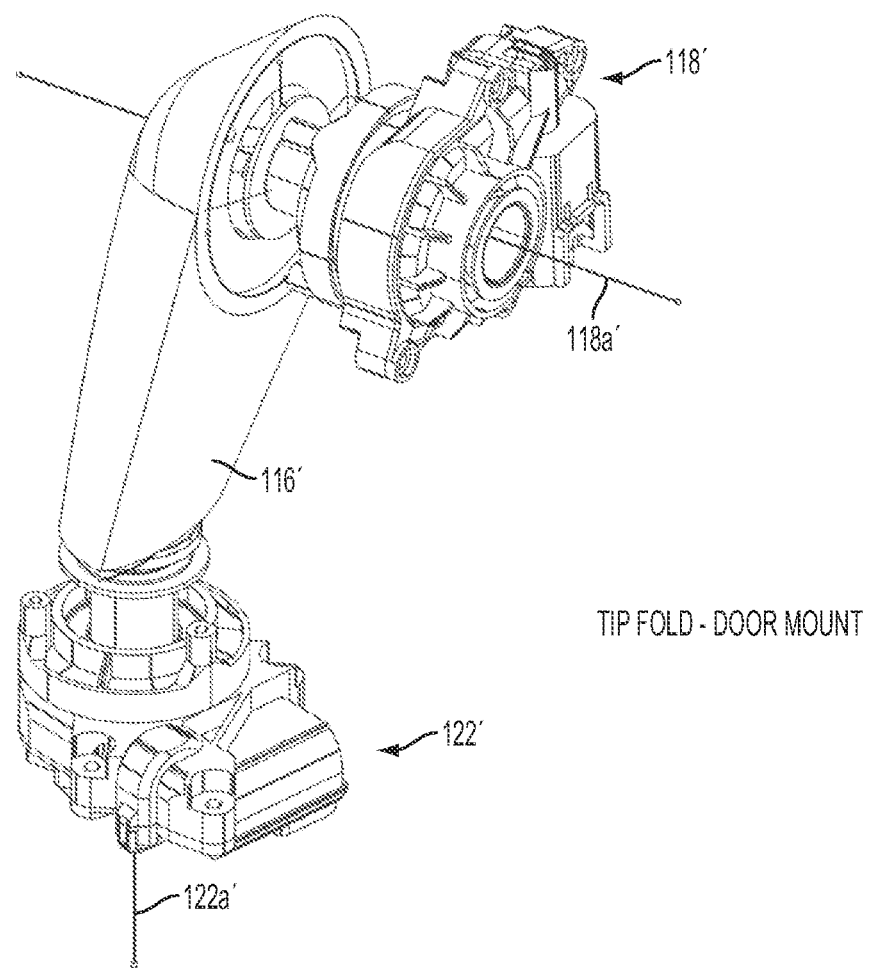

In the illustrated embodiment of FIGS. 11A-D, the mirror assembly is configured to mount at the side of the vehicle, such as at a sail mount region or at the door of the vehicle, with the axis of rotation 122*a* of the second actuator 122 extending generally horizontally and laterally at the side of the vehicle when the mirror assembly is normally mounted at the side of a vehicle. Optionally, and with reference to FIGS. 12A-D, a mirror assembly 110′ may be mounted at a side of the vehicle so that the axis of rotation 122*a*′ of the second actuator 122′ is generally vertical (and the axis of rotation 118*a*′ of the first actuator 118′ (FIGS. 12B and 12D) is generally horizontal and extends generally laterally) when the mirror assembly is normally mounted at the side of a vehicle, such as at a door mount of the vehicle or the like. In the illustrated embodiment, the mirror head housing 114′ is pivotally attached at a mounting arm or element 116′ via the first or outer actuator 118′, whereby rotational driving of the first actuator 118′ imparts a rotation of mirror head housing 116′ about the generally horizontal first pivot axis 118*a*′ relative to mounting arm 116′. First actuator 118′ is attached to or mounted at an upper end of mounting arm or element 116′, which in turn is pivotally mounted at a door mount of a vehicle via the second or inner actuator 122′, which is configured to be attached at or disposed at or in the door mount at a side of a vehicle, whereby, when so attached at the vehicle, rotational driving of second actuator 122′ imparts a rotation of mounting arm 116′ and first actuator 118′ and mirror head housing 114′ about the generally vertical second pivot axis 122*a*′. Thus, the mirror assembly 110′ may function similar to mirror assembly 110, discussed above, but with the outer or upper or first actuator providing the vertical adjustment of the mirror head and reflective element and the inner or lower or second actuator providing the lateral adjustment of the mirror head and reflective element.

Optionally, the dual actuator exterior mirror assembly of the present invention may include a frictional drive system for rotatably driving the mirror head or mounting arm via the respective actuator, while providing enhanced frictional retention of the mirror components when the actuator is not operating, and while reducing the torque requirements of the actuator motors to pivot or rotate the mirror head and/or mounting arm or bracket relative to the mounting arm and/or mirror base and/or side of the vehicle at which the mirror assembly is mounted. Such a system isolates or decouples the actuator from the mirror system, which allows a manual load at the mirror head to be transferred directly between the mirror head and the mirror base without being applied to the actuator.

Figure 17:
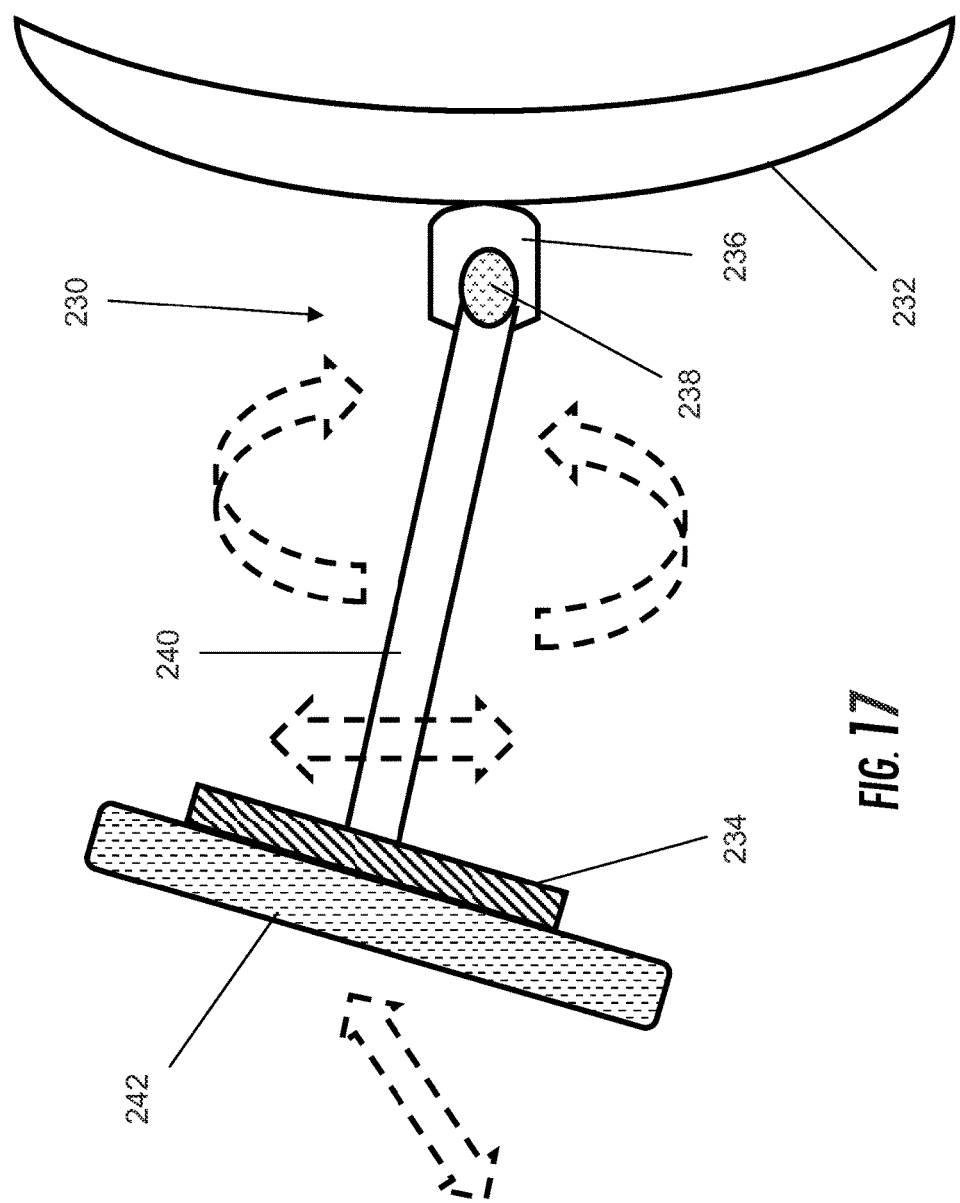
FIG. 17 is a schematic of an exterior rearview mirror system in accordance with the present invention.

For example, and with reference to FIGS. 13-16, a mirror actuator 122" is operable to pivot or rotate one mirror element relative to another. For example, the actuator may pivot or rotate a mirror head relative to a mounting arm or intermediate bracket the like or may pivot or rotate the intermediate bracket or mounting arm 116" or the like relative to the mirror base 117" or the vehicle (such as shown in FIGS. 13 and 17) or the like, such as in a similar manner as discussed above. In the illustrated embodiment of FIGS. 13 and 17, and as discussed below, the actuator 122" operates to pivot or rotate the mounting arm relative to the mirror base. However, the other actuator (not shown in FIGS. 13-17) of the dual actuator mirror assembly (disposed at the mounting arm or the mirror head) may operate to rotate the mirror head relative to the mounting arm or intermediate bracket in a similar manner. The actuator is attached to or connected to the mirror components 116", 117" via a rivet tube 140", which extends through the housing 130" of the actuator and extends through or receives a spring 146" and spring bearings 148" at the other end of the tube 140". The actuator includes a friction coupler 150" that is disposed at the tube 140" and generally at or near the mounting arm 116" and includes a lifter 152" at the tube and coupled to the output gear 136" (FIG. 16) of the actuator.

As can be seen in FIG. 16, when the actuator is not operating to pivot the mounting arm relative to the base, the mounting arm 116" (or housing or structure of the mounting arm or intermediate bracket) normally is in contact with the base 117" (such as via a circumferential or ring-shaped protrusion 117a" of the base that is at least partially received in a correspondingly formed groove 116a" at the mounting arm), and the two contacting surfaces 117a", 116a" frictionally engage one another to generally fix or hold the mounting arm relative to the base. Also, when the actuator is not operating to pivot the mounting arm relative to the base, the friction coupler 150" is spaced or slightly spaced from the mounting arm or bracket (with an angled engaging surface or clutch surface 150a" of the friction coupler and an opposing angled engaging surface or clutch surface 116b" of the mounting arm being slightly spaced from one another). As best shown in FIG. 15, and when the actuator is not operating to pivot the mounting arm relative to the base, lower ends or legs 150b" of the friction coupler 150" are disposed at a narrower portion 152a" of the lifter 152" (with an upper tab or leg 152b" of lifter 152" being disposed at a narrower region or recessed region or portion 150c" of friction coupler 150") so that the lifter is not urging the angled or conical clutch surface 150a" of the friction coupler 150" into frictional engagement with the angled or conical clutch surface 116b" of the mounting arm 116". In the illustrated embodiment, the clutch surfaces are angled or conical to improve the lateral and rotational stability of the actuator. Thus, when the actuator is not operating to pivot the mounting arm relative to the base, the actuator is decoupled from the frictional engaging surfaces 116a", 117a" that frictionally retain the mounting arm or bracket relative to the mirror base or vehicle, since those surfaces are part of the bracket and base and not part of the actuator.

However, when the actuator is operated to rotate or pivot the mounting arm relative to the base, the output gear 136" is rotatably driven by the actuator motor, whereby the lifter 152" is also rotated. As best seen with reference to FIGS. 15 and 16, initial rotation of the lifter 152" relative to the friction coupler 150" causes the legs 150b" of the friction coupler 150" to ride or slide up along the ramped narrower portion 152a" of the lifter 152", which in turn urges the angled clutch surface 150a" of the friction coupler 150" into engagement with the clutch surface 116b". Thus, the lifter 152" rotates to lift the friction coupler 150" into engagement with the mounting arm clutch surface 116b", and as the friction coupler is urged into engagement with the clutch surface 116b", the friction coupler 150" lifts or moves the mounting arm 116" away from the base to disengage or at least partially disengage or decouple the groove 116a" of the mounting arm from the protrusion 117a" of the mirror base (and thus reduce the frictional contact between the mounting arm and the mirror base). After such lifting or rising up of the coupler, and as the lifter 152" is further rotated relative to the friction coupler 150", the legs 150b" of the friction coupler 150" will engage tabs or legs 152b" of the lifter 152", whereby the friction coupler 150" (and the mounting arm 116" due to the frictional engagement of the surfaces 150a" and 116b") will rotate with the lifter 152" (which is rotatably driven by the actuator motor and output gear 136"). After an electrical cycle of the actuator motor to cause such rotation or pivotal movement of the mounting arm, the actuator may be driven in the opposite direction to get the mirror back to its normal state (such as a small degree of rotation in the opposite direction to move the lifter relative to the friction coupler so that the legs of the coupler are at the narrower portion of the lifter and the clutch surface of the coupler is again spaced from or decoupled from the mounting arm or bracket structure).

Thus, when the actuator is not operating to rotate the mounting arm relative to the base (or to rotate the mirror head relative to the mounting arm), the clutch interface or frictional interface is the interface of the mounting arm and the base and is separated from or isolated from or decoupled from the actuator. Thus, manual rotation of the mounting arm relative to the base (or the mirror head relative to the mounting arm) is done via frictional movement of the clutch surfaces 116a", 117a", with no rotation of the internal actuator components or elements. The clutch system above decouples the frictional engagement of the mirror components from the actuator, which allows for use of higher frictional interface between the mirror components (such as at surfaces 116a", 117a") to enhance the stability and vibrational performance of the mirror assembly, without adding additional torque requirements to the actuator to overcome such frictional forces. This is because when the actuator is actuated to rotate the mirror components relative to one another, the higher frictional interface at the surfaces 116a", 117a" is disengaged or at least reduced, thereby reducing the torque required to rotatably drive the mirror components relative to one another.

Optionally, the multi-axis actuating mechanism, such as the dual actuator mechanisms described above, of the present invention may be incorporated into a mounting/attachment device/element/unit that attaches or mounts at a side of a vehicle at a location where conventional exterior sideview mirrors are typically disposed, and is actuatable to adjust, via a support arm or structure, an attachment element or bracket (that is disposed at a distal end of the support arm or structure from the side of the vehicle) about multiple degrees of freedom with respect to the side of the vehicle in order that the rearward field of view of a mirror reflective element supported by, and adjusting in tandem with, the bracket can be adjusted by the actuating mechanism via the support arm structure to allow the driver to adjust his or her rearward and/or sideward field of view. The attachment device thus may be mounted at the side of the vehicle, and a selected or appropriate mirror reflective element (that may comprise an electro-optic mirror reflective element or a non-electro-optic or fixed reflectance mirror reflective element) and mirror casing may be readily attached to the attachment element or bracket (and optionally the mirror casing may be attached at the mirror reflective element itself), so that both the reflective element and the mirror casing move in tandem, whereby the mounting device may adjust the attachment element and the mirror head attached thereto about multiple axes relative to the side of the vehicle to adjust the rearward field of view of the driver of the vehicle and/or to pivot or fold the mirror head along the side of the vehicle or the like. Thus, a common or standard or universal mounting/attaching device may be mounted at or attached at the side of the vehicle and may adjust an attachment element or bracket (which may have a reflective element and mirror casing or structure attached thereto) inward/outward, forward/rearward, up/down and rotationally about multiple axes of rotation (such as about pitch, yaw and roll axes or about a generally vertical axis and/or other axes non-coaxial with the first or generally vertical axis or the like) with respect to the side of the vehicle at which it is mounted and the ground plane at the vehicle.

For example, and with reference to FIG. 17, an adjustment device or mounting device or actuator device 230 may be attached at a side 232 of a vehicle (such as at a driver or passenger side vehicle door or window or the like) and may include one or more actuators that are operable to provide multiple degrees/axes of freedom of adjustment of an attachment plate or bracket 234 relative to the vehicle side 232. The mounting or attaching device 230 may include an attachment element or structure 236 for attaching at the vehicle, and the attachment structure 236 may house or support one or more actuators 238 for adjusting a support arm or structure 240 relative to the vehicle side 232. The actuators may be cooperatively operable similar to the dual actuators of the mirror assemblies described above or may otherwise provide multiple axes of adjustment of the attachment plate and mirror head (such as, for example, a ball actuator that may rotate or pivot the mounting arm or structure 240 in a three dimensional manner at the side of the vehicle). For example, the arm may be pivoted up/down and forward/rearward and any directions in between, and the arm may be rotated about its longitudinal axis to further adjust the arm and the attachment element and the reflective element relative to the side of the vehicle (thus providing independent and/or cooperative pitch, yaw and roll adjustment of the reflective element relative to the side of the vehicle).

As shown in FIG. 17, the attachment element or bracket 236 is disposed at the outer or distal end of the support arm or structure 240, and a mirror reflective element 242 (which typically includes a backing plate or backplate and a heater pad disposed at a rearward surface of the reflective element) may be attached to the attachment element or bracket 236. Thus, adjustment of the support arm or structure causes a corresponding tandem adjustment of the attachment element 236 and of the mirror reflective element 242 to adjust the rearward field of view of the driver of the vehicle and/or to provide a powerfold function for the mirror reflective element. Optionally, and desirably, a mirror casing or shell 244 (FIG. 17A) may be readily attached at the mirror attachment element or bracket or to the mirror reflective element itself in order to provide the desired or appropriate appearance or styling of the exterior rearview mirror at the side of the vehicle and to provide mechanical protection of the reflective element and the like from environmental exposure. The mirror casing or shell may be attached via any suitable means, such as via snapping one or more casing portions at the rear of the mirror reflective element and/or bracket. When so attached, the mirror casing or shell moves in tandem with the tandem movement of the mirror reflective element 242 and attachment element 236 via adjustment of the support arm by the actuator or actuators of the attachment device.

Thus, a vehicle manufacturer may elect for at least a subset of its vehicle nameplates/models, a standardized attachment element and/or bracket and/or backplate and/or support arm (such as a standardized or common or universal mounting or actuator device), and then may attach a selected or appropriate reflective element and housing to the attachment element or bracket or backplate. The selected reflective element may be selected or customized for that particular vehicle nameplate or body style or optional mirror content (or for a vehicle model within a vehicle nameplate), and may provide the selected or desired or appropriate size and shape and type of reflective element for that particular vehicle. Similarly, the mirror casing or housing or shell may be selected and may be attached at the mirror reflective element or at the attachment element or the like of the mounting device, in order to provide the selected or desired or appropriate size and shape and color and styling of the exterior rearview mirror assembly for that particular vehicle. Optionally, the mirror casing may be customizable for the particular vehicle line or style or for the particular vehicle in accordance with the customer's preferences. Thus, in accordance with this aspect of the present invention, a standardized set of actuator device/support arm/attachment plate may be utilized across all vehicle models of a vehicle nameplate (such as, for example, all of the vehicle models of the Lincoln nameplate) of a vehicle manufacturer (such as, for example, Ford Motor Company), whereby different customized or selected mirror reflective elements and mirror casings may be selected for particular models (such as, for example, one design for the MKZ model and another design for the MKT model) for that nameplate of that vehicle manufacturer.

The mounting device and mirror reflective element and mirror casing may utilize any suitable attachment or mounting means, and may utilize aspects of the mirror assemblies and door assemblies of the types described in U.S. Pat. Nos. 7,289,037; 6,669,267 and/or 6,616,314, which are hereby incorporated herein by reference in their entireties. For example, the mirror casing may be provided as a clamshell construction or may constructed so that it first attaches to the mirror reflective element and the support arm is received through an aperture in the mirror casing to attach at the rear of the reflective element. When the mounting device and the mirror reflective element and mirror casing are so mounted at the side of a vehicle, the actuator or actuators of the mounting device is/are operable to move the mounting arm and attachment element or bracket (and the reflective element and mirror casing attached thereat) about multiple axes to provide the desired three dimensional adjustment of the mirror reflective element at the side of the vehicle (such as up/down and forward/rearward pivotable movement and clockwise and counterclockwise rotational movement about multiple axes, such as movement or adjustment about the pitch, yaw and roll axes). Thus, relative to the fulcrum point of the actuator device (at or near the side of the vehicle), the mirror reflective element can be moved so as to be in multiple orientations/planes at the side of the vehicle so that the driver can select his/her desired/required sideward and rearward field of view.

A typical known exterior mirror construction 260 is shown in FIG. 17B, where the mirror reflective element 262 is disposed in or housed in a mirror casing 264 (and is inboard of the open end of the mirror casing and not attached thereto) and is adjustable relative to the mirror casing via a mirror actuator 266, which is also disposed in the mirror casing and occupies space behind the reflective element and within the cavity of the mirror casing. Also, all of the wiring for powering the mirror actuator and (if applicable) the electro-optic mirror reflective element and/or heater pad needs to be routed into the mirror head for powering the actuator and the like, thereby requiring complicated wire management to route the wires into the mirror casing and around and to the mirror actuator. In contrast to such known constructions, the present invention provides a mirror assembly that has the reflective element 242 disposed at and attached to or otherwise fixed relative to the mirror casing 244, such that, during adjustment, the reflective element and mirror casing move in tandem about the fulcrum of the mounting device at or near the side of the vehicle. As can be seen with reference to FIG. 17A, such a construction allows for space within the mirror casing that previously was occupied by the mirror actuators of known or conventional mirror assemblies. Such a construction may also ease the wire management of any wires needed to power the reflective element and/or heater pad and/or any accessory disposed at the mirror head, since the space within the mirror casing may be substantially open or unoccupied by the likes of a mirror actuator.

By eliminating the conventional actuators commonly used in conventional exterior rearview mirror assemblies to date, opportunities arise to provide additional electronic content in the exterior rearview mirror (such as at the areas where the conventional actuators used to reside). Thus, for example, the exterior rearview mirror may include various electronic accessories therein or thereat, and may include the likes of bus connectors, such as an Ethernet terminal or the like. Optionally, for example, and such as shown in FIG. 17D, a camera or camera module 246 (such as a rearward facing camera and/or a downward facing camera and/or a sideward facing camera and/or a forward facing camera) may be installed or included in or at the exterior rearview mirror assembly, such as at or in the mirror casing or shell 244" (which may comprise any suitable and optionally asymmetrical construction or design), and may be provided as a modular unit camera that may be readily included and electrically connected or plugged in at the mounting device when the mirror reflective element and/or mirror casing are attached at the mounting device (such as by utilizing aspects of the vision systems described in U.S. Pat. Nos. 8,017,898; 8,262,268; 5,760,962 and/or 5,550,677, which are hereby incorporated herein by reference in their entireties). The attaching device 230 and support arm 240 for the reflective element 242 in FIG. 17D may be similar to those described above or may be constructed for the particular application or applications of the attaching device. Thus, a camera module (preferably comprising a lens system, a CMOS photosensor array and associated logic and control circuitry, and such as by utilizing aspects of the cameras described in U.S. Pat. Nos. 5,550,677; 5,760,962; 6,396,397; 6,097,023; 5,877, 897; and 5,796,094, which are hereby incorporated herein by reference in their entireties) may be procured from an automotive camera module manufacturer and provided to the exterior sideview mirror manufacturer and configured to be received at the exterior rearview mirror assembly in an orientation that correctly sets the desired field of view of the received camera module. Ancillary electronics and/or required power sources/signal sources, including bus (such as CAN or LIN bus) interfaces/connectors, may be at least partially provided by the exterior mirror manufacturer itself, and may be incorporated into the configuration/construction of the exterior mirror assembly, thereby reducing the cost and complexity of the procured camera module.

Optionally, and desirably, the camera or camera module may be included in the mirror head along with a ground illumination light and/or a turn signal, such as in accordance with U.S. Pat. Nos. 8,262,268 and/or 8,066,415, which are hereby incorporated herein by reference in their entireties. Preferably, the incorporated camera is part of a multi-camera vision system of the equipped vehicle and is operable to online calibrate/automatically calibrate, such as in accordance with U.S. Pat. Nos. 7,991,522 and/or 7,877,175, which are hereby incorporated herein by reference in their entireties, and more preferably is operable as part of an overall vision system that includes object detection such as in accordance with U.S. Pat. No. 8,386,114, which is hereby incorporated herein by reference in its entirety. Preferably, images from at least two individual cameras of the multi-camera vision system of the vehicle are stitched/combined (preferably seamlessly stitched/combined) to form a single composite image that is viewable on a display and usable by the driver of the vehicle when operating the vehicle, such as by utilizing aspects of the systems described in U.S. Pat. No. 7,859,565, which is hereby incorporated herein by reference in its entirety.

Also, because, with the present invention, there is no longer a need for a mirror head with an actuator disposed therein, the shape of the mirror casing or housing (as presented to the wind flow as the vehicle drives in a forward direction of travel) need not follow traditional aerodynamic lines, and may effectively follow a shape that optimizes aerodynamic flow and minimizes the likes of eddy currents and turbulence in the air flow as experienced as the vehicle is driven forwardly on a road. For example, and with reference to FIG. 17C, a mirror casing 244' may be provided at the reflective element 242 (which is attached at the distal end of the mounting arm or structure 240 of the mounting device 230), with the mirror casing selectively shaped or styled for the particular application, whereby the mirror casing may or may not have the typical mirror casing shape and typical interior cavity rearward of the reflective element, such as typically provided in known exterior mirror constructions. As illustrated in FIGS. 17A, 17C and 17D, the disposition of the mirror reflective element to the exterior mirror casing/shell may preferably be such as described in U.S. Pat. No. 8,049,640 and/or in PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are hereby incorporated herein by reference in their entireties.

Thus, the exterior rearview mirror assembly of the present invention provides a frameless exterior or sail mount mirror assembly that has the actuators at the mounting arm or structure of the mirror assembly and not within the mirror housing and not attached at the rear of the reflective element. The actuators adjust the mirror head and the reflective element in tandem (and do not adjust the reflective element relative to the mirror casing). The dual actuator (or multiple degrees of freedom actuator or actuators) of the exterior rearview mirror assembly or system of the present invention thus provides a mirror head that can be any shape and that does not require space in the mirror head for conventional actuators that operate to adjust or orient the reflective element relative to the mirror housing or casing. The mirror reflective element can be adhered or otherwise fixedly attached at a surface or mounting portion of the mirror head, and the mirror head can be any shape (such as generally flat or having a narrow or thin profile or the like) depending on the particular application of the mirror assembly and the vehicle manufacturer's design preferences. The mirror assembly of the present invention thus allows for inclusion of other accessories (such as turn signal indicators, blind spot indicators, lights, displays and/or the like) in the mirror head, without concerns of interference with conventional actuators disposed in the mirror head and at and behind the mirror reflective element. The exterior rearview mirror assembly and/or actuators may utilize aspects of the exterior rearview mirror assemblies described in U.S. Pat. Nos. 7,722,199; 7,314,285; 7,267,449; 7,159,992; 7,104,663; 7,093,946; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999; and/or 5,703,731, and/or U.S. patent applications, U.S. patent application Ser. No. 13/249,433, filed Sep. 30, 2011, Ser. No. 13/023,747, filed Feb. 9, 2011, Ser. No. 11/504,353, filed Aug. 15, 2006 and published Jan. 4, 2007 as U.S. Publication No. 2007/002477, and/or Ser. No. 13/663,542, filed Oct. 30, 2012, and/or U.S. provisional application Ser. No. 61/645,959, filed May 11, 2012, which are all hereby incorporated herein by reference in their entireties.

The exterior rearview mirror assembly of the present invention thus provides for a mirror head with a reflective element fixedly disposed thereat, such that additional content and/or enhanced styling may be readily achieved at the mirror head without concerns of space behind the reflective element (such space is typically taken up by a mirror reflective element actuator, which is not included in the exterior rearview mirror assembly of the types described above). Optionally, for example, the technology of the present invention allows for new technology or content to be readily added to and mounted into the mirror head. For example, the mirror head may include a camera disposed behind the reflective element, and/or the mirror head may include a display screen (such as a liquid crystal display screen or the like) disposed behind the reflective element and/or the mirror head may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,058,977; 7,944, 371; 7,492,281; 6,198,409; 5,929,786; 5,786,772; 5,581, 859; 6,227,689; 6,582,109; 5,371,659; 5,497,306; 5,669, 699; 5,823,654; 6,176,602; 6,276,821; 7,748,856; 7,255, 451; 7,195,381; 6,717,712; 7,126,456; 6,315,419; 7,097, 312; and/or 6,522,451, and/or U.S. patent application Ser. No. 12/187,725, filed Aug. 7, 2008, and/or PCT Application No. PCT/US2006/018567, filed May 16, 2006 and published Nov. 23, 2006 as International Publication No. WO 2006/124682, which are hereby incorporated herein by reference in their entireties).

Optionally, the reflective element may comprise a frameless reflective element, such as the types marketed as a prismatic or electrochromic INFINITY™ mirror, such as are shown and/or described in U.S. Des. Pat. Nos. D633,423; D633,019; D638,761; and/or D647,017, and/or PCT Application No. PCT/US2012/064398, filed Nov. 9, 2012, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. Pat. Nos. 7,253,723 and/or 8,154,418, which are hereby incorporated herein by reference in their entireties. In such an application, the mirror reflective element may have a rounded or ground perimeter edge region at its periphery of the front surface, and such a rounded or ground or polished perimeter edge region of the glass substrate of the reflective element may be exposed to or viewable by the driver of the vehicle and may comprise a polished perimeter that is polished to a water-clear finish and may have a radius of curvature of at least about 2.5 mm. The rounded perimeter edge of the glass substrate of the mirror reflective element may provide a generally smooth or continuous transition from the generally planar (or slightly curved) front surface of the mirror reflective element to the outer surface of the mirror head or mirror casing at which the mirror reflective element is mounted. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, and with reference to FIGS. 18A and 18B, an exterior rearview mirror reflective element assembly 360 may include one or more indicators 362 disposed at a perimeter region of the mirror reflective element 360, such as for providing a blind spot indicator or lane change warning or the like to the driver of the vehicle equipped with the mirror assembly and/or for providing a turn signal indicator for drivers of other vehicles to the side and/or rear of the equipped vehicle (such as by utilizing aspects of the indicators described in U.S. Pat. Nos. 7,255,451 and/or 7,195,381, which are hereby incorporated herein by reference in their entireties). Reflective element assembly 360 comprises an electrochromic reflective element having a front substrate 364 and a rear substrate 366 with an electrochromic medium 368 sandwiched therebetween and in an interpane cavity 370 bounded by a perimeter seal 372. The rear surface 364b of the front substrate 364 has a transparent conductive coating or layer 374 disposed thereat and the front surface 366a of the rear substrate 366 has a metallic mirror reflective layer or layers 375 disposed thereat. An opaque or substantially non-light-transmitting perimeter band or hiding layer 376 (preferably a reflective and electrically conductive perimeter band or coating or layer that comprises at least one metal thin film layer) is disposed around the periphery of the rear surface 364b of the front substrate 364 to hide or conceal the perimeter seal 372 (and preferably to hide or conceal electrical connections made at the rear surface 364b of the front substrate 364 and/or at the front surface 366a of the rear substrate 366 where, preferably, a third surface mirror reflector is disposed) when a person views the reflective element assembly from the front surface 364a of the front substrate 364. Preferably, no part of the rear substrate protrudes beyond any part of the front substrate, such that a viewer viewing the front substrate when normally using the equipped exterior rearview mirror assembly, does not discern or view the rear substrate. Optionally, and desirably, the electrochromic mirror reflective element may comprise a laminate type electrochromic mirror reflective element built in accordance with U.S. Pat. No. 5,724,187, which is hereby incorporated herein by reference in its entirety.

In the illustrated embodiment, the indicator 362 comprises an organic light emitting diode (OLED) disposed in an OLED cavity 370a established at a perimeter region of the reflective element assembly and outboard of the EC cavity 370, with the OLED cavity 370a bounded by an outer seal portion 372a of the perimeter seal 372 and an inner seal portion 372b of the perimeter seal 372. The seal 372 thus may be dispensed around the periphery of the reflective element assembly and may be dispensed around the OLED cavity to define and seal the OLED cavity 370a and to isolate the OLED cavity from the EC cavity 370. Optionally, and as shown in FIGS. 18A and 18B, the perimeter band 376 may be made wider at the OLED indicator 362 to hide or conceal the perimeter band portions that circumscribe the OLED cavity 370. A window 376a is established (such as via laser ablation or etching or the like) through the perimeter band 376 at the OLED indicator 362 and OLED cavity 370a so that illumination emanating from the OLED indicator 362, when powered or activated or energized, is viewable through the window 376a at the perimeter band 376.

The OLED indicator 362 is operable to illuminate responsive to electrical power applied thereto. The OLED material is an SPM-like material that may be filled into the separate cavity and that is illuminated when powered, with the glass conductive coatings configured to allow for separate electrification of the electrochromic medium and the OLED indicator. For example, and as shown in FIG. 18B, a delineation line or isolation line 375a may be established through mirror reflective layer or layers 375 to electrically isolate a principal reflecting region or portion 375b of the mirror reflective layer or layers 375 and an outboard OLED portion or region 375c of the mirror reflective layer or layers 375. Thus, the OLED indicator 362 may be electrically powered (such as via an electrical connection made at the third surface reflective layers at or near the OLED cavity) separately from the electrochromic medium 368 (which may be electrically powered via an electrical connector at a busbar or the like along a perimeter region of the rear substrate). Although described herein as comprising an OLED indicator, it is envisioned that the indicator may comprise any suitable material that may glow or emit light when energized or powered, while remaining within the spirit and scope of the present invention. Also, although shown and described as comprising an electrochromic reflective element assembly having an electrochromic medium, it is envisioned that the reflective element (with an indicator such as described above) may comprise other types of reflective elements or reflective element assemblies, such as other electro-optic reflective element assemblies or a liquid crystal reflective element assembly or the like, while remaining within the spirit and scope of the present invention.

Figure 19:
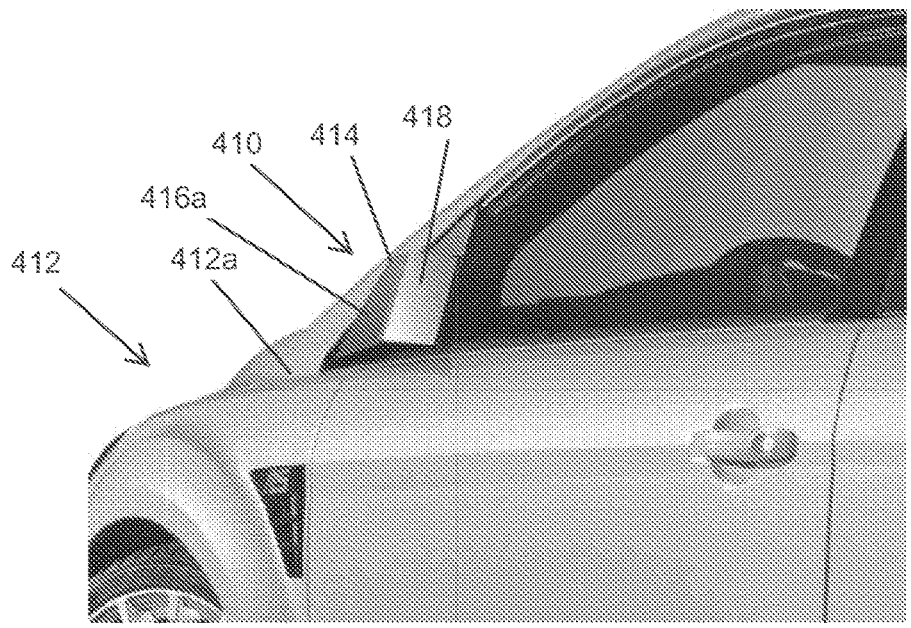

Optionally, an exterior rearview mirror assembly of the present invention may be extendable and retractable between a retracted or stowed or non-use position and an extended or use position. When in its retracted position, the exterior rearview mirror assembly may be disposed at least partially and preferably substantially within a recess at the side of the vehicle so that an outer portion of the exterior mirror casing may be proximate or generally flush with the side of the vehicle. For example, and with reference to FIGS. 19-22, an exterior rearview mirror assembly 410 is mountable at a side 412a of a vehicle 412 (such as at a side door of the vehicle and such as at a corner or sail portion of the side door of the vehicle and forward of a side window of the vehicle door). The exterior mirror assembly 410 includes a mirror head 414 (comprising a mirror casing 416 and a mirror reflective element 418) that is adjustable relative to a base portion 420 mounted at or received at the vehicle or vehicle door. The mirror head 414 and mirror casing 416 is pivotable or adjustable between an extended or use position (FIGS. 19 and 20), where the mirror casing and the reflective element 418 are extended so as to be disposed outboard of the side of the vehicle or door, and a retracted or non-use position (FIGS. 21 and 22), where the mirror casing and the reflective element 418 are retracted so as to be disposed inboard of the side of the vehicle or door.

The exterior mirror assembly 410 includes an actuator or extension/retraction mechanism that is operable to pivot or adjust or move the mirror head 414 (including the mirror casing 416 and the mirror reflective element 418) relative to the side of the vehicle or vehicle door. The actuator or mechanism may pivot or move the mirror head responsive to a user input and/or may automatically extend the mirror head when the vehicle is being driven and may retract the mirror head when the vehicle is not being driven (or responsive to other inputs or signals, such as a signal indicative of a detection of an object at or approaching the mirror assembly, whereby the mirror assembly may be retracted to avoid or minimize impact).

The exterior mirror assembly 410 may also include a mirror actuator that is operable (such as responsive to a user input or the like) to adjust the mirror reflective element relative to the mirror casing (when the mirror head is in its extended position or state) to adjust the rearward field of view of the driver of the vehicle. Optionally, the mirror actuator may be non-operable when the mirror head is in its retracted position.

In the illustrated embodiment, the base portion 420 of mirror assembly 410 comprises a generally triangular shaped structure that is disposed at or received at the A-pillar of the vehicle 412 so as to be disposed forward of the side window of the vehicle door (and optionally the base portion may be incorporated into the vehicle door frame or into the vehicle frame or body structure, depending on the particular application and vehicle). The base portion 420 has a generally triangular shaped (or truncated triangular shaped) opening or recess 420a that substantially receives the head portion 414 therein when the head portion 414 is in its stored or non-use position. The recess 420a may be surrounded or framed by an outer surface portion 420b of the base portion 420.

Figure 21:
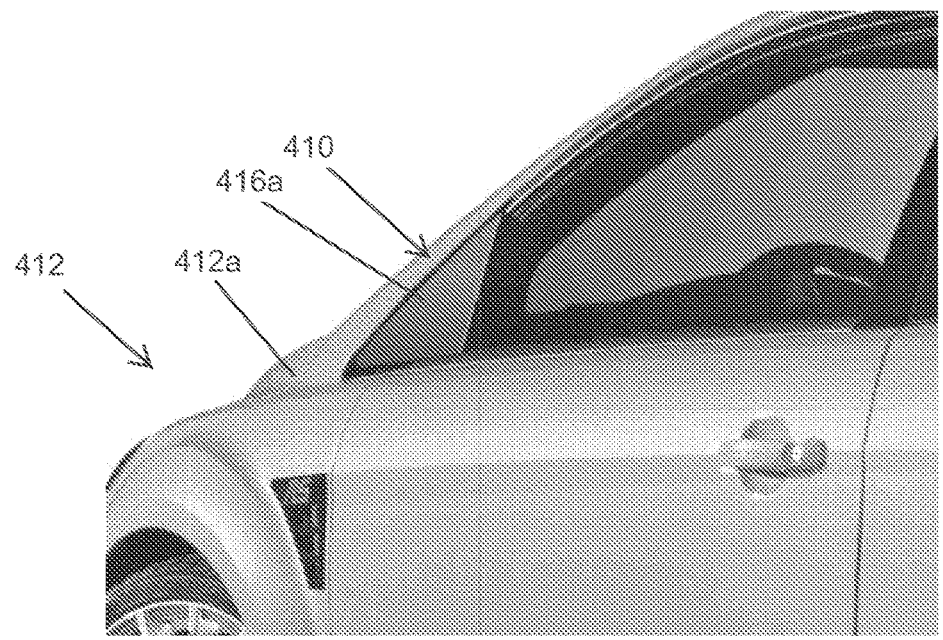
Figure 24:
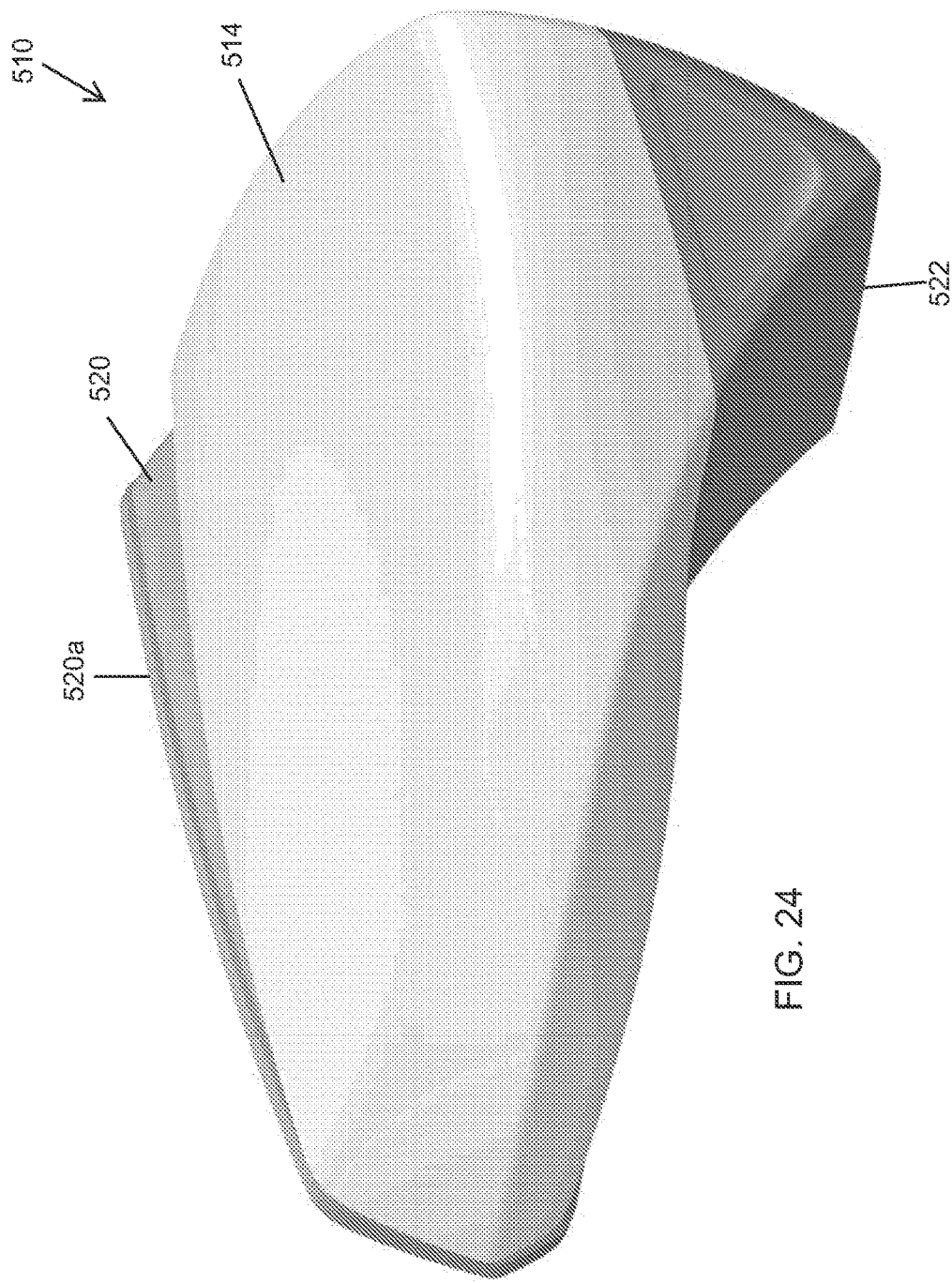
FIGS. 24-27 are perspective views of the exterior rearview mirror assembly of FIG. 23, shown with the reflective element at different angled orientations relative to the mirror casing.
Figure 25:
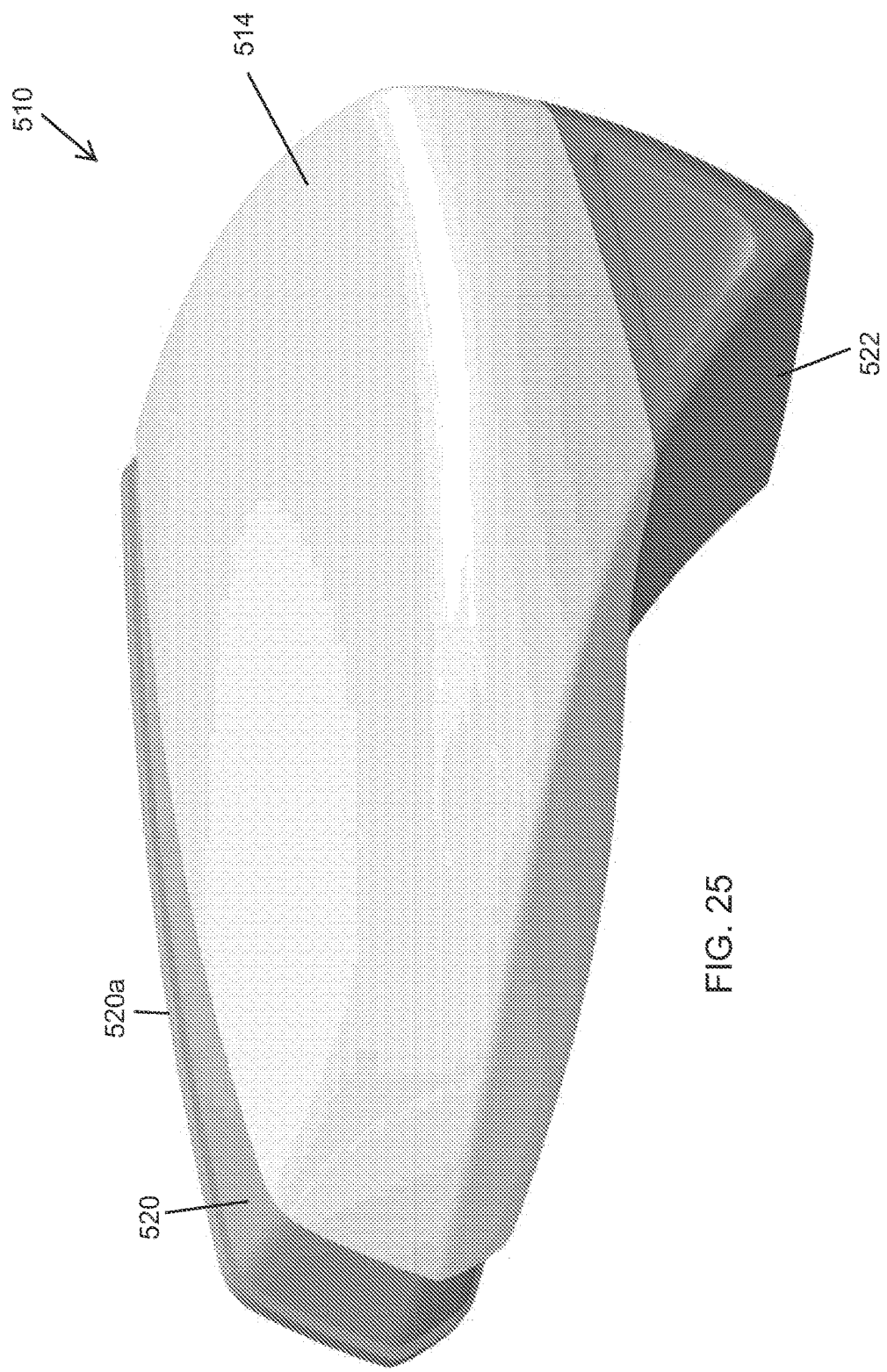
Figure 26:
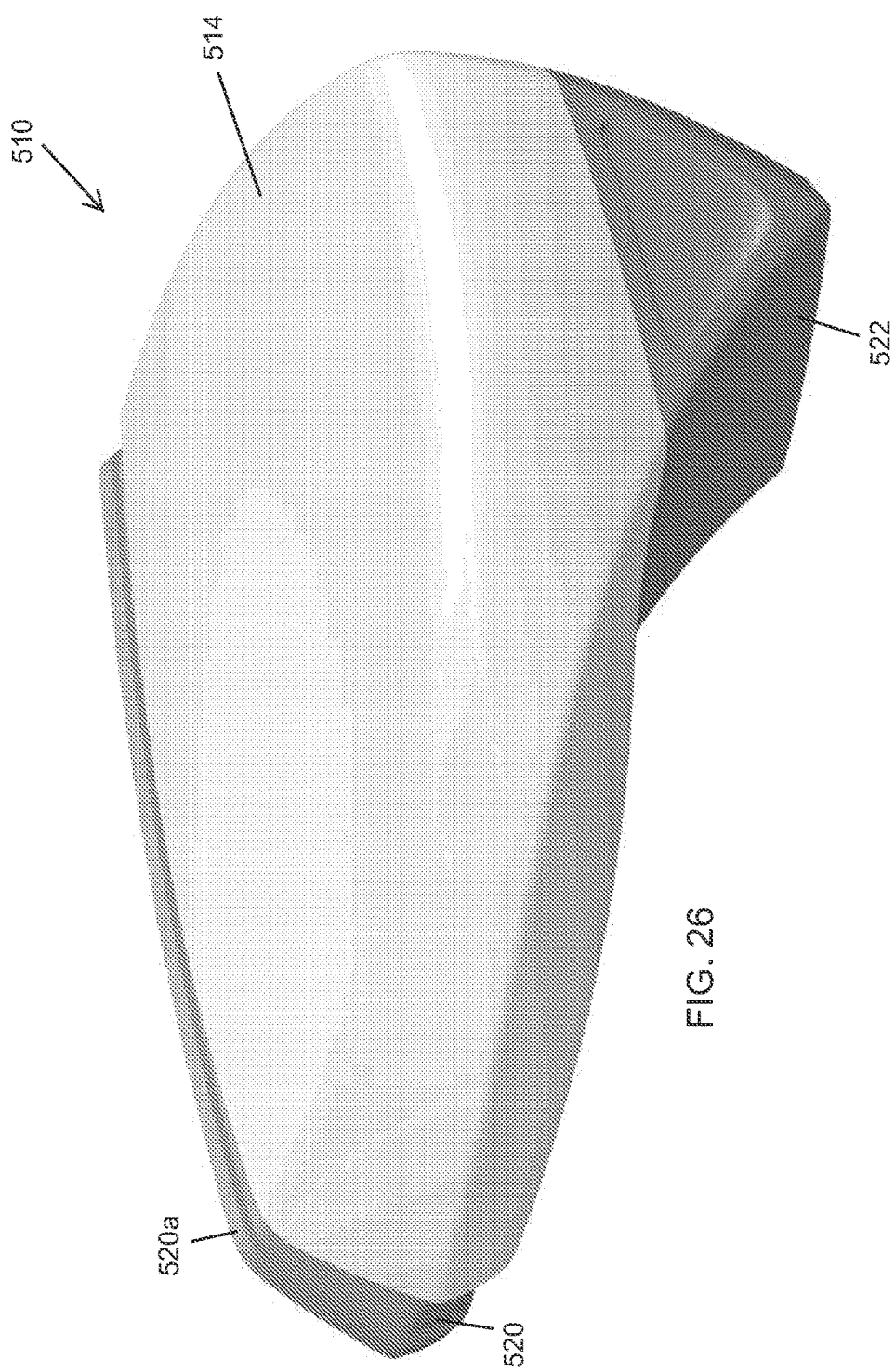
Figure 27:
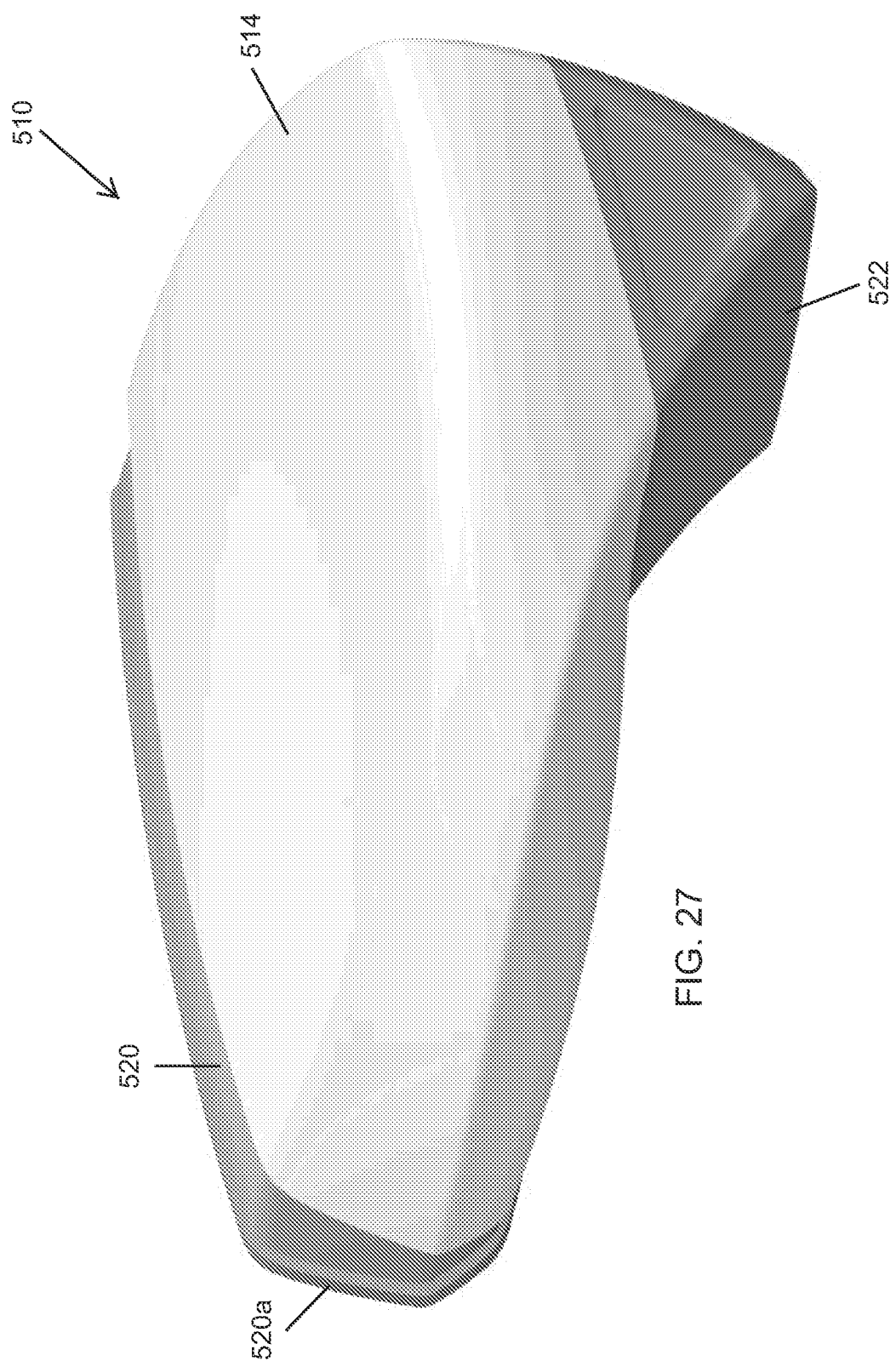
Figure 30:
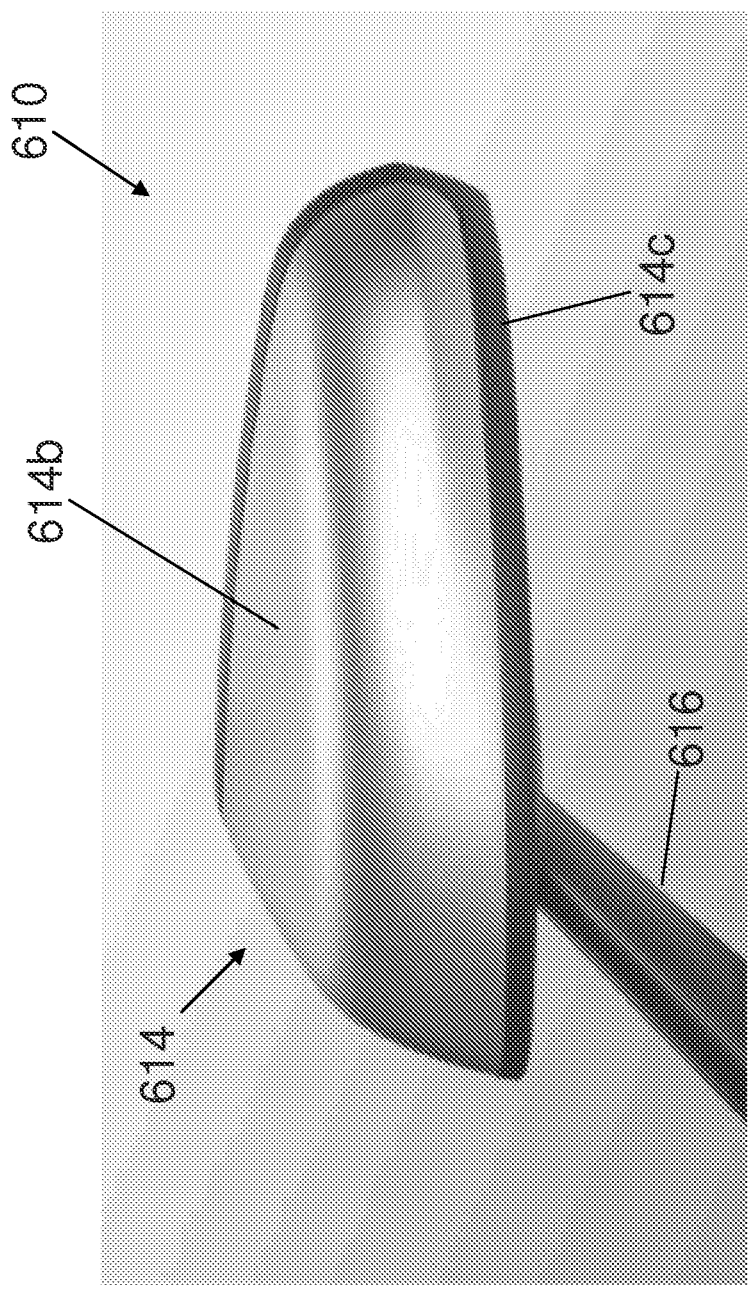
FIG. 30 is a front perspective view of another exterior rearview mirror assembly of the present invention.
Figure 31:
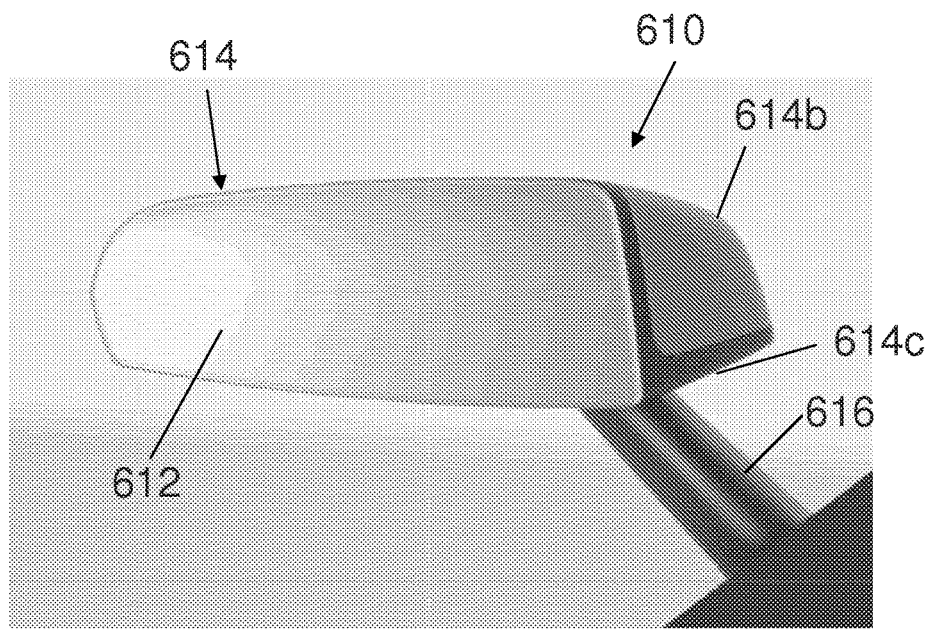
FIG. 31 is a rear perspective view of the exterior rearview mirror assembly of FIG. 30.
Figure 32:
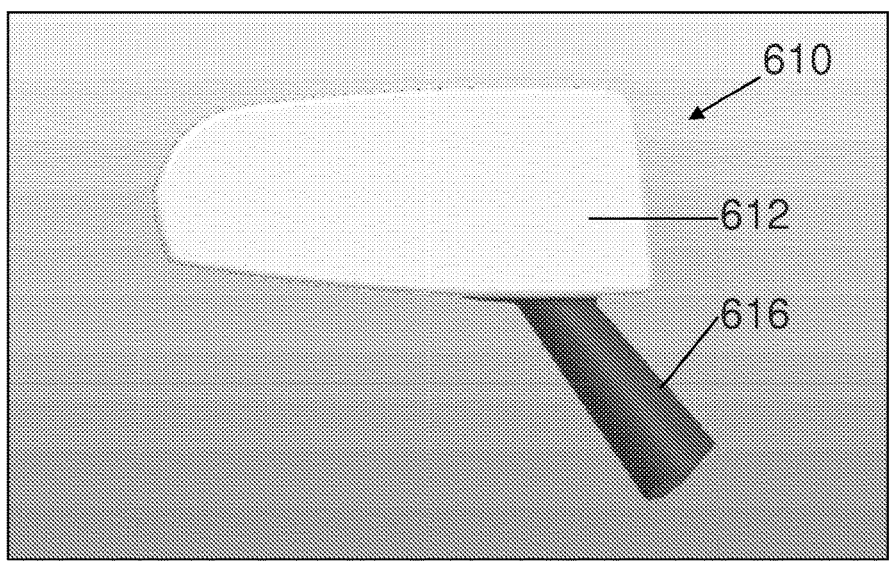
FIG. 32 is a rear elevation of the exterior rearview mirror assembly of FIG. 30.
Figure 33:
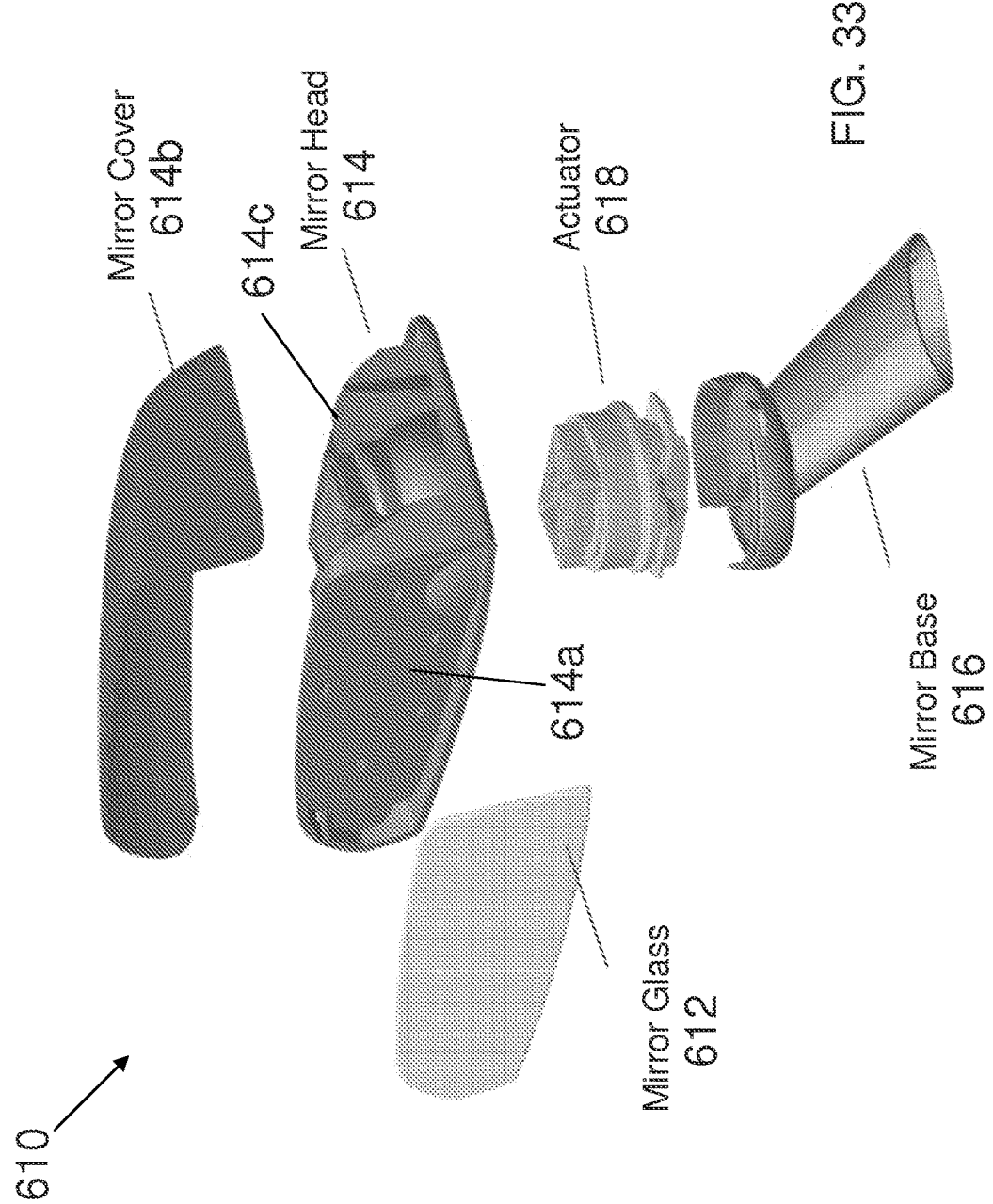
FIG. 33 is an exploded perspective view of the exterior rearview mirror assembly of FIG. 30.

As best shown in FIG. 21, mirror casing 416 of head portion 414 includes an outer, generally planar panel 416a and upper and lower panels 416b, 416c that substantially house the mirror reflective element 418 (and a mirror actuator, if applicable). The outer panel 416a may substantially correspond in color and/or texture and/or appearance with the outer surface or portion 420b, such that, when the mirror head 414 is in its stored position (FIGS. 21 and 22), the outer panel 416a of the mirror casing 416 may be substantially flush or coplanar with the outer surface or portion 420b of the base portion 420. As can be seen in FIG. 20, the outer panel 416a may extend beyond the outer surfaces of the upper and lower panels or portions 416b, 416c of mirror casing 416 so as to provide a lip 416d around the mirror casing that may engage or seal against a portion of the base 420 when the mirror head is in its retracted state to seal against the base portion and limit water or dirt intrusion into the cavity or recess of the base portion.

Thus, when the mirror head is retracted, the side of the vehicle has no mirror protruding outwardly therefrom and the outer panel 416a of the mirror casing 416 of the mirror head 414 provides an outer panel or surface at the side of the vehicle or vehicle door, and may be generally or substantially coplanar or flush with the outer surface of the base portion 420 and/or of the vehicle body and/or vehicle door. When the mirror head is extended, the reflective element 416 is moved outward from the pocket or recess of the base portion 420 and is visible at the side of the vehicle or vehicle door to the driver of the vehicle. When the mirror head is extended, the driver can adjust the mirror reflective element relative to the mirror casing to adjust the driver's rearward field of view, such as via a toggle or user input in the vehicle cabin. The present invention thus provides an extendable and retractable exterior sideview or rearview mirror assembly, where the mirror may be substantially or fully retracted when not in use to provide a generally flush appearance at the side of the vehicle or vehicle door. Optionally, the exterior sideview or rearview mirror assembly may be adjustable to its extended state or orientation responsive to a blind spot detection system or lane change assist system of the vehicle, where the mirror head is extended when the system detects an object at or approaching the side of the vehicle and optionally when the driver actuates a turn signal of the vehicle, whereby extension of the mirror head may provide an additional alert to the driver that an object is present at or approaching the side lane adjacent the vehicle. Optionally, the exterior sideview or rearview mirror assembly may utilize aspects of the mirror assemblies described in U.S. Pat. No. 7,777,611 and/or PCT Application No. PCT/US2012/062905, filed Nov. 1, 2012, which are hereby incorporated herein by reference in their entireties.

Optionally, the mirror assembly may include a camera and/or an indicator or illumination source or module (such as a turn signal indicator or a ground illumination light or other lighting device). For example, a camera and/or an indicator may be disposed at the mirror housing and may be operable at least when the mirror head is in its extended state (with the camera optionally being disposed at or behind the reflective element and optionally viewing through the reflective element and/or being disposed elsewhere within or at the mirror housing, and with the indicator or lighting device optionally being disposed at or behind the reflective element and optionally being viewable through the reflective element and/or being disposed elsewhere within or at the mirror housing). Optionally, the camera and/or indicator and/or lighting device may be disposed generally at the outer panel 416a and may be operable when the mirror head is in its retracted state. For example, a turn signal indicator may be disposed at the outer panel and may be operable when the mirror head is in either the extended state or retracted state. Likewise, for example, a camera may be disposed at or near the outer panel and may be operable to provide rear vision when the mirror is folded in (such as by utilizing aspects of the rear vision systems described in U.S. Pat. Nos. 5,670,935 and 5,550,677, which are hereby incorporated herein by reference in their entireties).

Optionally, the mirror casing of an exterior rearview mirror assembly of the present invention may be fixedly disposed or attached at a side of a vehicle (or movably disposed thereat and movable to pivot between a use position and a folded position, such as for a breakaway mirror or power folding mirror), and an inner casing or housing, which at least partially encases or encompasses the rear of the reflective element and the backing plate and actuator, is received in the mirror casing and moves with the reflective element and relative to the non-moving mirror casing. For example, and with reference to FIGS. 23-29, an exterior rearview mirror assembly 510 includes a mirror reflective element 512 and a fixed or outer mirror casing 514, with the mirror reflective element 512 being adjustable (such as via one or more actuators 516) relative to the mirror casing 514 to adjust the driver's rearward and sideward view at the side of the vehicle. A backing plate or attachment plate 518 is attached at the rear of the mirror reflective element 512 and attaches the mirror reflective element to a mirror actuator 516, which is electrically operable to adjust the mirror reflective element responsive to a user input in the vehicle. A shroud or inner casing or housing 520 is disposed or established at the perimeter of the reflective element 512 and extends into the mirror casing 514 to at least partially encompass or encase or hide the mirror actuator 516 and other internal components or the like of the rearview mirror assembly that are disposed at or to the rear of the reflective element. As can be seen in FIGS. 23-29, when the mirror reflective element 512 is adjusted relative to the outer casing 514 to adjust the driver's rearward and sideward field of view, the inner casing or shroud 520 is all that is viewable behind the reflective element 512 and functions to hide and conceal and protect the inner components of the reflective element in any and all of its adjustable positions or orientations relative to the mirror casing.

The mirror casing 514 may comprise any suitable casing and may be designed and shaped in a manner selected for a particular vehicle application. The mirror casing is attached at a mounting portion 522, which mounts the mirror assembly at the side of the vehicle. Optionally, the mirror casing may be generally fixedly attached at the mounting portion or the mirror casing may be pivotally attached at the mounting portion, such as to allow for folding of the mirror casing between a use position and a folded or non-use position. Optionally, the mirror assembly may comprise a powerfold mirror assembly, whereby such folding or pivoting of the mirror casing may be achieved via a powered motor or actuator or the like. The reflective element 512 and shroud or flange 520 are movably or adjustably disposed at least partially in the mirror casing and move with the mirror casing when it is moved relative to the side of the vehicle (such as for powerfold and/or breakaway mirror applications).

As shown in FIG. 23, the inner casing or shroud or flange 520 may be integrally formed with the back plate 518 (or optionally, the flange or shroud 520 may be attached at the back plate and/or attached at the reflective element or the like) and extends rearward therefrom. In the illustrated embodiment, the shroud 520 curves inward to cover or conceal or at least partially cover or conceal the back plate and mirror actuator and the like at the rear of the reflective element. As can be seen in FIG. 23, the shroud 520 is received in the mirror casing 514 and tapers inward to allow for pivotal movement of the mirror reflective element (and back plate and shroud) relative to the mirror casing 514 without interference between the shroud and mirror casing (or optionally with minimal interference where the shroud may slide relative to the inner surface of the mirror casing such as when the mirror reflective element is adjusted by the driver of the vehicle to adjust his or her rearward field of view). When the reflective element is in a neutral or centered orientation (not angled sidewardly or upwardly or downwardly, such as shown in FIG. 23), the reflective element may be disposed outboard of the mirror casing, with the shroud being viewable around the perimeter of and rearward of the reflective element. Thus, the mirror casing size and shape may be reduced and the mirror casing cavity may be sized to receive the shroud 520 therein with little or minimal clearance between an outboard surface of the shroud and an inner surface of the mirror casing at its open end 514a.

Optionally, and as shown in FIGS. 23-29, a lip or flange 520a may be provided around the perimeter edge of the reflective element and may protrude radially outwardly from the outer surface of the shroud 520 that is rearward of the reflective element. When the mirror reflective element 512 is fully tilted or pivoted to either its outboard direction (FIG. 24), its inboard direction (FIG. 25), upwardly (FIGS. 26 and 28) and/or downwardly (FIGS. 27 and 29), the lip 520a at the respective perimeter region of the reflective element may approach or even contact the open end 514a of the mirror casing, such as can be seen in FIGS. 24-29.

Optionally, the shroud 520 may be open at its inner or rearward end to allow for mounting of the mirror actuator within the mirror casing 514, or the shroud may be closed so that the mirror reflective element assembly or mirror head may comprise a closed or sealed unit that may be readily mounted in the mirror casing (whereby the actuator may be readily electrically connected to an electrical connector in the mirror casing). When so mounted, and as can be seen with reference to FIGS. 24-29, the mirror reflective element may be adjusted upward, downward and sideward relative to the mirror casing, while the shroud conceals the back plate and actuator from view.

The exterior rearview mirror assembly 510 thus comprises an exterior rearview mirror assembly having a fixed outer mirror casing or housing, with the reflective element "holder" extending into the casing and having approximately the same height and width as the inner edge of the mirror casing perimeter. The flange or shroud or inner housing is received in or tucks inside the mirror casing to cover or substantially cover and conceal the actuator and to hide the internal components and the like of the mirror assembly. Such an inner housing or shroud configuration allows for enhanced fine tuning of aerodynamic properties of the exterior mirror assembly, because the mirror casing does not move and allows for the size of the mirror casing to be reduced to a reduced size while the mirror assembly still meets minimum vision requirements. The actuator may operate to adjust the mirror reflective element in any suitable manner (such as in a manner similar to that of conventional exterior mirror actuators), but with the reflective element being disposed outboard of the open end of the mirror casing and with the shroud being exposed at the rear of the mirror reflective element (and between the reflective element and the mirror casing) and hiding the actuator and other components disposed behind the reflective element.

Optionally, the exterior rearview mirror assembly may comprise a frameless outside mirror reflective element that provides for adjustment of the mirror reflective element via use of a single actuator located in the head of the mirror. The actuator may combine the functions of the glass and power fold actuators. For example, and with reference to FIGS. 33-36, an exterior rearview mirror assembly 610 includes a mirror reflective element 612 attached at an attaching surface or portion 614a of a mirror head 614, with the mirror head mounted at a mirror base 616 and movable or adjustable relative to the base via an actuator 618. In the illustrated embodiment, the mirror head 614 includes a cover element or mirror cover 614b that is attached at a base or attaching portion 614c of the mirror head 614. The actuator 618 is operable to adjust the mirror head (and the reflective element fixedly attached thereto) to adjust the rearward field of view of the driver at the reflective element. The actuator 618 is also operable to move the mirror head about a generally vertical pivot axis to provide a powerfold function. The actuator may utilize aspects of the mirror actuators described in U.S. patent application Ser. No. 13/023,747, filed Feb. 9, 2011, which is hereby incorporated herein by reference in its entirety.

The present invention also benefits from, and optionally utilizes, aspects of the single motor actuation and mechanical/electrical construction as described in U.S. Pat. No. 7,322,710, which is hereby incorporated herein by reference in its entirety. For example, an actuator may be used that comprises a clutch assembly that selectively transfers torque from an actuator motor to one of at least two output shafts based on the speed of the actuator motor. One output shaft can pivot about a first axis of rotation, and another output shaft can pivot about a second axis of rotation. Optionally, one output shaft can pivot the mirror head and another output shaft can extend and retract the mirror head, such as is beneficial for use in an extendable/trailer tow exterior rearview mirror of an equipped vehicle.

Optionally, other mirror designs or configurations may be contemplated in accordance with the present invention, such as various configurations of the mirror casing and reflective element and any bezel at the mirror reflective element. For example, the mirror assembly may include a plastic molding that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, such as described in U.S. Pat. Nos. 7,255,541; 7,289, 037; 7,360,932; and/or 8,049,640, and/or U.S. patent application Ser. No. 12/752,305, filed Apr. 1, 2010, which are hereby incorporated herein by reference in their entireties. Optionally, for example, the mirror assembly may include a reflective element with a beveled or rounded or curved or ground or polished front perimeter of the glass substrate (such as a polished perimeter that is polished to a water-clear finish and that has a radius of curvature of at least about 2.5 mm) that may be exposed to, contactable by and viewable by the driver of the vehicle when the rearview mirror assembly is normally mounted in the vehicle, such as by utilizing aspects of the mirror assemblies shown and/or described in U.S. Des. Pat. Nos. D633,423; D633,019; D638,761; and/or D647,017, and/or PCT Application No. PCT/US2012/ 064398, filed Nov. 9, 2012, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr.

14, 2011 as International Publication No. WO 2011/044312, which are hereby incorporated herein by reference in their entireties. Optionally, the mirror assembly may include a conventional bezel, such as described in U.S. Pat. No. 7,224,324, which is hereby incorporated herein by reference in its entirety.

The overall mirror assembly may comprise a modular exterior rearview mirror assembly, such as described in U.S. Pat. No. 6,146,003, which is hereby incorporated herein by reference in its entirety, and/or may be constructed in accordance with U.S. Pat. No. 6,481,878, which is hereby incorporated herein by reference in its entirety.

Optionally, the mirror assembly may include various other features, such as lighting and/or indicators and/or blind spot detectors and/or wide angle reflectors or spotter mirrors and/or the like. For example, the mirror assembly may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,058,977; 7,944,371; 7,492,281; 6,198,409; 5,929,786; 5,786,772; 7,581,859; 6,227,689; 6,582,109; 5,371,659; 5,497,306; 5,669,699; 5,823,654; 6,176,602; 6,276,821; 7,748,856; 7,255,451; 7,195,381; 6,717,712; 7,126,456; 6,315,419; 7,097,312; and/or 6,522,451, and/or U.S. patent application Ser. No. 12/187,725, filed Aug. 7, 2008, and/or PCT Application No. PCT/US2006/018567, filed May 16, 2006 and published Nov. 23, 2006 as International Publication No. WO 2006/124682, which are hereby incorporated herein by reference in their entireties).

Optionally, for example, the mirror reflective element suitable for use in accordance with the present invention may be made by (or may be supplied to) the exterior rearview mirror manufacturer as a module or unitary sub-assembly that comprises at least a mirror reflective element (that may be a fixed reflectance mirror reflective element such as a chrome coated glass substrate/shape or that may be an electrochromic or otherwise electro-optically active exterior mirror reflective element, preferably a laminate-type electrochromic mirror reflective element). The unitary reflective element sub-assembly may also include a heater (such as a heater pad or the like) operable to deice/demist the front/first surface of the mirror reflective element. The unitary reflective element sub-assembly may also include a backing plate and/or backing/attachment structure or elements for attaching the unitary reflective element sub-assembly at the mirror head. Optionally, the mirror element of the reflective element sub-assembly may include a blind spot viewing auxiliary wide angle spotter mirror element that may be of the integrated type (such as described in U.S. Pat. No. 6,315,419 and/or U.S. Pub. No. 2008/0225421, which are hereby incorporated herein by reference in their entireties) or that may be a coplanar type or a circular spotter type or a WideVue™ type or construction (such as supplied by Magna Mirrors of Holland, Mich.), such as in accordance with U.S. Pat. Nos. 6,522,451; 6,717,712; 7,167,294; 7,589,883; and/or 8,267,534, which are hereby incorporated herein by reference in their entireties. Also, the unitary reflective element sub-assembly may comprise an extended field of view mirror reflective element, such as a reflective element utilizing aspects of the mirrors described in U.S. Pat. No. 7,420,756, and/or U.S. provisional application Ser. No. 60/471,872, filed May 20, 2003, which are hereby incorporated herein by reference in their entireties.

Optionally, for example, a bezel portion or lighting device may be disposed at the reflective element and/or the mirror casing via any suitable means, such as by utilizing aspects of the mirror assemblies described in U.S. Pat. No. 7,360,932, and/or U.S. patent application Ser. No. 13/644,593, filed Oct. 4, 2012, which are hereby incorporated herein by reference in their entireties. The functional capabilities of such a lighting device should meet the desired or required functional requirements of the OEM and any regulation requirements. The lighting device provides a means of illuminating the perimeter of the mirror reflective element of the exterior rearview mirror assembly and allows for customized light colors. For example, the illumination feature may operate in conjunction with or corresponding to a selected custom color for the interior lighting of the vehicle (such as MYCOLOR® offered by Ford Motor Company), whereby the illumination color emitted by an illumination source or sources or lighting element of the exterior rearview mirror assembly may be selected or customized by the user to a desired color or color combination. The colored illumination scheme may be selected to match the lighting scheme of the vehicle at which the mirror assembly is mounted or the owner of the vehicle may separately select a color scheme to customize or personalize the exterior rearview mirror assembly (such as by utilizing aspects of the mirror assemblies described in U.S. Pat. Nos. 7,626,749; 7,255,451; 7,289,037, which are hereby incorporated herein by reference in their entireties).

Optionally, the mirror assembly and/or a mirror system of the vehicle may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,855,755; 7,734,392; 7,370,983; 7,338,177; 7,274,501; 7,255,451; 7,195,381; 7,184,190; 7,046,448; 6,902,284; 6,428,172; 6,420,975; 5,668,663; 5,724,187; 6,690,268; 5,416,313; 5,285,060; 5,193,029 and/or 4,793,690, and/or in U.S. patent application Ser. No. 13/023,750, filed Feb. 9, 2011; Ser. No. 11/226,628, filed Sep. 14, 2005 and published Mar. 23, 2006 as U.S. Pat. Pub. No. US-2006-0061008; Ser. No. 10/538,724, filed Jun. 13, 2005 and published Mar. 9, 2006 as U.S. Pat. Pub. No. US-2006-0050018; Ser. No. 12/091,525, filed Apr. 25, 2008 and published Jan. 15, 2009 as U.S. Pat. Pub. No. US-2009-0015736; Ser. No. 12/091,525, filed Apr. 25, 2008 and published Jan. 15, 2009 as U.S. Pat. Pub. No. US-2009-0015736; Ser. No. 12/578,732, filed Oct. 14, 2009 and published Apr. 22, 2010 as U.S. Pat. Pub. No. US-2010-0097469; Ser. No. 09/585,379, filed Jun. 1, 2000, now abandoned; and/or Ser. No. 10/207,291, filed Jul. 29, 2002, now abandoned, and/or PCT Application No. PCT/US10/47256, filed Aug. 31, 2010, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005 and published Aug. 3, 2006 as U.S. Pat. Pub. No. US-2006-0171704, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, a rear camera, such as a rear backup video camera/imager or the like (such as a camera and system of the types described in U.S. Pat. Nos. 5,550,677; 5,670,935; 6,498,620; 6,222,447; and/or 5,949,331, which are hereby incorporated herein by reference in their entireties), may be disposed at the vehicle (such as at a rear portion of the vehicle and/or at one or both sideview mirrors of the vehicle) and may have a rearward field of view rearward of the vehicle for capturing images rearward of the vehicle such as for driver assistance during a reversing maneuver of the vehicle or the like. Because such a rear camera has a rearward field of view, the rearward facing camera may be operable to capture images of rearwardly approaching or following vehicles that are behind the vehicle equipped with the rearward facing camera when the vehicle so equipped is driving forwardly along the road or highway. It is envisioned that an image processor or controller (such as an EyeQ™ image processing chip available from Mobileye Vision Technologies Ltd. of Jerusalem, Israel, and such as an image processor of the types described in PCT Application No. PCT/US10/25545, filed Feb. 25, 2010 and published Sep. 2, 2010 as International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing. Using principles of the systems described in U.S. Pat. No. 5,550,677, which is hereby incorporated herein by reference in its entirety, the system may operate to independently control any one or more of the interior rearview mirror assembly and the exterior rearview mirror assemblies of the equipped vehicle, such as based on the intensity and location of glare light detected by the camera and image processor. Such a rear reversing or backup camera and controller can also operate to detect the ambient light level present at the vehicle and may adjust the dimming of the mirror system accordingly, and/or may adjust other displays, lighting and/or accessories of the vehicle in accordance with and responsive to the ambient light detection by the rear backup camera (or by other cameras on the vehicle that view exterior to the vehicle). Such glare detection and ambient light detection and image processing of image data captured by a rear backup assist camera of the vehicle may obviate the need for a separate glare sensor elsewhere at the vehicle, such as at or in the interior rearview mirror assembly of the vehicle or the like. Such image processing and such a mirror control system may utilize aspects of the imaging systems described in U.S. Pat. Nos. 5,550,677; 5,670,935; 5,760,962; 6,201,642; 6,396,397; 6,498,620; 6,097,023; 5,877,897; and 5,796,094, which are hereby incorporated herein by reference in their entireties.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092; and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,420,036; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly.

Optionally, the reflective element may includes an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; and/or 7,255,451, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The exterior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289; and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501; and/or 7,184,190, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. patent application Ser. No. 10/538,724, filed Jun. 13, 2005 and published Mar. 9, 2006 as U.S. Pat. Pub. No. US-2006-0050018; and/or Ser. No. 12/091,525, filed Apr. 25, 2008 and published Jan. 15, 2009 as U.S. Pat. Pub. No. US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. patent application Ser. No. 10/538,724, filed Jun. 13, 2005 and published Mar. 9, 2006 as U.S. Pat. Pub. No. US-2006-0050018, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322; and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; and 6,420,975; 6,477,464; 6,946,978; 7,308,341; 7,167,796; 7,004,593; 7,657,052; and/or 6,678, 614, and/or U.S. patent application Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249, 860, microphones, such as disclosed in U.S. Pat. Nos. 7,657,052; 6,243,003; 6,278,377; and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720, 580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. patent application Ser. No. 11/239,980, filed Sep. 30, 2005 and published Jun. 15, 2006 as U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned to Donnelly Corporation and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; 7,004,606; and/or 7,720,580, and/or U.S. patent application Ser. No. 10/534,632, filed May 11, 2005 and published Aug. 3, 2006 as U.S. Patent Publication No. US-2006-0171704; Ser. No. 12/091,359, filed Jun. 10, 2008 and published Oct. 1, 2009 as U.S. Pat. Pub. No. US-2009-0244361; and/or Ser. No. 12/377,054, filed Feb. 10, 2009 and published Aug. 26, 2010 as U.S. Pat. Pub. No. US-2010-0214791, and/or PCT Application No. PCT/US08/78700, filed Oct. 3, 2008 and published Apr. 9, 2009 as International Publication No. WO 2009/046268, and/or PCT Application No. PCT/US08/76022, filed Sep. 11, 2008 and published Mar. 19, 2009 as International Publication No. WO 2009/036176, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005 and published Aug. 3, 2006 as U.S. Pat. Pub. No. US-2006-0171704; and/or Ser. No. 12/091,359, filed Oct. 27, 2006 and published Oct. 1, 2009 as U.S. Pat. Pub. No. US-2009-0244361, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly configured for mounting at an exterior portion of a vehicle, said exterior rearview mirror assembly comprising:
   a non-movable portion configured for attachment at an exterior portion of a vehicle equipped with said exterior rearview mirror assembly;
   a movable portion that is movable relative to said non-movable portion;
   a mirror head that is movable relative to said movable portion;

wherein said mirror head comprises a mirror casing and a mirror reflective element fixedly attached at an attachment portion of said mirror head and fixed relative to said mirror casing;

a first actuator operable to move said movable portion relative to said non-movable portion about a first axis;

a second actuator operable to move said mirror head relative to said movable portion about a second axis;

wherein said first and second actuators are cooperatively operable to move said movable portion about said first axis and to move said mirror head about said second axis;

wherein said mirror reflective element moves in tandem with movement of said mirror head relative to said movable portion and said non-movable portion to adjust the rearward field of view of a driver of the equipped vehicle;

wherein said first and second actuators are cooperatively operable to move said mirror head and said movable portion to provide a powerfold function; and wherein said first and second actuators are cooperatively operable to provide the powerfold function whereby said first and second actuators both operate together to move said mirror head and said movable portion between a use position, where said mirror head is extended from the exterior portion of the vehicle for providing the rearward field of view of a driver of the equipped vehicle, and a folded position, where said mirror head is nearer to the exterior portion of the vehicle.

2. The rearview mirror assembly of claim 1, wherein said first and second actuators are operable at different rotational speeds to adjust the rearward field of view of the driver of the equipped vehicle.

3. The rearview mirror assembly of claim 1, wherein said first and second axes are angled relative to one another.

4. The rearview mirror assembly of claim 3, wherein said first and second axes are at an angle of between about 15 degrees and about 90 degrees relative to one another.

5. The rearview mirror assembly of claim 1, wherein said mirror head attaches at said movable portion at a portion thereof that is remote from said mirror reflective element.

6. The rearview mirror assembly of claim 1, wherein said attachment portion is part of said mirror casing.

7. The rearview mirror assembly of claim 6, wherein said mirror casing attaches at said movable portion at a portion thereof that is remote from said attachment portion.

8. The rearview mirror assembly of claim 1, wherein said mirror head houses at least one accessory that is disposed in a mirror casing of said mirror head and behind said mirror reflective element.

9. The rearview mirror assembly of claim 8, wherein said at least one accessory comprises a camera.

10. The rearview mirror assembly of claim 1, wherein said mirror reflective element comprises a frameless mirror reflective element.

11. The rearview mirror assembly of claim 10, wherein said frameless mirror reflective element has a glass substrate having a rounded front perimeter along a perimeter circumference of a front surface of said glass substrate, and wherein said rounded front perimeter has a radius of curvature of at least about 2.5 mm.

12. The rearview mirror assembly of claim 11, wherein, with said frameless mirror reflective element attached at an attachment portion of a mirror casing of said mirror head, said rounded front perimeter of said glass substrate is exposed to and is viewable by the driver of the equipped vehicle when said rearview mirror assembly is normally mounted at the exterior portion of the equipped vehicle.

13. The rearview mirror assembly of claim 1, wherein said mirror head is disposed at an outboard region of said movable portion and wherein an inboard region of said movable portion is disposed at said non-movable portion.

\* \* \* \* \*